(12) United States Patent
Rahman et al.

(10) Patent No.: US 12,191,952 B2
(45) Date of Patent: Jan. 7, 2025

(54) METHOD AND APPARATUS FOR CSI REPORTING

(71) Applicant: Samsung Electronics Co., Ltd., Suwon-si (KR)

(72) Inventors: Md. Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 416 days.

(21) Appl. No.: 17/580,544

(22) Filed: Jan. 20, 2022

(65) Prior Publication Data

US 2022/0239356 A1 Jul. 28, 2022

Related U.S. Application Data

(60) Provisional application No. 63/253,680, filed on Oct. 8, 2021, provisional application No. 63/236,883, filed on Aug. 25, 2021, provisional application No. 63/234,579, filed on Aug. 18, 2021, provisional application No. 63/191,110, filed on May 20, 2021, provisional application No. 63/175,442, filed on Apr. 15, 2021, provisional application No. 63/142,341, filed on Jan. 27, 2021, provisional application No. 63/141,249, filed on Jan. 25, 2021.

(51) Int. Cl.
*H04B 7/06* (2006.01)

(52) U.S. Cl.
CPC ......... *H04B 7/0626* (2013.01); *H04B 7/0632* (2013.01); *H04B 7/0636* (2013.01)

(58) Field of Classification Search
CPC .. H04B 7/0626; H04B 7/0632; H04B 7/0636; H04B 7/0628; H04B 7/0478; H04B 7/063; H04B 7/0639; H04W 72/0457
See application file for complete search history.

(56) References Cited

U.S. PATENT DOCUMENTS

| | | | |
|---|---|---|---|
| 2017/0288751 A1* | 10/2017 | Faxér | ............. H04B 7/0452 |
| 2020/0028555 A1 | 1/2020 | Rahman et al. | |
| 2020/0220598 A1 | 7/2020 | Zhang et al. | |
| 2020/0295812 A1 | 9/2020 | Rahman et al. | |
| 2020/0305144 A1 | 9/2020 | Babaei et al. | |

(Continued)

FOREIGN PATENT DOCUMENTS

| | | |
|---|---|---|
| CN | 111327352 A | 6/2020 |
| WO | 2020091671 A1 | 5/2020 |
| WO | 2022229925 A1 | 11/2022 |

OTHER PUBLICATIONS

International Search Report and Written Opinion issued May 9, 2022 regarding Application No. PCT/KR2022/001311, 7 pages.

(Continued)

*Primary Examiner* — Jamal Javaid

(57) ABSTRACT

A method for operating a user equipment (UE) comprises receiving configuration information about a channel state information (CSI) report, the configuration information including information about a number M denoting a number of frequency domain basis vectors; identifying a value of M; determining, based on the value of M, a frequency granularity of the CSI report from wideband (WB) and subband (SB); determining the CSI report according to the frequency granularity; and transmitting the CSI report.

17 Claims, 18 Drawing Sheets

(56) References Cited

U.S. PATENT DOCUMENTS

2021/0367652 A1* 11/2021 Wernersson ......... H04B 7/0634
2022/0149908 A1 5/2022 Gao et al.

OTHER PUBLICATIONS

"3rd Generation Partnership Project; Technical Specification Group Radio Access Network; Evolved Universal Terrestrial Radio Access (E-UTRA); Physical channels and modulation (Release 16)", 3GPP TS 36.211 V16.6.0, Jun. 2021, 249 pages.

"3rd Generation Partnership Project; Technical Specification Group Radio Access Network; Evolved Universal Terrestrial Radio Access (E-UTRA); Multiplexing and channel coding (Release 16)", 3GPP TS 36.212 V16.6.0, Jun. 2021, 256 pages.

"3rd Generation Partnership Project; Technical Specification Group Radio Access Network; Evolved Universal Terrestrial Radio Access (E-UTRA); Physical layer procedures (Release 16)", 3GPP TS 36.213 V16.6.0, Jun. 2021, 577 pages.

"LTE; Evolved Universal Terrestrial Radio Access (E-UTRA); Medium Access Control (MAC) protocol specification (3GPP TS 36.321 version 16.6.0 Release 16)", ETSI TS 136 321 V16.6.0, Technical Specification, Oct. 2021, 144 pages.

"LTE; Evolved Universal Terrestrial Radio Access (E-UTRA); Radio Resource Control (RRC); Protocol specification '3GPP TS 36.331 version 16.6.0 Release 16)", ETSI TS 136 331 V16.6.0, Technical Specification, Oct. 2021, 1098 pages.

"3rd Generation Partnership Project; Technical Specification Group Services and System Aspects; Feasibility Study on New Services and Markets Technology Enablers; Stage 1 (Release 14)", 3GPP TR 22.891 V14.2.0, Sep. 2016, 95 pages.

"3rd Generation Partnership Project; Technical Specification Group Radio Access Network; NR; Multiplexing and channel coding (Release 16)", 3GPP TS 38.212 V16.6.0, Jun. 2021, 153 pages.

"3rd Generation Partnership Project; Technical Specification Group Radio Access Network; NR; Physical layer procedures for data (Release 16)", 3GPP TS 38.214 V16.6.0, Jun. 2021, 172 pages.

Extended European Search Report issued May 14, 2024 regarding Application No. 22742918.0, 12 pages.

Lenovo et al., "CSI enhancements for multi-TAP and FDD reciprocity", 3GPP TSG RAN WG1 #107-e, R1-2111941, Nov. 2021, 11 pages.

Ericsson, "On CSI enhancements for MU-MIMO support", 3GPP TSG-RAN WG1 Meeting #94bis, R1-1811193, Oct. 2018, 8 pages.

* cited by examiner

METHOD AND APPARATUS FOR CSI REPORTING

CROSS-REFERENCE TO RELATED APPLICATIONS AND CLAIM OF PRIORITY

The present application claims priority to U.S. Provisional Patent Application No. 63/141,249, filed on Jan. 25, 2021, U.S. Provisional Patent Application No. 63/142,341, filed on Jan. 27, 2021, U.S. Provisional Patent Application No. 63/175,442, filed on Apr. 15, 2021, U.S. Provisional Patent Application No. 63/190,110, filed on May 20, 2021, U.S. Provisional Patent Application No. 63/234,579, filed on Aug. 18, 2021, U.S. Provisional Patent Application No. 63/236,883, filed on Aug. 25, 2021, and U.S. Provisional Patent Application No. 63/253,680, filed on Oct. 8, 2021, The content of the above-identified patent documents is incorporated herein by reference.

TECHNICAL FIELD

The present disclosure relates generally to wireless communication systems and more specifically to CSI reporting.

BACKGROUND

Understanding and correctly estimating the channel between a user equipment (UE) and a base station (BS) (e.g., gNode B (gNB)) is important for efficient and effective wireless communication. In order to correctly estimate the DL channel conditions, the gNB may transmit a reference signal, e.g., CSI-RS, to the UE for DL channel measurement, and the UE may report (e.g., feedback) information about channel measurement, e.g., CSI, to the gNB. With this DL channel measurement, the gNB is able to select appropriate communication parameters to efficiently and effectively perform wireless data communication with the UE.

SUMMARY

Embodiments of the present disclosure provide methods and apparatuses to enable channel state information (CSI) reporting in a wireless communication system.

In one embodiment, a UE for CSI reporting in a wireless communication system is provided. The UE includes a transceiver configured to receive configuration information about a CSI report, the configuration information including information about a number M denoting a number of frequency domain basis vectors. The UE further includes a processor operably connected to the transceiver. The processor is configured to identify a value of M; determine, based on the value of M, a frequency granularity of the CSI report from wideband (WB) and subband (SB); and determine the CSI report according to the frequency granularity. The transceiver is further configured to transmit the CSI report.

In another embodiment, a BS in a wireless communication system is provided. The BS includes a processor configured to generate configuration information about a CSI report, the configuration information including information about a number M denoting a number of frequency domain basis vectors. The BS further includes a transceiver operably connected to the processor. The transceiver is configured to: transmit the configuration information about the CSI report; and receive the CSI report; wherein a frequency granularity of the CSI report is determined from WB and SB based on a value of M.

In yet another embodiment, a method for operating a UE is provided. The method comprises: receiving configuration information about a CSI report, the configuration information including information about a number M denoting a number of frequency domain basis vectors; identifying a value of M; determining, based on the value of M, a frequency granularity of the CSI report from WB and SB; determining the CSI report according to the frequency granularity; and transmitting the CSI report.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
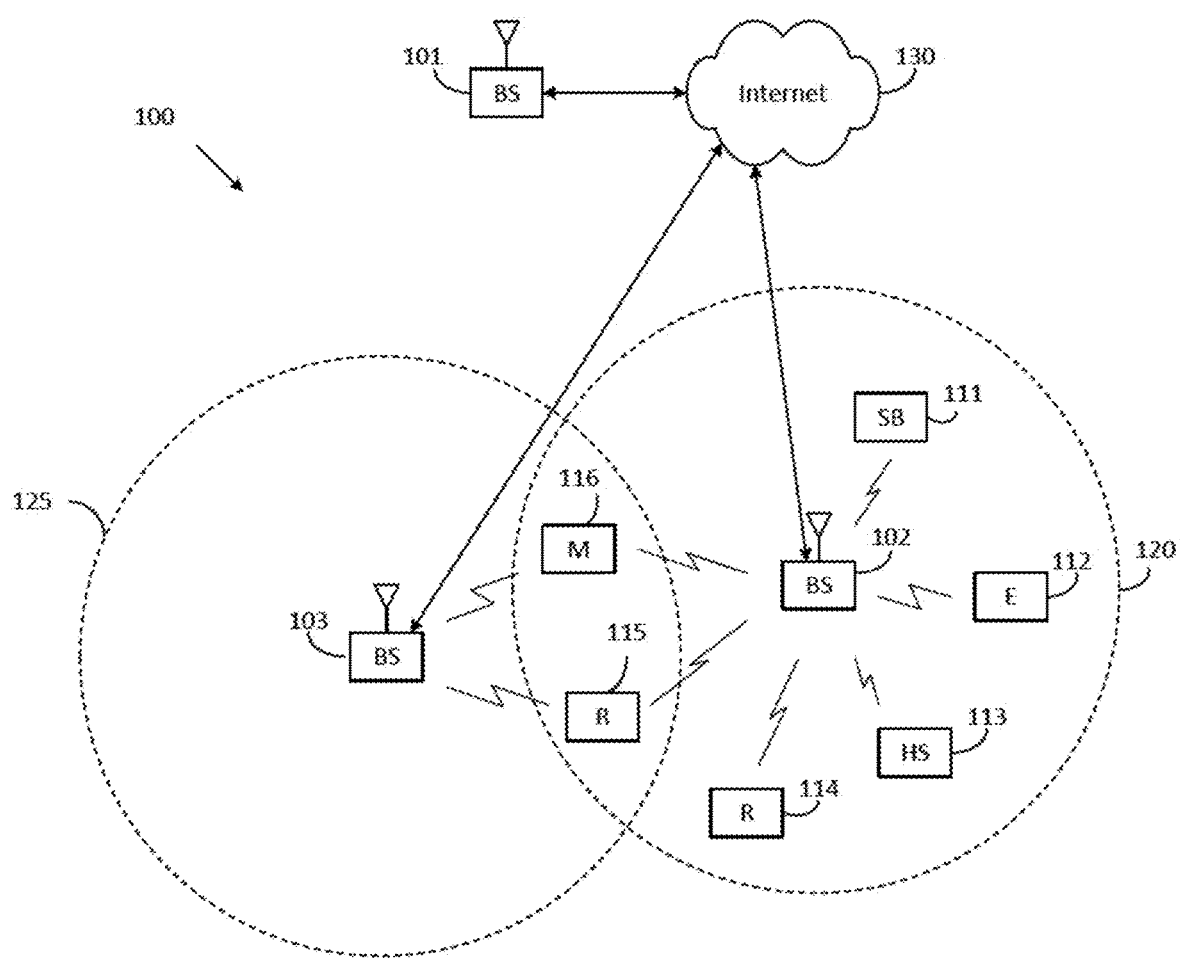
FIG. 1 illustrates an example wireless network according to embodiments of the present disclosure.

FIG. 1 through FIG. 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v16.6.0, "E-UTRA, Physical channels and modulation" (herein "REF 1"); 3GPP TS 36.212 v16.6.0, "E-UTRA, Multiplexing and Channel coding" (herein "REF 2"); 3GPP TS 36.213 v16.6.0, "E-UTRA, Physical Layer Procedures" (herein "REF 3"); 3GPP TS 36.321 v16.6.0, "E-UTRA, Medium Access Control (MAC) protocol specification" (herein "REF 4"); 3GPP TS 36.331 v16.6.0, "E-UTRA, Radio Resource Control (RRC) protocol specification" (herein "REF 5"); 3GPP TR 22.891 v14.2.0 (herein "REF 6"); 3GPP TS 38.212 v16.6.0, "E-UTRA, NR, Multiplexing and channel coding" (herein "REF 7"); and 3GPP TS 38.214 v16.6.0, "E-UTRA, NR, Physical layer procedures for data" (herein "REF 8").

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates or in lower frequency bands, such as below 6 GHz, to enable robust coverage and mobility support. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
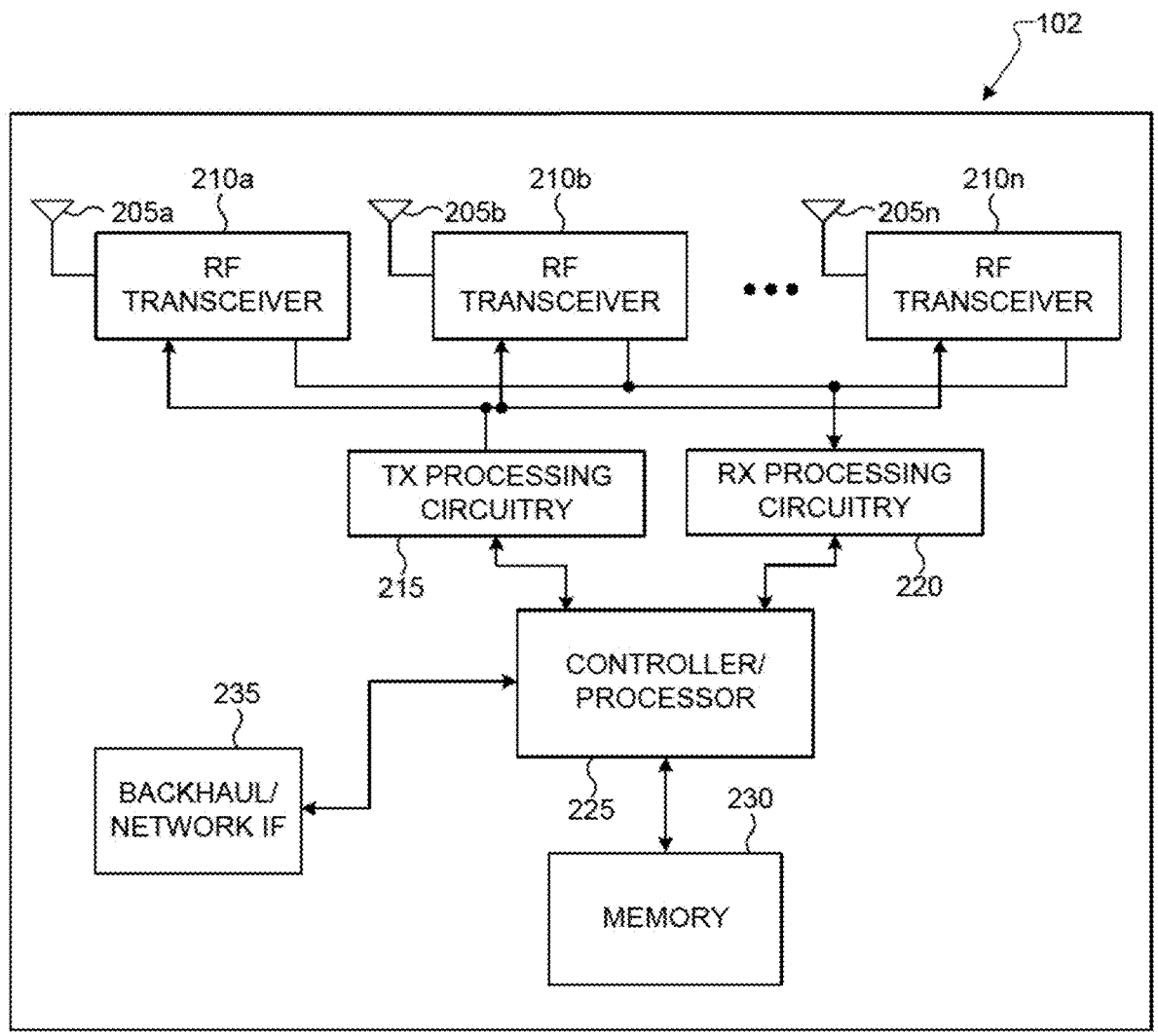
FIG. 2 illustrates an example gNB according to embodiments of the present disclosure.
Figure 3:
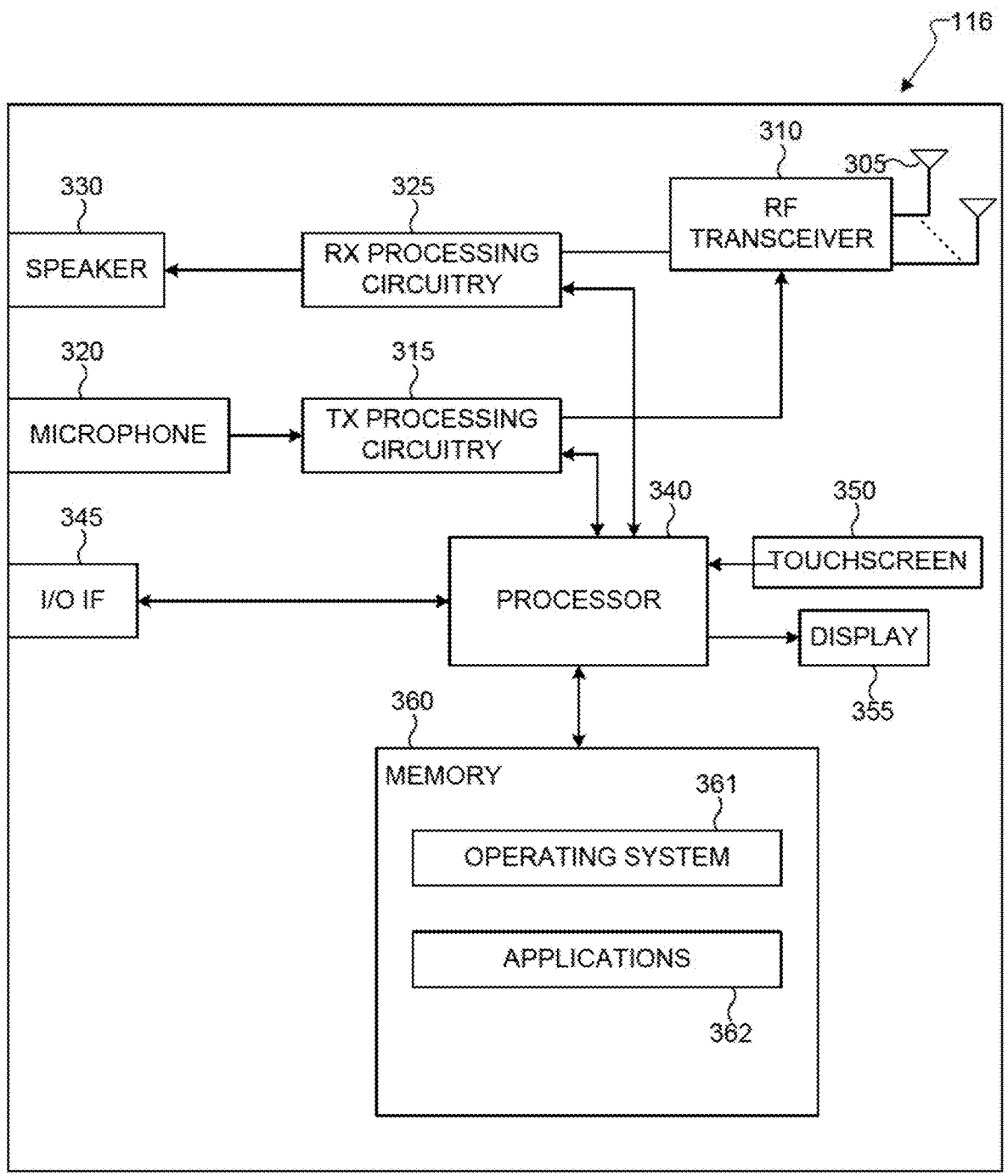
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system. The present disclosure covers several components which can be used in conjunction or in combination with one another, or can operate as standalone schemes.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for receiving configuration information about a channel state information (CSI) report, the configuration information including information about a number M denoting a number of frequency domain basis vectors; identifying a value of M; determining, based on the value of M, a frequency granularity of the CSI report from wideband (WB) and subband (SB); determining the CSI report according to the frequency granularity; and transmitting the CSI report, and one or more of the gNBs 101-103 includes circuitry, programing, or a combination thereof, for generating configuration information about a channel state information (CSI) report, the configuration information including information about a number M denoting a number of frequency domain basis vectors; transmitting the configuration information about the CSI report; and receiving the CSI report; wherein a frequency granularity of the CSI report is determined from wideband (WB) and subband (SB) based on a value of M.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for receiving configuration information about a channel state information (CSI) report, the configuration information including information about a number M denoting a number of frequency domain basis vectors; identifying a value of M; determining, based on the value of M, a frequency granularity of the CSI report from wideband (WB) and subband (SB); determining the CSI report according to the frequency granularity; and transmitting the CSI report. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
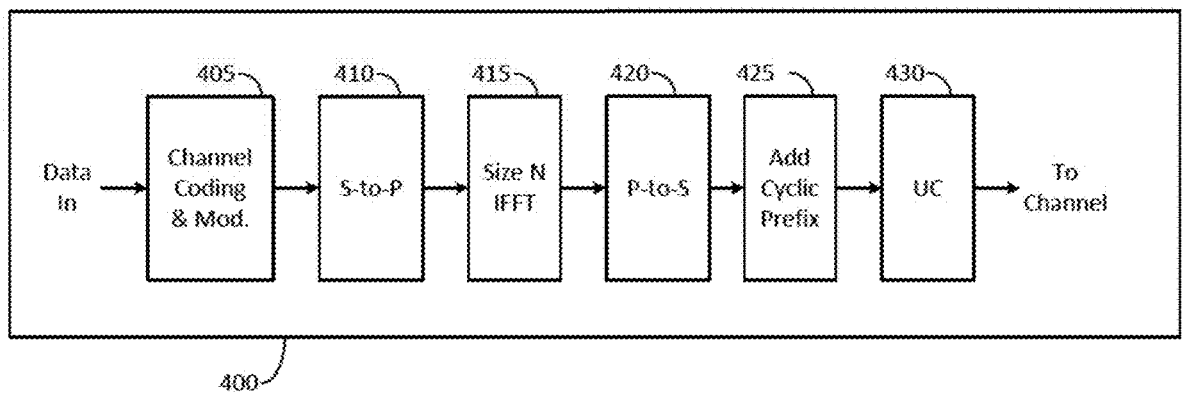
FIG. 4A illustrates a high-level diagram of an orthogonal frequency division multiple access transmit path according to embodiments of the present disclosure.
Figure 4B:
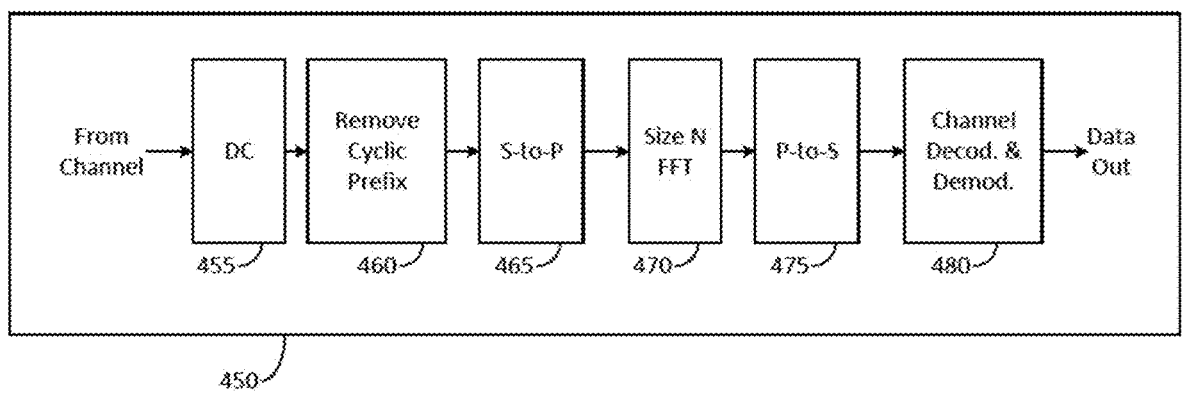
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency and removes cyclic prefix block 460, and removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BS s) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIB s that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH}=M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{RS}=1$ if a last subframe symbol is used to transmit SRS and $N_{SRS}=0$ otherwise.

Figure 5:
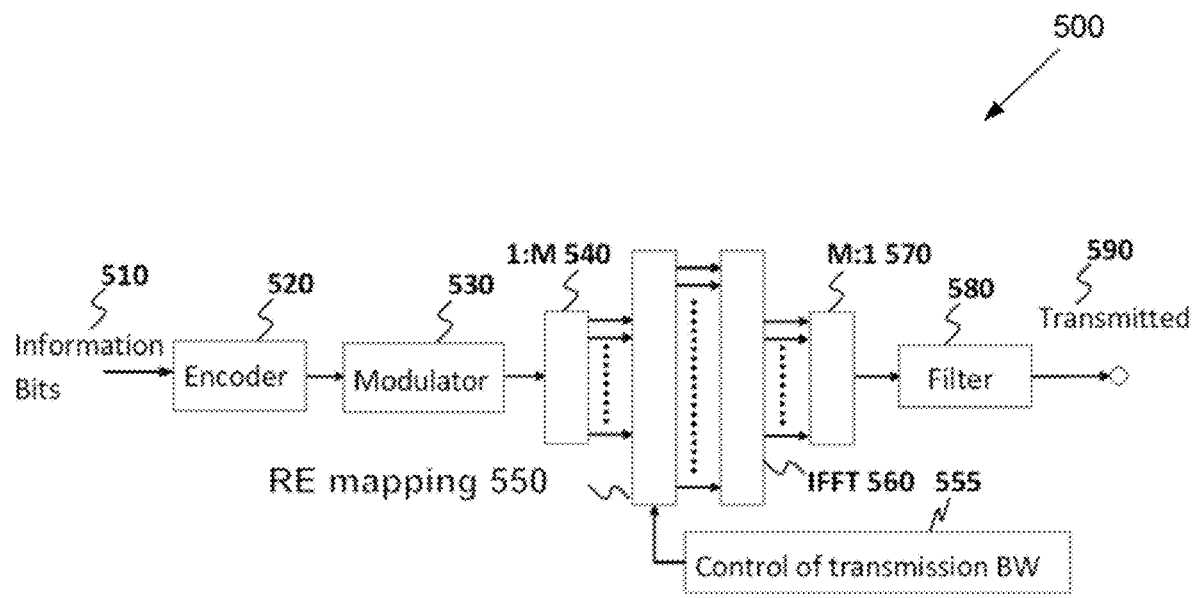
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. One or more of the components illustrated in FIG. 5 can be implemented in specialized circuitry configured to perform the noted functions or one or more of the components can be implemented by one or more processors executing instructions to perform the noted functions. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
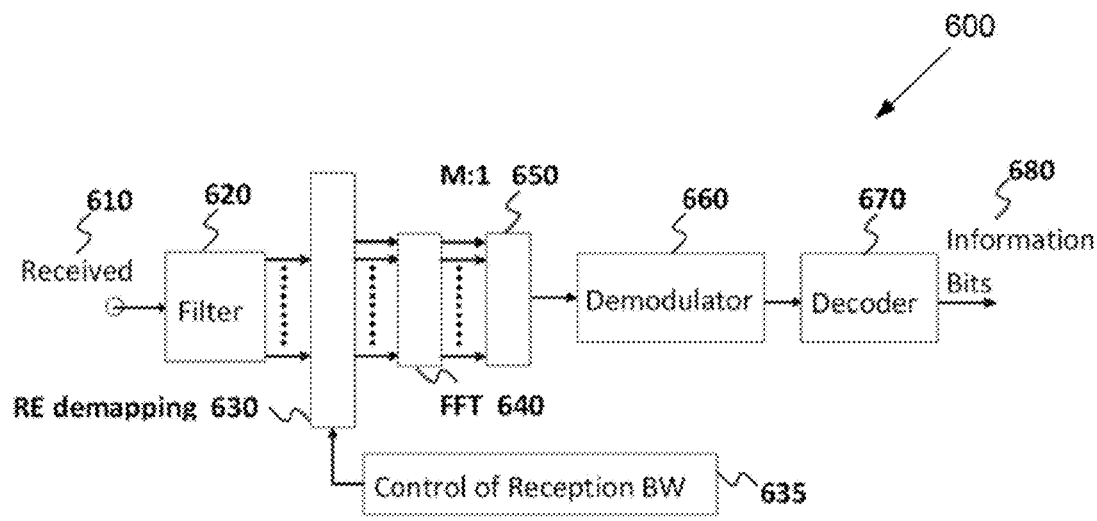
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. One or more of the components illustrated in FIG. 6 can be implemented in specialized circuitry configured to perform the noted functions or one or more of the components can be implemented by one or more processors executing instructions to perform the noted functions. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
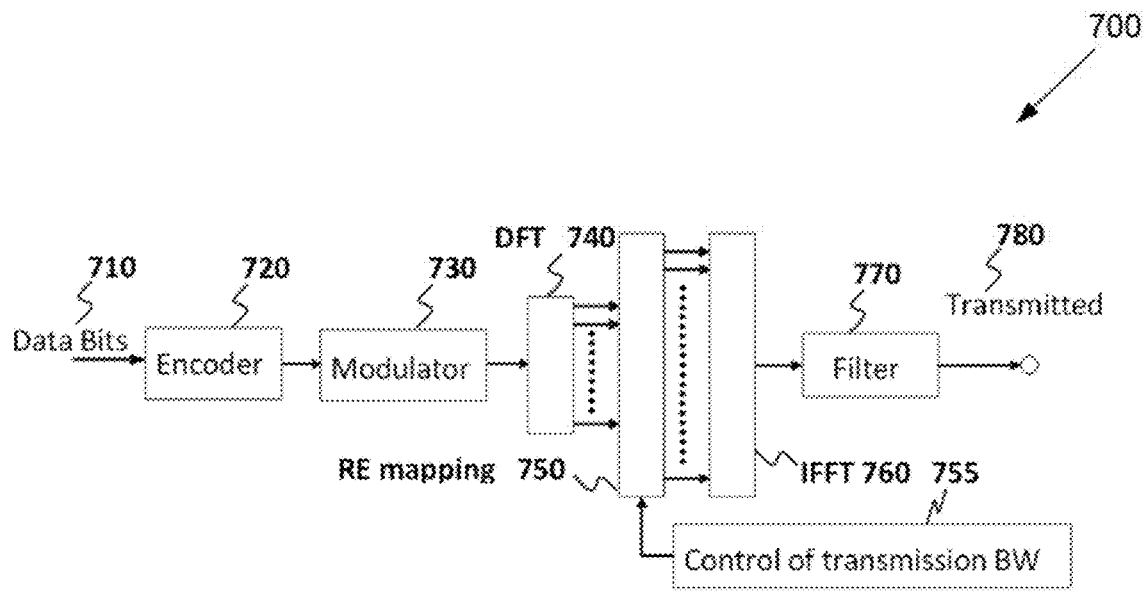
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. One or more of the components illustrated in FIG. 5 can be implemented in specialized circuitry configured to perform the noted functions or one or more of the components can be implemented by one or more processors executing instructions to perform the noted functions. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
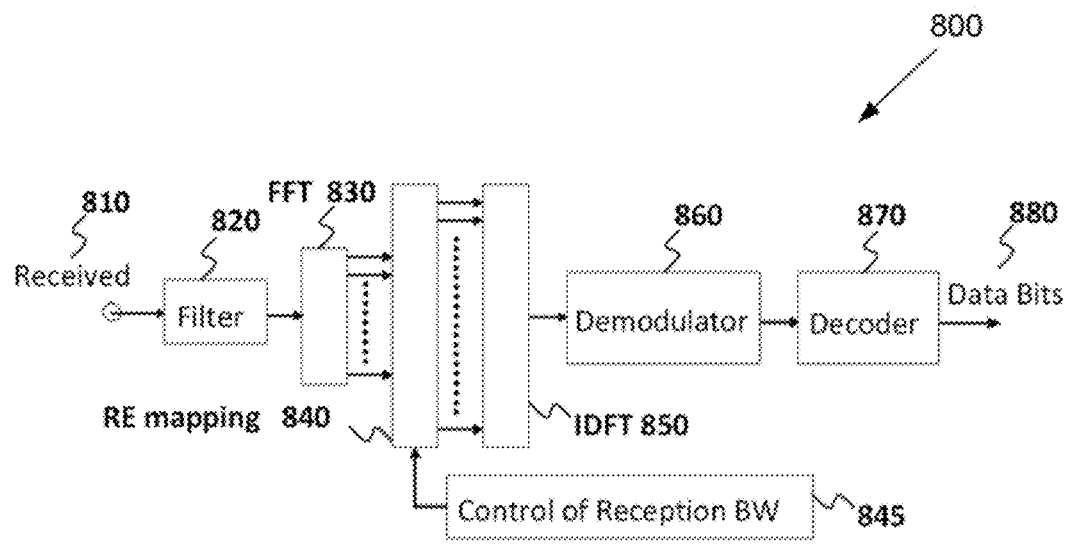
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. One or more of the components illustrated in FIG. 8 can be implemented in specialized circuitry configured to perform the noted functions or one or more of the components can be implemented by one or more processors executing instructions to perform the noted functions. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases have been identified and described; those use cases can be roughly categorized into three different groups. A first group is termed "enhanced mobile broadband (eMBB)," targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per $km^2$ with less stringent the reliability, data rate, and latency requirements.

Figure 9:
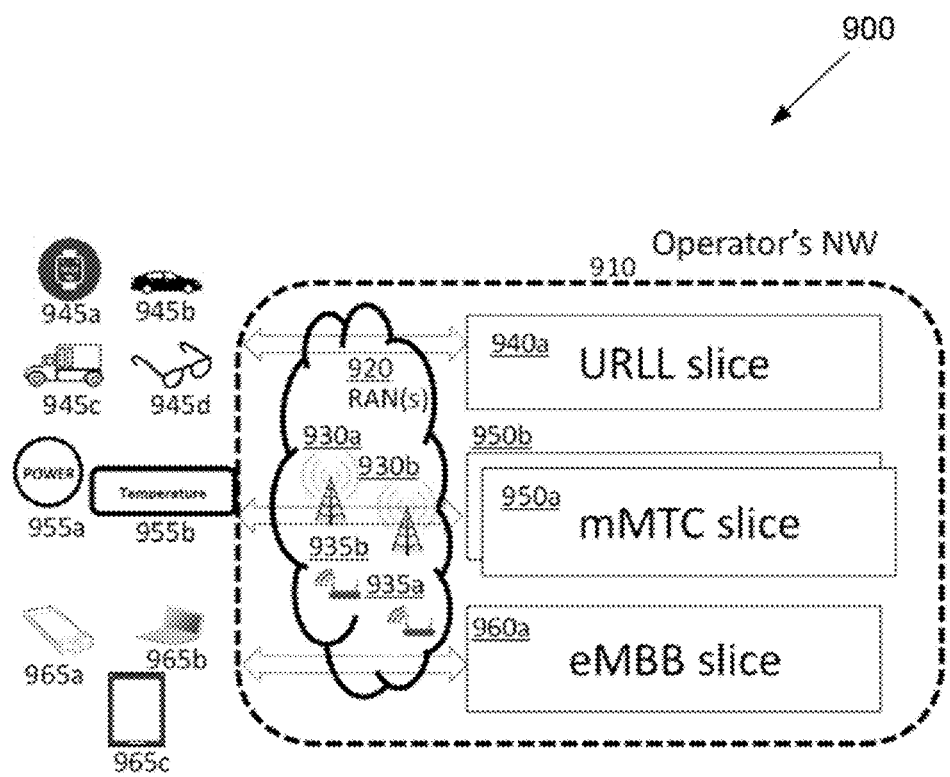
FIG. 9 illustrates an example network configuration according to embodiments of the present disclosure.

FIG. 9 illustrates an example network configuration 900 according to embodiments of the present disclosure. The embodiment of the network configuration 900 illustrated in FIG. 9 is for illustration only. FIG. 9 does not limit the scope of this disclosure to any particular implementation of the configuration 900.

In order for the 5G network to support such diverse services with different quality of services (QoS), one scheme has been identified in 3GPP specification, called network slicing.

As shown in FIG. 9, an operator's network 910 includes a number of radio access network(s) 920 (RAN(s)) that are associated with network devices such as gNBs 930a and 930b, small cell base stations (femto/pico gNBs or Wi-Fi access points) 935a and 935b. The network 910 can support various services, each represented as a slice.

In the example, an URLL slice 940a serves UEs requiring URLL services such as cars 945b, trucks 945c, smart watches 945a, and smart glasses 945d. Two mMTC slices 950a and 950b serve UEs requiring mMTC services such as power meters 955a, and temperature control box 955b. One eMBB slice 960a serves UEs requiring eMBB services such as cells phones 965a, laptops 965b, and tablets 965c. A device configured with two slices can also be envisioned.

To utilize PHY resources efficiently and multiplex various slices (with different resource allocation schemes, numerologies, and scheduling strategies) in DL-SCH, a flexible and self-contained frame or subframe design is utilized.

Figure 10:
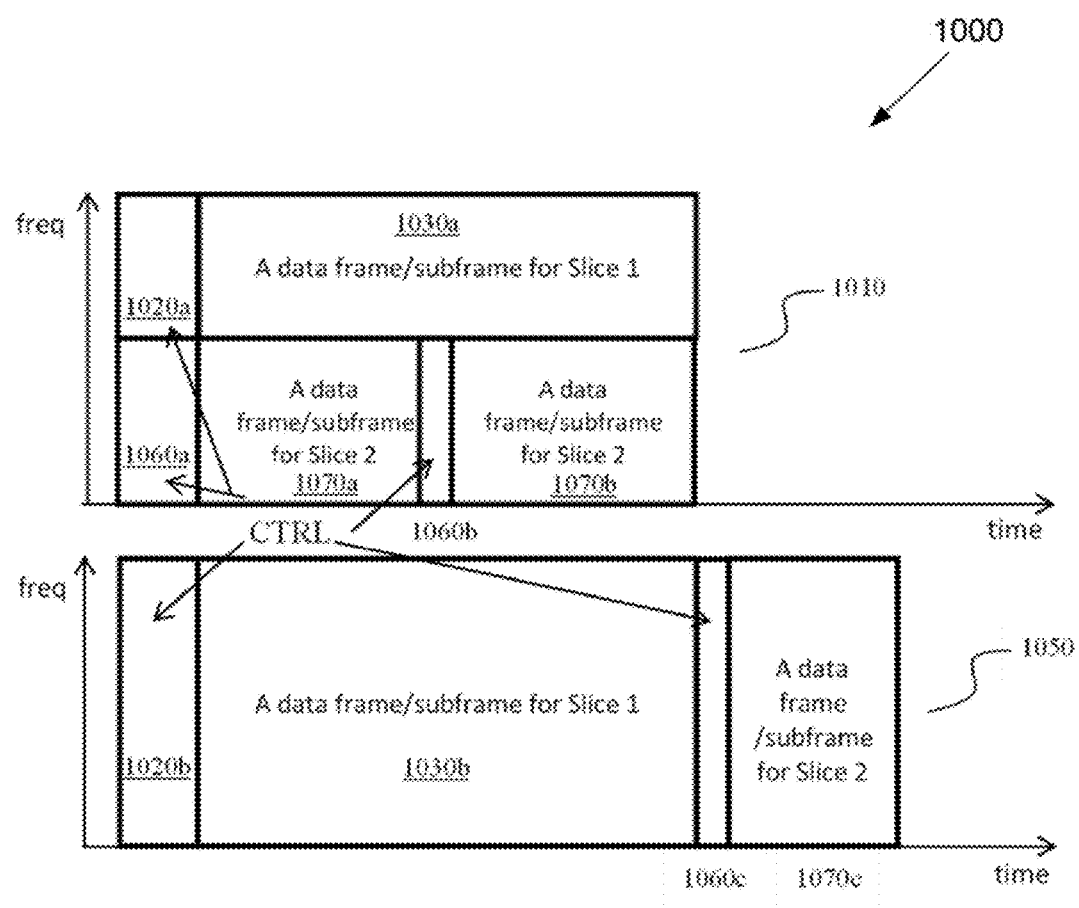
FIG. 10 illustrates an example multiplexing of two slices according to embodiments of the present disclosure.

FIG. 10 illustrates an example multiplexing of two slices 1000 according to embodiments of the present disclosure. The embodiment of the multiplexing of two slices 1000 illustrated in FIG. 10 is for illustration only. One or more of the components illustrated in FIG. 10 can be implemented in specialized circuitry configured to perform the noted functions or one or more of the components can be implemented by one or more processors executing instructions to perform the noted functions. FIG. 10 does not limit the scope of this disclosure to any particular implementation of the multiplexing of two slices 1000.

Two exemplary instances of multiplexing two slices within a common subframe or frame are depicted in FIG. 10. In these exemplary embodiments, a slice can be composed of one or two transmission instances where one transmission instance includes a control (CTRL) component (e.g., 1020a, 1060a, 1060b, 1020b, or 1060c) and a data component (e.g., 1030a, 1070a, 1070b, 1030b, or 1070c). In embodiment 1010, the two slices are multiplexed in frequency domain whereas in embodiment 1050, the two slices are multiplexed in time domain.

The 3GPP NR specification supports up to 32 CSI-RS antenna ports which enable a gNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 11:
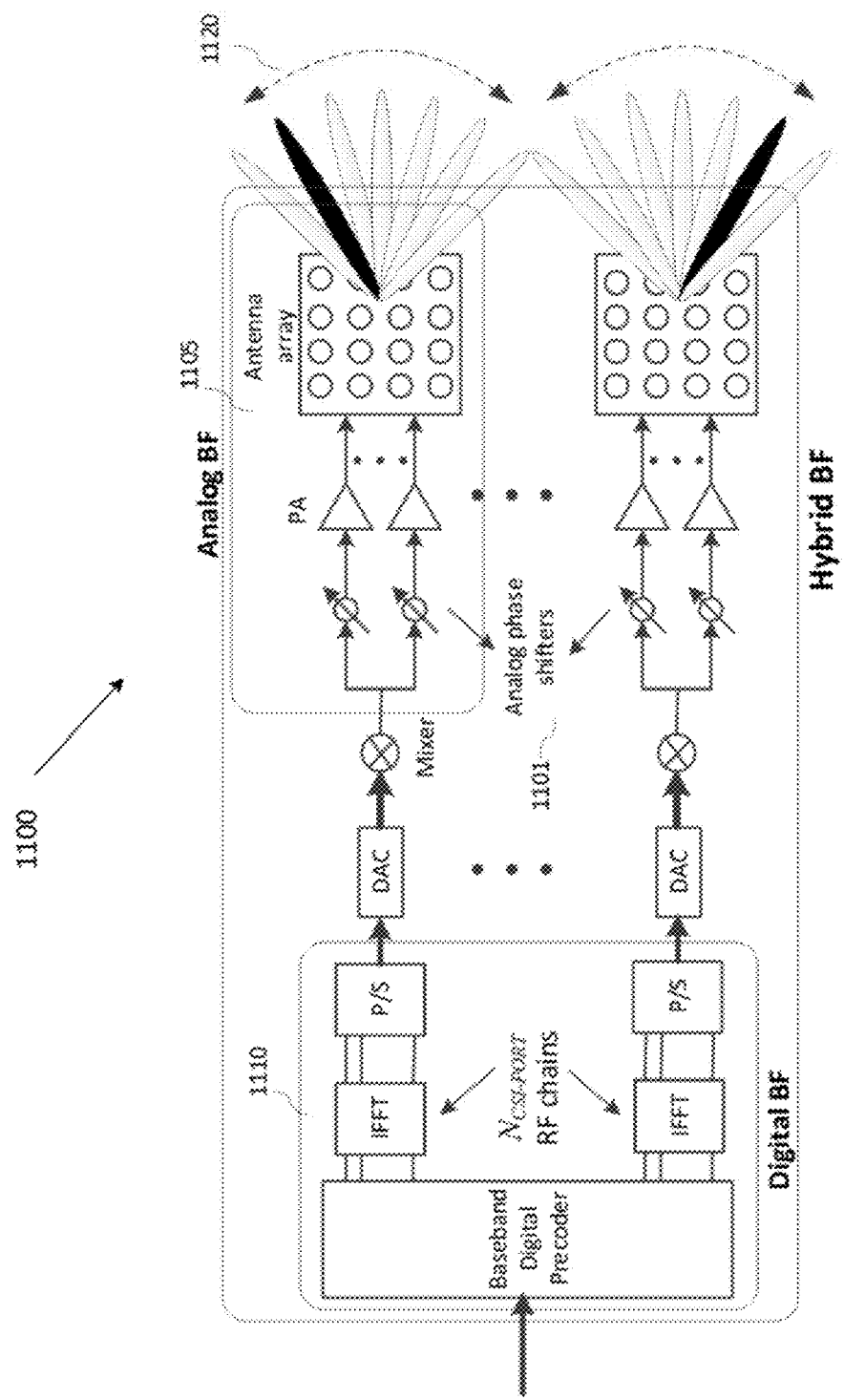
FIG. 11 illustrates an example antenna blocks or arrays forming beams according to embodiments of the present disclosure.

FIG. 11 illustrates an example antenna blocks or arrays 1100 according to embodiments of the present disclosure. The embodiment of the antenna blocks or arrays 1100 illustrated in FIG. 11 is for illustration only. FIG. 11 does not limit the scope of this disclosure to any particular implementation of the antenna blocks or arrays 1100.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 11. In this case, one CSI-RS port is mapped onto a large number of antenna elements which can be controlled by a bank of analog phase shifters 1101. One CSI-RS port can then correspond to one sub-array which produces a narrow analog beam through analog beamforming 1105. This analog beam can be configured to sweep across a wider range of angles (1120) by varying the phase shifter bank across symbols or subframes. The number of sub-arrays (equal to the number of RF chains) is the same as the number of CSI-RS ports $N_{CSI-PORT}$. A digital beamforming unit 1110 performs a linear combination across $N_{CSI-PORT}$ analog beams to further increase precoding gain. While analog beams are wideband (hence not frequency-selective), digital precoding can be varied across frequency sub-bands or resource blocks.

To enable digital precoding, efficient design of CSI-RS is a crucial factor. For this reason, three types of CSI reporting mechanisms corresponding to three types of CSI-RS measurement behavior are supported, for example, "CLASS A" CSI reporting which corresponds to non-precoded CSI-RS, "CLASS B" reporting with K=1 CSI-RS resource which corresponds to UE-specific beamformed CSI-RS, and "CLASS B" reporting with K>1 CSI-RS resources which corresponds to cell-specific beamformed CSI-RS.

For non-precoded (NP) CSI-RS, a cell-specific one-to-one mapping between CSI-RS port and TXRU is utilized. Different CSI-RS ports have the same wide beam width and direction and hence generally cell wide coverage. For beamformed CSI-RS, beamforming operation, either cell-specific or UE-specific, is applied on a non-zero-power (NZP) CSI-RS resource (e.g., comprising multiple ports). At least at a given time/frequency, CSI-RS ports have narrow beam widths and hence not cell wide coverage, and at least from the gNB perspective. At least some CSI-RS port-resource combinations have different beam directions.

In scenarios where DL long-term channel statistics can be measured through UL signals at a serving eNodeB, UE-specific BF CSI-RS can be readily used. This is typically feasible when UL-DL duplex distance is sufficiently small. When this condition does not hold, however, some UE feedback is necessary for the eNodeB to obtain an estimate of DL long-term channel statistics (or any of representation thereof). To facilitate such a procedure, a first BF CSI-RS transmitted with periodicity T1 (ms) and a second NP CSI-RS transmitted with periodicity T2 (ms), where T1≤T2. This approach is termed hybrid CSI-RS. The implementation of hybrid CSI-RS is largely dependent on the definition of CSI process and NZP CSI-RS resource.

In the 3GPP LTE specification, MIMO has been identified as an essential feature in order to achieve high system throughput requirements and it will continue to be the same in NR. One of the key components of a MIMO transmission scheme is the accurate CSI acquisition at the eNB (or TRP). For MU-MIMO, in particular, the availability of accurate CSI is necessary in order to guarantee high MU performance. For TDD systems, the CSI can be acquired using the SRS transmission relying on the channel reciprocity. For FDD systems, on the other hand, the CSI can be acquired using the CSI-RS transmission from the eNB, and CSI acquisition and feedback from the UE. In legacy FDD systems, the CSI feedback framework is 'implicit' in the form of CQI/PMI/RI derived from a codebook assuming SU transmission from the eNB. Because of the inherent SU assumption while deriving CSI, this implicit CSI feedback is inadequate for MU transmission. Since future (e.g., NR) systems are likely to be more MU-centric, this SU-MU CSI mismatch will be a bottleneck in achieving high MU performance gains. Another issue with implicit feedback is the scalability with larger number of antenna ports at the eNB. For large number of antenna ports, the codebook design for implicit feedback is quite complicated, and the designed codebook is not guaranteed to bring justifiable performance benefits in practical deployment scenarios (for example, only a small percentage gain can be shown at the most).

In 5G or NR systems, the above-mentioned CSI reporting paradigm from LTE is also supported and referred to as Type I CSI reporting. In addition to Type I, a high-resolution CSI reporting, referred to as Type II CSI reporting, is also supported to provide more accurate CSI information to gNB for use cases such as high-order MU-MIMO. The overhead of Type II CSI reporting can be an issue in practical UE implementations. One approach to reduce Type II CSI overhead is based on frequency domain (FD) compression. In Rel. 16 NR, DFT-based FD compression of the Type II CSI has been supported (referred to as Rel. 16 enhanced Type II codebook in REF8). Some of the key components for this feature includes (a) spatial domain (SD) basis $W_1$, (b) FD basis $W_f$, and (c) coefficients $\tilde{W}_2$ that linearly combine SD and FD basis. In a non-reciprocal FDD system, a complete CSI (comprising all components) needs to be reported by the UE. However, when reciprocity or partial reciprocity does exist between UL and DL, then some of the CSI components can be obtained based on the UL channel estimated using SRS transmission from the UE. In Rel. 16 NR, the DFT-based FD compression is extended to this partial reciprocity case (referred to as Rel. 16 enhanced Type II port selection codebook in REF8), wherein the DFT-based SD basis in $W_1$ is replaced with SD CSI-RS port selection, i.e., L out of $$\frac{P_{CSI-RS}}{2}$$

CSI-RS ports are selected (the selection is common for the two antenna polarizations or two halves of the CSI-RS ports). The CSI-RS ports in this case are beamformed in SD (assuming UL-DL channel reciprocity in angular domain), and the beamforming information can be obtained at the gNB based on UL channel estimated using SRS measurements.

It has been known in the literature that UL-DL channel reciprocity exists in both angular and delay domains if the UL-DL duplexing distance is small. Since delay in time domain transforms (or closely related to) basis vectors in frequency domain (FD), the Rel. 16 enhanced Type II port selection can be further extended to both angular and delay domains (or SD and FD). In particular, the DFT-based SD basis in $W_1$ and DFT-based FD basis in $W_f$ can be replaced with SD and FD port selection, i.e., L CSI-RS ports are selected in SD and/or M ports are selected in FD. The CSI-RS ports in this case are beamformed in SD (assuming UL-DL channel reciprocity in angular domain) and/or FD (assuming UL-DL channel reciprocity in delay/frequency domain), and the corresponding SD and/or FD beamforming information can be obtained at the gNB based on UL channel estimated using SRS measurements. This disclosure provides some of design components of such a codebook.

All the following components and embodiments are applicable for UL transmission with CP-OFDM (cyclic prefix OFDM) waveform as well as DFT-SOFDM (DFT-spread OFDM) and SC-FDMA (single-carrier FDMA) waveforms. Furthermore, all the following components and embodiments are applicable for UL transmission when the scheduling unit in time is either one subframe (which can consist of one or multiple slots) or one slot.

In the present disclosure, the frequency resolution (reporting granularity) and span (reporting bandwidth) of CSI reporting can be defined in terms of frequency "subbands" and "CSI reporting band" (CRB), respectively.

A subband for CSI reporting is defined as a set of contiguous PRBs which represents the smallest frequency unit for CSI reporting. The number of PRBs in a subband can be fixed for a given value of DL system bandwidth, configured either semi-statically via higher-layer/RRC signaling, or dynamically via L1 DL control signaling or MAC control element (MAC CE). The number of PRBs in a subband can be included in CSI reporting setting.

"CSI reporting band" is defined as a set/collection of subbands, either contiguous or non-contiguous, wherein CSI reporting is performed. For example, CSI reporting band can include all the subbands within the DL system bandwidth. This can also be termed "full-band". Alternatively, CSI reporting band can include only a collection of subbands within the DL system bandwidth. This can also be termed "partial band".

The term "CSI reporting band" is used only as an example for representing a function. Other terms such as "CSI reporting subband set" or "CSI reporting bandwidth" can also be used.

In terms of UE configuration, a UE can be configured with at least one CSI reporting band. This configuration can be semi-static (via higher-layer signaling or RRC) or dynamic (via MAC CE or L1 DL control signaling). When configured with multiple (N) CSI reporting bands (e.g., via RRC signaling), a UE can report CSI associated with n≤N CSI reporting bands. For instance, >6 GHz, large system bandwidth may require multiple CSI reporting bands. The value of n can either be configured semi-statically (via higher-layer signaling or RRC) or dynamically (via MAC CE or L1 DL control signaling). Alternatively, the UE can report a recommended value of n via an UL channel.

Therefore, CSI parameter frequency granularity can be defined per CSI reporting band as follows. A CSI parameter is configured with "single" reporting for the CSI reporting band with $M_n$ subbands when one CSI parameter for all the $M_n$ subbands within the CSI reporting band. A CSI parameter is configured with "subband" for the CSI reporting band with $M_n$ subbands when one CSI parameter is reported for each of the $M_n$ subbands within the CSI reporting band.

Figure 12:
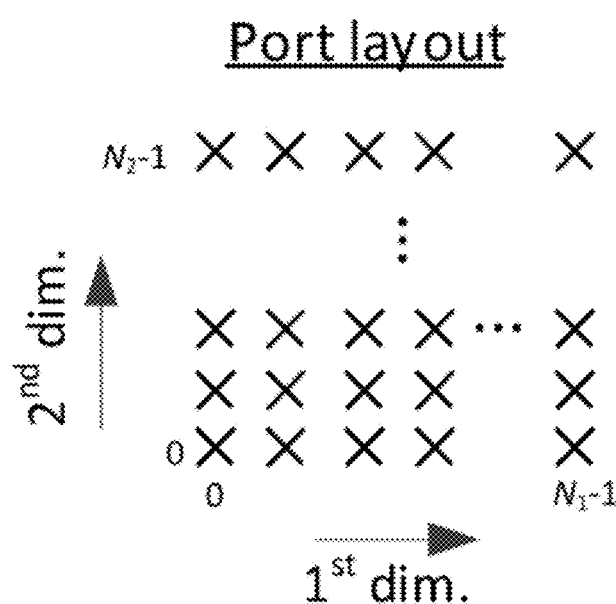
FIG. 12 illustrates an antenna port layout according to embodiments of the present disclosure.

FIG. 12 illustrates an example antenna port layout 1200 according to embodiments of the present disclosure. The embodiment of the antenna port layout 1200 illustrated in FIG. 12 is for illustration only. FIG. 12 does not limit the scope of this disclosure to any particular implementation of the antenna port layout 1200.

As illustrated in FIG. 12, $N_1$ and $N_2$ are the number of antenna ports with the same polarization in the first and second dimensions, respectively. For 2D antenna port layouts, $N_1>1$, $N_2>1$, and for 1D antenna port layouts $N_1>1$ and $N_2=1$. Therefore, for a dual-polarized antenna port layout, the total number of antenna ports is $2N_1N_2$.

As described in U.S. Pat. No. 10,659,118, issued May 19, 2020, and entitled "Method and Apparatus for Explicit CSI Reporting in Advanced Wireless Communication Systems," which is incorporated herein by reference in its entirety, a UE is configured with high-resolution (e.g., Type II) CSI reporting in which the linear combination based Type II CSI reporting framework is extended to include a frequency dimension in addition to the first and second antenna port dimensions.

Figure 13:
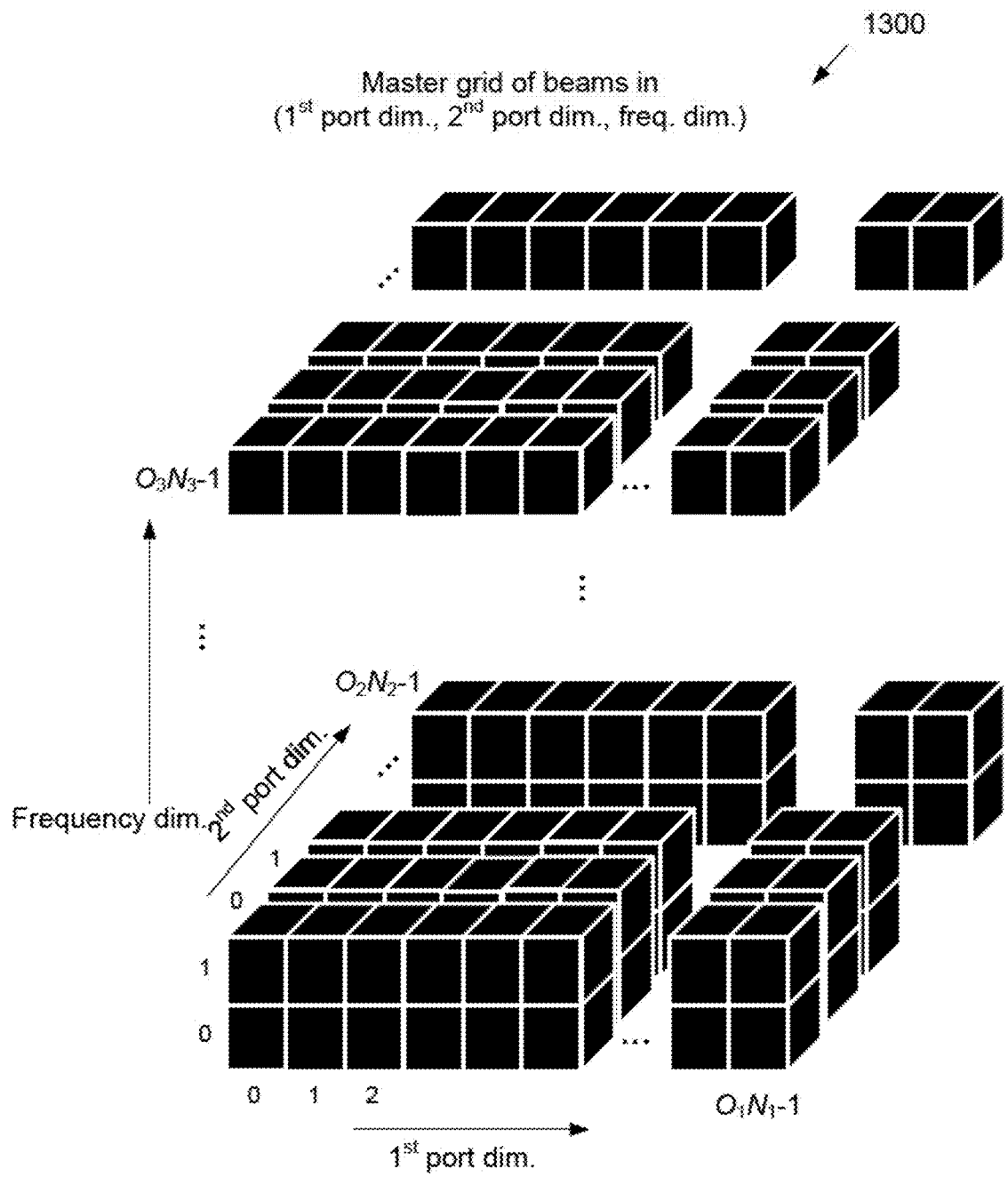
FIG. 13 illustrates a 3D grid of oversampled DFT beams according to embodiments of the present disclosure.

FIG. 13 illustrates a 3D grid 1300 of the oversampled DFT beams (1st port dim., 2nd port dim., freq. dim.) in which 1st dimension is associated with the 1st port dimension,
    2nd dimension is associated with the 2nd port dimension, and
    3rd dimension is associated with the frequency dimension.

The basis sets for $1^{st}$ and $2^{nd}$ port domain representation are oversampled DFT codebooks of length-$N_1$ and length-$N_2$, respectively, and with oversampling factors $O_1$ and $O_2$, respectively. Likewise, the basis set for frequency domain representation (i.e., 3rd dimension) is an oversampled DFT codebook of length-$N_3$ and with oversampling factor $O_3$. In one example, $O_1=O_2=O_3=4$. In another example, the oversampling factors $O_i$ belongs to {2, 4, 8}. In yet another example, at least one of $O_1$, $O_2$, and $O_3$ is higher layer configured (via RRC signaling).

As explained in Section 5.2.2.2.6 of REFS, a UE is configured with higher layer parameter codebookType set to 'typeII-PortSelection-r16' for an enhanced Type II CSI reporting in which the pre-coders for all SBs and for a given layer l=1, ..., v, where v is the associated RI value, is given by either $$W^l = AC_l B^H = [a_0 \ a_1 \ ... \ a_{L-1}] \quad \text{(Eq. 1)}$$

$$\begin{bmatrix} c_{l,0,0} & c_{l,0,1} & \cdots & c_{l,0,M-1} \\ c_{l,1,0} & c_{l,1,1} & \cdots & c_{l,1,M-1} \\ \vdots & \vdots & \vdots & \vdots \\ c_{l,L-1,0} & c_{l,L-1,1} & \cdots & c_{l,L-1,M-1} \end{bmatrix} [b_0 \ b_1 \ ... \ b_{M-1}]^H =$$

$$\sum_{f=0}^{M-1} \sum_{k=0}^{L-1} c_{l,i,f}(a_i b_f^H) = \sum_{k=0}^{L-1} \sum_{f=0}^{M-1} c_{l,i,f}(a_i b_f^H),$$

or $$W^l = \begin{bmatrix} A & 0 \\ 0 & A \end{bmatrix} C_l B^H = \begin{bmatrix} a_0 \ a_1 \ ... \ a_{L-1} & 0 \\ 0 & a_0 \ a_1 \ ... \ a_{L-1} \end{bmatrix} \quad \text{(Eq. 2)}$$

$$\begin{bmatrix} c_{l,0,0} & c_{l,0,1} & \cdots & c_{l,0,M-1} \\ c_{l,1,0} & c_{l,1,1} & \cdots & c_{l,1,M-1} \\ \vdots & \vdots & \vdots & \vdots \\ c_{l,L-1,0} & c_{l,L-1,1} & \cdots & c_{l,L-1,M-1} \end{bmatrix} [b_0 \ b_1 \ ... \ b_{M-1}]^H =$$

$$\begin{bmatrix} \sum_{f=0}^{M-1} \sum_{k=0}^{L-1} c_{l,i,f}(a_i b_f^H) \\ \sum_{f=0}^{M-1} \sum_{k=0}^{L-1} c_{l,i+L,f}(a_i b_f^H) \end{bmatrix},$$

where $N_1$ is a number of antenna ports in a first antenna port dimension (having the same antenna polarization), $N_2$ is a number of antenna ports in a second antenna port dimension (having the same antenna polarization), $P_{CSI-RS}$ is a number of CSI-RS ports configured to the UE, $N_3$ is a number of SBs for PMI reporting or number of FD units or number of FD components (that comprise the CSI reporting band) or a total number of precoding matrices indicated by the PMI (one for each FD unit/component), $a_i$ is a $2N_1N_2 \times 1$ (Eq. 1) or $N_1N_2 \times 1$ (Eq. 2) column vector, and $a_i$ is a $N_1N_2 \times 1$ or $$\frac{P_{CSIRS}}{2} \times 1$$

port selection column vector if antenna ports at the gNB are co-polarized, and is a $2N_1N_2 \times 1$ or $P_{CSIRS} \times 1$ port selection column vector if antenna ports at the gNB are dual-polarized or cross-polarized, where a port selection vector is a defined as a vector which contains a value of 1 in one element and zeros elsewhere, and $P_{CSIRS}$ is the number of CSI-RS ports configured for CSI reporting, $b_f$ is a $N_3 \times 1$ column vector, $c_{l,i,f}$ is a complex coefficient associate with vectors $a_1$ and $b_f$.

In a variation, when the UE reports a subset K<2LM coefficients (where K is either fixed, configured by the gNB or reported by the UE), then the coefficient $c_{l,i,f}$ in precoder equations Eq. 1 or Eq. 2 is replaced with $x_{l,i,f} \times c_{l,i,f}$ where $x_{l,i,f}=1$ if the coefficient $c_{l,i,f}$ is reported by the UE according to some embodiments of this invention.

$x_{l,i,f}=0$ otherwise (i.e., $c_{l,i,f}$ is not reported by the UE).

The indication whether $x_{l,i,f}=1$ or 0 is according to some embodiments of this invention. For example, it can be via a bitmap.

In a variation, the precoder equations Eq. 1 or Eq. 2 are respectively generalized to $$W^l = \sum_{i=0}^{L-1} \sum_{f=0}^{M_i-1} c_{l,i,f}(a_i b_{i,f}^H) \quad \text{(Eq. 3)}$$

and $$W^l = \begin{bmatrix} \sum_{i=0}^{L-1} \sum_{f=0}^{M_i-1} c_{l,i,f}(a_i b_{i,f}^H) \\ \sum_{i=0}^{L-1} \sum_{f=0}^{M_i-1} c_{l,i+L,f}(a_i b_{i,f}^H) \end{bmatrix}, \quad \text{(Eq. 4)}$$

where for a given i, the number of basis vectors is $M_i$ and the corresponding basis vectors are $\{b_{i,f}\}$. Note that $M_i$ is the number of coefficients $c_{l,i,f}$ reported by the UE for a given i, where $M_i \leq M$ (where $\{M_i\}$ or $\Sigma M_i$ is either fixed, configured by the gNB or reported by the UE).

The columns of $W^l$ are normalized to norm one. For rank R or R layers ($\upsilon=R$), the pre-coding matrix is given by $$W^{(R)} = \frac{1}{\sqrt{R}}[W^1 \; W^2 \; \ldots \; W^R].$$

Eq. 2 is assumed in the rest of the disclosure. The embodiments of the disclosure, however, are general and are also application to Eq. 1, Eq. 3 and Eq. 4.

Here $$L \leq \frac{P_{CSI-RS}}{2}$$

and $M \leq N_3$. If $$L = \frac{P_{CSI-RS}}{2},$$

then A is an identity matrix, and hence not reported. Likewise, if $M=N_3$, then B is an identity matrix, and hence not reported. Assuming $M<N_3$, in an example, to report columns of B, the oversampled DFT codebook is used. For instance, $b_f=w_f$, where the quantity $w_f$ is given by $$w_f = \begin{bmatrix} 1 & e^{j\frac{2\pi n_{3,l}^{(f)}}{O_3 N_3}} & e^{j\frac{2\pi \cdot 2n_{3,l}^{(f)}}{O_3 N_3}} & \ldots & e^{j\frac{2\pi \cdot (N_3-1)n_{3,l}^{(f)}}{O_3 N_3}} \end{bmatrix}^T.$$

When $O_3=1$, the FD basis vector for layer $l \in \{1, \ldots, \upsilon\}$ (where $\upsilon$ is the RI or rank value) is given by $$w_f = [y_{0,l}^{(f)} y_{1,l}^{(f)} \ldots y_{N_3-1,l}^{(f)}]^T,$$

where $$y_{t,l}^{(f)} = e^{j\frac{2\pi t n_{3,l}^{(f)}}{N_3}}$$

and $n_{3,l} = [n_{3,l}^{(0)}, \ldots, n_{3,l}^{(M-1)}]$ where $n_{3,l}^{(f)} \in \{0, 1, \ldots, N_3-1\}$.

In another example, discrete cosine transform DCT basis is used to construct/report basis B for the $3^{rd}$ dimension. The m-th column of the DCT compression matrix is simply given by $$[W_f]_{nm} = \begin{cases} \frac{1}{\sqrt{K}}, & n=0 \\ \sqrt{\frac{2}{K}} \cos\frac{\pi(2m+1)n}{2K}, & n=1, \ldots K-1 \end{cases},$$

and $K=N_3$, and $m=0, \ldots, N_3-1$.

Since DCT is applied to real valued coefficients, the DCT is applied to the real and imaginary components (of the channel or channel eigenvectors) separately. Alternatively, the DCT is applied to the magnitude and phase components (of the channel or channel eigenvectors) separately. The use of DFT or DCT basis is for illustration purpose only. The disclosure is applicable to any other basis vectors to construct/report A and B.

On a high level, a precoder $W^l$ can be described as follows.

$$W = A_l C_l B_l^H = W_1 \widetilde{W}_2 W_f^H, \quad (5)$$

where $A=W_1$ corresponds to the Rel. 15 $W_1$ in Type II CSI codebook [REF8], and $B=W_f$.

The $C_f = \widetilde{W}_2$ matrix consists of all the required linear combination coefficients (e.g., amplitude and phase or real or imaginary). Each reported coefficient ($c_{l,i,f}=p_{l,i,f}\phi_{l,i,f}$) in $\widetilde{W}_2$ is quantized as amplitude coefficient ($p_{l,i,f}$) and phase coefficient ($\phi_{l,i,f}$). In one example, the amplitude coefficient ($p_{l,i,f}$) is reported using a A-bit amplitude codebook where A belongs to {2, 3, 4}. If multiple values for A are supported, then one value is configured via higher layer signaling. In another example, the amplitude coefficient ($p_{l,i,f}$) is reported as $p_{l,i,f}=p_{l,i,f}^{(1)}p_{l,i,f}^{(2)}$ where $p_{l,i,f}^{(1)}$ is a reference or first amplitude which is reported using a A1-bit amplitude codebook where A1 belongs to {2, 3, 4}, and $p_{l,i,f}^{(2)}$ is a differential or second amplitude which is reported using a A2-bit amplitude codebook where A2≤A1 belongs to {2, 3, 4}.

For layer l, let us denote the linear combination (LC) coefficient associated with spatial domain (SD) basis vector (or beam) i∈{0, 1, . . . , 2L−1} and frequency domain (FD) basis vector (or beam) f∈{0, 1, . . . , M−1} as $c_{l,i,f}$, and the strongest coefficient as $c_{l,i^*,f^*}$. The strongest coefficient is reported out of the $K_{NZ}$ non-zero (NZ) coefficients that is reported using a bitmap, where $K_{NZ} \leq K_0 = \lceil \beta \times 2LM \rceil < 2LM$ and β is higher layer configured. The remaining $2LM-K_{NZ}$ coefficients that are not reported by the UE are assumed to be zero. The following quantization scheme is used to quantize/report the $K_{NZ}$ NZ coefficients.

The UE reports the following for the quantization of the NZ coefficients in $\tilde{W}_2$ A X-bit indicator for the strongest coefficient index (i*, f*), where $X = \lceil \log_2 K_{NZ} \rceil$ or $\lceil \log_2 2L \rceil$.
  Strongest coefficient $c_{l,i^*,f^*}=1$ (hence its amplitude/phase are not reported)
Two antenna polarization-specific reference amplitudes is used.
  For the polarization associated with the strongest coefficient $c_{l,i^*,f^*}=1$, since the reference amplitude $p_{l,i,f}^{(1)}=1$, it is not reported
  For the other polarization, reference amplitude $p_{l,i,f}^{(1)}$ is quantized to 4 bits
  The 4-bit amplitude alphabet is $$\left\{1, \left(\frac{1}{2}\right)^{\frac{1}{4}}, \left(\frac{1}{4}\right)^{\frac{1}{4}}, \left(\frac{1}{8}\right)^{\frac{1}{4}}, \ldots, \left(\frac{1}{2^{14}}\right)^{\frac{1}{4}}\right\}.$$

For $\{c_{l,i,f}, (i,f) \neq (i^*, f^*)\}$:
  For each polarization, differential amplitudes $p_{l,i,f}^{(2)}$ of the coefficients calculated relative to the associated polarization-specific reference amplitude and quantized to 3 bits
  The 3-bit amplitude alphabet is $$\left\{1, \frac{1}{\sqrt{2}}, \frac{1}{2}, \frac{1}{2\sqrt{2}}, \frac{1}{4}, \frac{1}{4\sqrt{2}}, \frac{1}{8}, \frac{1}{8\sqrt{2}}\right\}.$$

Note: The final quantized amplitude $p_{l,i,f}$ is given by $p_{l,i,f}^{(1)} \times p_{l,i,f}^{(2)}$
Each phase is quantized to either 8 PSK ($N_{ph}=8$) or 16 PSK ($N_{ph}=16$) (which is configurable).
For the polarization $r^* \in \{0, 1\}$ associated with the strongest coefficient $c_{l,i^*,f^*}$, we have $$r^* = \left\lfloor \frac{i^*}{L} \right\rfloor$$

and the reference amplitude $p_{l,i,f}^{(1)}=p_{l,r^*}^{(1)}=1$. For the other polarization $r \in \{0, 1\}$ and $r \neq r^*$, we have $$r = \left(\left\lfloor \frac{i^*}{L} \right\rfloor + 1\right)$$

mod 2 and the reference amplitude $p_{l,i,f}^{(1)}=p_{l,r}^{(1)}$ is quantized (reported) using the 4-bit amplitude codebook mentioned above.

A UE can be configured to report M FD basis vectors. In one example, $$M = \left\lceil p \times \frac{N_3}{R} \right\rceil,$$

where R is higher-layer configured from {1, 2} and p is higher-layer configured from $$\left\{\frac{1}{4}, \frac{1}{2}\right\}.$$

In one example, the p value is higher-layer configured for rank 1-2 CSI reporting. For rank >2 (e.g., rank 3-4), the p value (denoted by $\upsilon_0$) can be different. In one example, for rank 1-4, (p, $\upsilon_0$) is jointly configured from $$\left\{\left(\frac{1}{2}, \frac{1}{4}\right), \left(\frac{1}{4}, \frac{1}{4}\right), \left(\frac{1}{4}, \frac{1}{8}\right)\right\},$$

i.e., $$M = \left\lceil p \times \frac{N_3}{R} \right\rceil$$

for rank 1-2 and $$M = \left\lceil \upsilon_0 \times \frac{N_3}{R} \right\rceil$$

for rank 3-4. In one example, $N_3=N_{SB} \times R$ where $N_{SB}$ is the number of SBs for CQI reporting. In the rest of the disclosure, M is replaced with $M_\upsilon$ to show its dependence on the rank value υ, hence p is replaced with $p_\upsilon$, $\upsilon \in \{1, 2\}$ and $\upsilon_0$ is replaced with $p_\upsilon$, $\upsilon \in \{3, 4\}$.

A UE can be configured to report $M_\upsilon$ FD basis vectors in one-step from $N_3$ basis vectors freely (independently) for each layer l∈{0, 1, . . . , ν−1} of a rank ν CSI reporting. Alternatively, a UE can be configured to report $M_\upsilon$ FD basis vectors in two-step as follows.
  In step 1, an intermediate set (InS) comprising $N_3' < N_3$ basis vectors is selected/reported, wherein the InS is common for all layers.
  In step 2, for each layer l∈{0, 1, . . . , ν−1} of a rank ν CSI reporting, M FD basis vectors are selected/reported freely (independently) from $N_3'$ basis vectors in the InS.

In one example, one-step method is used when $N_3 \leq 19$ and two-step method is used when $N_3 > 19$. In one example, $N_3' = \lceil \alpha M \rceil$ where α>1 is either fixed (to 2 for example) or configurable.

The codebook parameters used in the DFT based frequency domain compression (eq. 5) are (L, $p_\upsilon$ for $\upsilon \in \{1, 2\}$, $p_\upsilon$ for $\upsilon \in \{3, 4\}$, $\beta$, $\alpha$, $N_{ph}$). In one example, the set of values for these codebook parameters are as follows.

L: the set of values is $\{2, 4\}$ in general, except $L \in \{2, 4, 6\}$ for rank 1-2, 32 CSI-RS antenna ports, and R=1.
($p_\upsilon$ for $\upsilon \in \{1, 2\}$, $p_\upsilon$ for $\upsilon \in \{3, 4\}$)

$$\in \left\{ \left(\frac{1}{2}, \frac{1}{4}\right), \left(\frac{1}{4}, \frac{1}{4}\right), \left(\frac{1}{4}, \frac{1}{8}\right) \right\}.$$

$$\beta \in \left\{\frac{1}{4}, \frac{1}{2}, \frac{3}{4}\right\}.$$

$\alpha \in \{1.5, 2, 2.5, 3\}$ $N_{ph} \in \{8, 16\}$.

In another example, the set of values for these codebook parameters are as follows: $\alpha = 2$, $N_{ph} = 16$, and

| L | p = y$_0$ (RI = 1-2) | p = v$_0$ (RI = 3-4) | $\beta$ | Restriction (if any) |
|---|---|---|---|---|
| 2 | 1/4 | 1/8 | 1/4 | |
| 2 | 1/4 | 1/8 | 1/2 | |
| 4 | 1/4 | 1/8 | 1/4 | |
| 4 | 1/4 | 1/8 | 1/2 | |
| 4 | 1/2 | 1/4 | 1/2 | |
| 6 | 1/4 | — | 1/2 | RI = 1-2, 32 ports |
| 4 | 1/4 | 1/4 | 3/4 | |
| 6 | 1/4 | — | 3/4 | RI = 1-2, 32 ports |

In another example, the set of values for these codebook parameters are as follows: $\alpha = 2$, $N_{ph} = 16$, and as in Table 1, where the values of L, $\beta$ and $p_\upsilon$ are determined by the higher layer parameter pararnCombination-r17. In one example, the UE is not expected to be configured with pararnCombination-r17 equal to 3, 4, 5, 6, 7, or 8 when $P_{CSI-RS} = 4$, 7 or 8 when number of CSI-RS ports $P_{CSI-RS} < 32$, 7 or 8 when higher layer parameter typeII-RI-Restriction-r17 is configured with $r_i = 1$ for any $i > 1$, 7 or 8 when R=2.

The bitmap parameter typeII-RI-Restriction-r17 forms the bit sequence $r_3, r_2, r_1, r_0$ where $r_0$ is the LSB and $r_3$ is the MSB. When $r_i$ is zero, $i \in \{0, 1, \ldots, 3\}$, PMI and RI reporting are not allowed to correspond to any precoder associated with $\upsilon = i+1$ layers. The parameter R is configured with the higher-layer parameter nurnberOfPMISubbandsPerCQI-Subband-r17. This parameter controls the total number of precoding matrices $N_3$ indicated by the PMI as a function of the number of subbands in csi-ReportingBand, the subband size configured by the higher-level parameter subbandSize and of the total number of PRB s in the bandwidth part.

TABLE 1

| paramCombination-r17 | L | $p_v$ $v \in \{1, 2\}$ | $p_v$ $v \in \{3, 4\}$ | $\beta$ |
|---|---|---|---|---|
| 1 | 2 | 1/4 | 1/8 | 1/4 |
| 2 | 2 | 1/4 | 1/8 | 1/2 |
| 3 | 4 | 1/4 | 1/8 | 1/4 |
| 4 | 4 | 1/4 | 1/8 | 1/2 |

TABLE 1-continued

| paramCombination-r17 | L | $p_v$ $v \in \{1, 2\}$ | $p_v$ $v \in \{3, 4\}$ | $\beta$ |
|---|---|---|---|---|
| 5 | 4 | 1/4 | 1/4 | 3/4 |
| 6 | 4 | 1/2 | 1/4 | 1/2 |
| 7 | 6 | 1/4 | — | 1/2 |
| 8 | 6 | 1/4 | — | 3/4 |

The above-mentioned framework (equation 5) represents the precoding-matrices for multiple ($N_3$) FD units using a linear combination (double sum) over 2 L SD beams and $M_\upsilon$ FD beams. This framework can also be used to represent the precoding-matrices in time domain (TD) by replacing the FD basis matrix $W_f$ with a TD basis matrix $W_t$, wherein the columns of $W_t$ comprises $M_\upsilon$ TD beams that represent some form of delays or channel tap locations. Hence, a precoder $W^l$ can be described as follows.

$$W = A_l C_l B_l^H = W_1 \widetilde{W}_2 W_t^H, \quad \text{(equation 5A)}$$

In one example, the $M_\upsilon$ TD beams (representing delays or channel tap locations) are selected from a set of $N_3$ TD beams, i.e., $N_3$ corresponds to the maximum number of TD units, where each TD unit corresponds to a delay or channel tap location. In one example, a TD beam corresponds to a single delay or channel tap location. In another example, a TD beam corresponds to multiple delays or channel tap locations. In another example, a TD beam corresponds to a combination of multiple delays or channel tap locations.

The rest of disclosure is applicable to both space-frequency (equation 5) and space-time (equation 5A) frameworks.

In general, for layer $l = 1, \ldots, \upsilon$, where $\upsilon$ is the rank value reported via RI, the pre-coder (cf. equation 5 and equation 5A) includes some of or all of the codebook components summarized in Table 2.

TABLE 2

| | Codebook components | |
|---|---|---|
| Index | Components | Description |
| 0 | L | number of SD beams |
| 1 | $M_v$ | number of FD/TD beams |
| 2 | $\{a_i\}_{i=0}^{L-1}$ | set of SD beams comprising columns of $A_l$ |
| 3 | $\{b_{l,f}\}_{f=0}^{M_v-1}$ | set of FD/TD beams comprising columns of $B_l$ |
| 4 | $\{x_{l,i,f}\}$ | bitmap indicating the indices of the non-zero (NZ) coefficients |
| 5 | $SCI_l$ | Strongest coefficient indicator for layer l |
| 6 | $\{p_{l,i,f}\}$ | amplitudes of NZ coefficients indicated via the bitmap |
| 7 | $\{\phi_{l,i,f}\}$ | phases of NZ coefficients indicated via the bitmap |

Let $P_{CSIRS,SD}$ and $P_{CSIRS,FD}$ be number of CSI-RS ports in SD and FD, respectively. The total number of CSI-RS ports is $P_{CSIRS,SD} \times P_{CSIRS,FD} = P_{CSIRS}$. Each CSI-RS port can be beam-formed/pre-coded using a pre-coding/beam-forming vector in SD or FD or both SD and FD. The pre-coding/beam-forming vector for each CSI-RS port can be derived based on UL channel estimation via SRS, assuming (partial) reciprocity between DL and UL channels. Since CSI-RS ports can be beam-formed in SD as well as FD, the Rel. 15/16 Type II port selection codebook can be extended to perform port selection in both SD and FD followed by linear combination of the selected ports. In the rest of the disclosure, some details pertaining to the port selection codebook for this extension are provided.

In the rest of disclosure, the terms 'beam' and 'port' are used interchangeably and they refer to the same component of the codebook. For brevity, beam/port or port/beam is used in this disclosure.

In one embodiment A.1, a UE is configured with higher layer parameter codebookType set to 'typeII-PortSelection-r17' for CSI reporting based on a new (Rel. 17) Type II port selection codebook in which the port selection (which is in SD) in Rel. 15/16 Type II port selection codebook is extended to FD in addition to SD. The UE is also configured with $P_{CSIRS}$ CSI-RS ports (either in one CSI-RS resource or distributed across more than one CSI-RS resources) linked with the CSI reporting based on this new Type II port selection codebook. In one example, $P_{CSIRS}$=Q In another example, $P_{CSIRS} \geq Q$. Here, $Q=P_{CSIRS,SD} \times P_{CSIRS,FD}$ The CSI-RS ports can be beamformed in SD or/and FD. The UE measures $P_{CSIRS}$ (or at least Q) CSI-RS ports, estimates (beam-formed) DL channel, and determines a precoding matrix indicator (PMI) using the new port selection codebook, wherein the PMI indicates a set of components S that can be used at the gNB to construct precoding matrices for each FD unit t∈ {0, 1, . . . , $N_3$–1} (together with the beamforming used to beamformed CSI-RS). In one example, $P_{CSIRS,SD} \in \{4, 8, 12, 16, 32\}$ or $\{2, 4, 8, 12, 16, 32\}$. In one example, $P_{CSIRS,SD}$ and $P_{CSIRS,FD}$ are such that their product $Q=P_{CSIRS,SD} \times P_{CSIRS,FD} \in \{4, 8, 12, 16, 32\}$ or $\{2, 4, 8, 12, 16, 32\}$.

Figure 14:
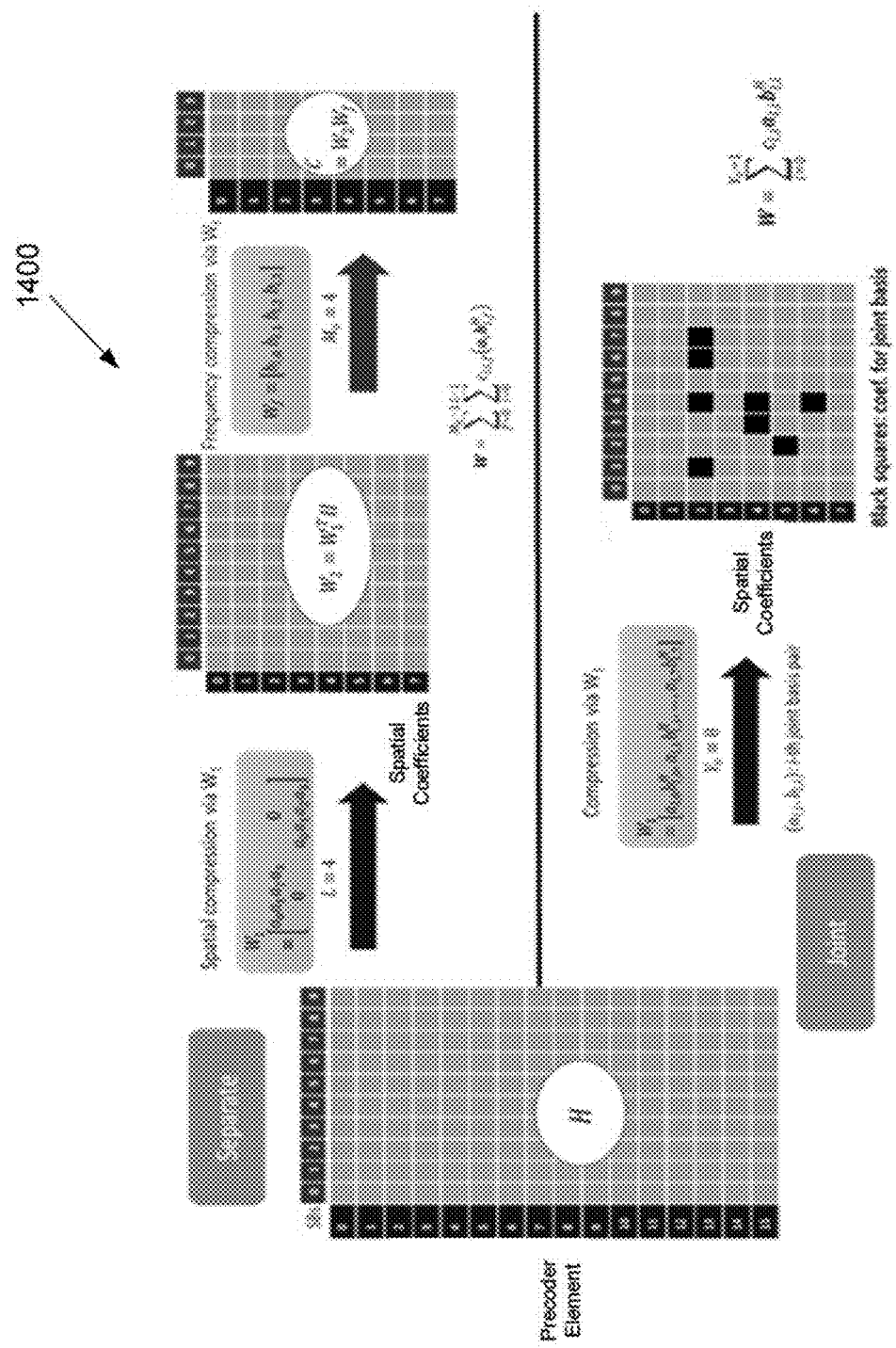
FIG. 14 illustrates an example of a port selection codebook that facilitates independent (separate) port selection across SD and FD, and that also facilitates joint port selection across SD and FD according to embodiments of the present disclosure.

FIG. 14 illustrates an example of a new port selection codebook that facilitates independent (separate) port selection across SD and FD, and that also facilitates joint port selection across SD and FD 1400 according to embodiments of the disclosure. The embodiment of a new port selection codebook that facilitates independent (separate) port selection across SD and FD, and that also facilitates joint port selection across SD and FD 1400 illustrated in FIG. 14 is for illustration only. FIG. 14 does not limit the scope of this disclosure to any particular implementation of the example of a new port selection codebook that facilitates independent (separate) port selection across SD and FD, and that also facilitates joint port selection across SD and FD 1400.

The new port selection codebook facilitates independent (separate) port selection across SD and FD. This is illustrated in the top part of FIG. 14.

For layer l=1, . . . , υ, where υ is the rank value reported via RI, the pre-coder (cf. equation 5 and equation 5A) includes the codebook components (indicated via PMI) summarized in Table 3. The parameters L and $M_l$ are either fixed or configured (e.g., via RRC).

TABLE 3

Codebook components

| Index | Components | Description |
|---|---|---|
| 0 | $\{a_i\}_{i=0}^{L-1}$ | set of SD beams/ports comprising columns of $A_l$ |
| 1 | $\{b_{l,f}\}_{f=0}^{M_v-1}$ | set of FD/TD beams/ports comprising columns of $B_l$ |
| 2 | $\{x_{l,i,f}\}$ | bitmap indicating the indices of the non-zero (NZ) coefficients |
| 3 | $SCI_l$ | an indicator indicating an index $(i_l^*, f_l^*)$ of the strongest coefficient for layer l |
| 4 | $p_{l,r}^{(1)}$ | reference amplitude |
| 5 | $\{p_{l,i,f}\}$ | amplitudes of NZ coefficients indicated via the bitmap |
| 6 | $\{\phi_{l,i,f}\}$ | phases of NZ coefficients indicated via the bitmap |

In one embodiment A.2, a UE is configured with higher layer parameter codebookType set to 'typeII-PortSelection-r17' for CSI reporting based on a new (Rel. 17) Type II port selection codebook in which the port selection (which is in SD) in Rel. 15/16 Type II port selection codebook is extended to FD in addition to SD. The UE is also configured with $P_{CSIRS}$ CSI-RS ports (either in one CSI-RS resource or distributed across more than one CSI-RS resources) linked with the CSI reporting based on this new Type II port selection codebook. In one example, $P_{CSIRS}$=Q. In another example, $P_{CSIRS} \geq Q$ Here, $Q=P_{CSIRS,SD} \times P_{CSIRS,FD}$. The CSI-RS ports can be beamformed in SD or/and FD. The UE measures $P_{CSIRS}$ (or at least Q) CSI-RS ports, estimates (beam-formed) DL channel, and determines a precoding matrix indicator (PMI) using the new port selection codebook, wherein the PMI indicates a set of components S that can be used at the gNB to construct precoding matrices for each FD unit t∈ {0, 1, . . . , $N_3$–1} (together with the beamforming used to beamformed CSI-RS). In one example, $P_{CSIRS,SD} \in \{4, 8, 12, 16, 32\}$ or $\{2, 4, 8, 12, 16, 32\}$. In one example, $P_{CSIRS,SD}$ and $P_{CSIRS,FD}$ are such that their product $Q=P_{CSIRS,SD} \times P_{CSIRS,FD} \in \{4, 8, 12, 16, 32\}$ or $\{2, 4, 8, 12, 16, 32\}$.

The new port selection codebook facilitates joint port selection across SD and FD. This is illustrated in the bottom part of FIG. 14. The codebook structure is similar to Rel. 15 NR Type II codebook comprising two main components.

$W_1$: to select $Y_υ$ out of $P_{CSI-RS}$ SD-FD port pairs jointly

In one example, $Y_υ \leq P_{CSI-RS}$ (if the port selection is independent across two polarizations or two groups of antennas with different polarizations)

In one example, $$Y_υ \leq \frac{P_{CSI-RS}}{2}$$

(if the port selection is common across two polarizations or two groups of antennas with different polarizations)

$W_2$: to select coefficients for the selected $Y_υ$ SD-FD port pairs.

In one example, the joint port selection (and its reporting) is common across multiple layers (when υ>1). In one example, the joint port selection (and its reporting) is independent across multiple layers (when υ>1). The reporting of the selected coefficients is independent across multiple layers (when υ>1).

For layer l=1, . . . , υ, where υ is the rank value reported via RI, the pre-coder (cf. equation 5 and equation 5A) includes the codebook components (indicated via PMI) summarized in Table 4. The parameter $Y_υ$ is either fixed or configured (e.g., via RRC).

TABLE 4

Codebook components

| Index | Components | Description |
|---|---|---|
| 0 | $\{(a_{l,i}, b_{l,i})\}_{i=0}^{Y_v-1}$ | set of selected (SD, FD/TD) beam/port pairs comprising columns of $A_l$ and $B_l$ |
| 1 | $\{x_{l,i}\}$ | bitmap indicating the indices of the non-zero (NZ) coefficients |

TABLE 4-continued

Codebook components

| Index | Components | Description |
|---|---|---|
| 2 | $SCI_l$ | an indicator indicating an index $i_l^*$ of the strongest coefficient for layer l |
| 3 | $p_{l,r}^{(1)}$ | reference amplitude |
| 4 | $\{p_{l,i}\}$ | amplitudes of NZ coefficients indicated via the bitmap |
| 5 | $\{\phi_{l,i}\}$ | phases of NZ coefficients indicated via the bitmap |

In one embodiment I.1, a UE is configured with higher layer parameter codebookType set to 'typeII-PortSelection-r17' for CSI reporting based on a new (Rel. 17) Type II port selection codebook in which the port selection (which is in SD) in Rel. 15/16 Type II port selection codebook is extended to FD in addition to SD. The PMI codebook has a $W=W_1 \tilde{W}_2 W_f^H$ structure, where the component $W_f$ of the codebook may or may not be present (i.e., may or may not reported or turned ON/OFF). In one example, when the component $W_f$ is reported (or turned ON or is part of the codebook), the codebook is according to embodiment A.1 and when the component $W_f$ is not reported (or turned OFF or is not part of the codebook), the codebook is according to embodiment A.2.

When turned off, the component $W_f$ can be fixed, for example, to an all one vector $$\frac{1}{n}[1, 1, \ldots, 1] \text{ or } \frac{1}{n}[1, 1, \ldots, 1]^T \text{ or } \frac{1}{n}\begin{bmatrix}1\\\vdots\\1\end{bmatrix}$$

having a length $N_3$, which corresponds to a DC component or DFT component 0 or FD basis 0, and n is a normalization factor, e.g., $n=\sqrt{N_3}$. In one example, n=1, i.e., the all-one vector is $[1, 1, \ldots, 1]$ or $[1, 1, \ldots, 1]^T$ or $$\begin{bmatrix}1\\\vdots\\1\end{bmatrix}.$$

Let $M_\upsilon$ be the number of columns of $W_f$. Then, in one example, $W_f$ can also be turned OFF and/or can be fixed to the all-one vector by setting/configuring $M_\upsilon=1$, and $W_f$ can also be turned ON by setting/configuring $M_\upsilon>1$. In one example, $$M_\upsilon = \left\lceil p_\upsilon \times \frac{N_3}{R} \right\rceil,$$

where R is higher-layer configured and $p_\upsilon$ is higher-layer configured (similar to Rel. 16 enhanced Type II codebook). Then, $M_\upsilon=1$ can also be set implicitly by setting $$p_\upsilon = \frac{R}{N_3}.$$

In one example, $M_\upsilon = \lceil p_\upsilon \times N_{SB} \rceil$, where $N_{SB}$ is higher-layer configured and indicates the number of SB configured for CSI reporting. Then, $M_\upsilon=1$ can also be set implicitly by setting $$p_\upsilon = \frac{1}{N_{SB}}.$$

In one example, when $W_f$ is turned ON, then a single value that satisfies $M_\upsilon>1$ is supported in specification, where the single value can be $M_\upsilon=2$. In one example, when $W_f$ is turned ON, then two values that satisfy $M_\upsilon>1$ are supported in specification, where the two values can be $M_\upsilon=2, 3$ or $2, 4$; and one of the two values is configured to the UE, and the configuration can be subject to UE capability reporting on whether the UE supports only one of or both of the supported values.

At least one of the following exampled can be used/configured. In the following examples, v is the rank value indicated via RI.

In one example I.1.1, the component $W_f$ is turned ON/OFF (reported or not reported) based on a condition on the number of CSI-RS ports $P_{CSIRS}$ configured to the UE for PMI calculation. The $P_{CSIRS}$ CSI-RS ports can either be in one CSI-RS resource or distributed across more than one CSI-RS resources, linked with the CSI reporting based on this new Type II port selection codebook. At least one of the following exampled can be used/configured.

In one example I.1.1.1, the condition is based on a threshold value x such that when $P_{CSIRS}<x$, the component $W_f$ is (or can be) turned on (reported); otherwise (when $P_{CSIRS}\geq x$), the component $W_f$ is turned off (not reported or cannot be configured).

In one example I.1.1.2, the condition is based on a threshold value x such that when $P_{CSIRS}\leq x$, the component $W_f$ is (or can be) turned on (reported); otherwise (when $P_{CSIRS}>x$), the component $W_f$ is turned off (not reported or cannot be configured).

In one example I.1.1.3, the condition is based on a threshold value x such that when $P_{CSIRS}>x$, the component $W_f$ is (or can be) turned on (reported); otherwise (when $P_{CSIRS}\leq x$), the component $W_f$ is turned off (not reported or cannot be configured).

In one example I.1.1.4, the condition is based on a threshold value x such that when $P_{CSIRS}\geq X$, the component $W_f$ is (or can be) turned on (reported); otherwise (when $P_{CSIRS}<X$), the component $W_f$ is turned off (not reported or cannot be configured).

In one example, x is fixed (e.g., 8 or 12 or 16 or 24 or 32). In one example, x is configured to the UE (e.g., via higher layer signaling). In one example, x is reported by the UE as part of the CSI report. In one example, the UE reports a value (or a set of values) for x in its UE capability signaling, and the gNB turns ON $W_f$ and configures a value of $P_{CSIRS}$ subject to the value(s) of x in the UE capability reporting.

When the UE reports its capability about the threshold x, then

In one example, this capability reporting about x can be a separate (dedicated) UE capability reporting. This capability can be conditioned on a (root or parent) capability, which for example, can be about whether the UE supports turning ON $W_f$ or/and supports $M_\upsilon>1$ (or $M_\upsilon=2$).

In one example, this capability reporting about x can be as a component of a (root or parent) capability, which for example, can be about whether the UE supports turning ON $W_f$ or/and supports $M_\upsilon>1$ (or $M_\upsilon=2$).

In one example I.1.2, the component $W_f$ is turned ON/OFF (reported or not reported) based on a condition on the number of CSI-RS ports $P_{CSIRS}$ configured to the UE for PMI calculation. The $P_{CSIRS}$ CSI-RS ports can either be in one CSI-RS resource or distributed across more than one CSI-RS resources, linked with the CSI reporting based on this new Type II port selection codebook. At least one of the following exampled can be used/configured.

In one example I.1.2.1, the condition is based on whether $P_{CSIRS}$ belongs to a set S. For example, when $P_{CSIRS} \in S$, the component $W_f$ is (or can be) turned on (reported); otherwise (when $P_{CSIRS} \notin S$), the component $W_f$ is turned off (not reported or cannot be configured).

In one example I.1.2.2, the condition is based on whether $P_{CSIRS}$ belongs to a set S. For example, when $P_{CSIRS} \notin S$, the component $W_f$ is (or can be) turned on (reported); otherwise (when $P_{CSIRS} \in S$), the component $W_f$ is turned off (not reported or cannot be configured).

In one example, S is fixed (e.g., {2, 4, 8} or {4, 8} or {2, 4, 8, 12} or {4, 8, 12} or {2, 4, 8, 12, 16} or {4, 8, 12, 16} or {2, 4, 8, 12, 16, 24} or {4, 8, 12, 16, 24} or {2, 4, 8, 12, 16, 24, 32} or {4, 8, 12, 16, 24, 32}). In one example, S is configured to the UE (e.g., via higher layer signaling). In one example, S is reported by the UE as part of the CSI report. In one example, the UE reports a set S in its UE capability signaling, and the gNB turns ON $W_f$ and configures a value of $P_{CSIRS}$ subject to the set S reported via the UE capability reporting.

When the UE reports its capability about the set S, then
In one example, this capability reporting about the set S can be a separate (dedicated) UE capability reporting. This capability can be conditioned on a (root or parent) capability, which for example, can be about whether the UE supports turning ON $W_f$ or/and supports $M_\upsilon > 1$ (or $M_\upsilon = 2$).

In one example, this capability reporting about the set S can be as a component of a (root or parent) capability, which for example, can be about whether the UE supports turning ON $W_f$ or/and supports $M_\upsilon > 1$ (or $M_\upsilon = 2$).

In one example I.1.2A, the component $W_f$ is turned ON/OFF (reported or not reported) based on a first UE capability reporting about whether the UE supports turning ON $W_f$ or/and supports $M_\upsilon > 1$ (or $M_\upsilon = 2$). When the UE reports being capable of the first UE capability reporting, then a subset $S_1$ for $P_{CSIRS}$ values is supported by the UE, hence, the component $W_f$ can be turned ON (configured) and any $P_{CSIRS}$ value from this subset $S_1$ can be configured to the UE. However, for another subset $S_2$ for $P_{CSIRS}$ values, additional UE capability reporting is required. This reporting can be a component of the first UE capability reporting, or it can be a separate (dedicated) UE capability reporting that is condition on the first UE capability reporting. Only when the UE reports this additional UE capability, the component $W_f$ can be turned ON (configured) and any $P_{CSIRS}$ value from this subset $S_2$ can be configured to the UE. The subset $S_1$ and $S_2$ are according to at least one of the following examples.

In one example I.1.2A.1, $S_1$ includes $P_{CSIRS}$ values that satisfy $P_{CSIRS} < x$, and $S_2$ includes $P_{CSIRS}$ values that satisfy $x \leq P_{CSIRS} = y$. In one example, x=8 or 12 or 16 or 24 or 32 and y=32.

In one example I.1.2A.2, $S_1$ includes $P_{CSIRS}$ values that satisfy $P_{CSIRS} \leq x$, and $S_2$ includes $P_{CSIRS}$ values that satisfy $x < P_{CSIRS} = y$. In one example, x=8 or 12 or 16 or 24 and y=32.

In one example I.1.2A.3, $S_1$={2, 4, 8} or {4, 8} and $S_2$={12, 16, 24, 32}.

In one example I.1.2A.4, $S_1$={2, 4, 8, 12} or {4, 8, 12} and $S_2$={16, 24, 32}.

In one example I.1.2A.5, $S_1$={2, 4, 8, 12, 16} or {4, 8, 12, 16} and $S_2$={24, 32}.

In one example I.1.2A.6, $S_1$={2, 4, 8, 12, 16, 24} or {4, 8, 12, 16, 24} and $S_2$={32}.

In one example I.1.3, the component $W_f$ is turned ON/OFF (reported or not reported) based on a condition on the value of $2LM_\upsilon$ where L and $M_\upsilon$ are configured to the UE for PMI calculation (cf. Rel. 16 enhanced Type II codebook). At least one of the following exampled can be used/configured.

In one example I.1.3.1, the condition is based on a threshold value x such that when $2LM_\upsilon < x$, the component $W_f$ is turned on (reported); otherwise (when $2LM_\upsilon \geq x$), the component $W_f$ is turned off (not reported).

In one example I.1.3.2, the condition is based on a threshold value x such that when $2LM_\upsilon \leq x$, the component $W_f$ is turned on (reported); otherwise (when $2LM_\upsilon > x$), the component $W_f$ is turned off (not reported).

In one example I.1.3.3, the condition is based on a threshold value x such that when $2LM_\upsilon > x$, the component $W_f$ is turned on (reported); otherwise (when $2LM_\upsilon \leq x$), the component $W_f$ is turned off (not reported).

In one example I.1.3.4, the condition is based on a threshold value x such that when $2LM_\upsilon \geq x$, the component $W_f$ is turned on (reported); otherwise (when $2LM_\upsilon < x$), the component $W_f$ is turned off (not reported).

In one example, x is fixed (e.g., 8 or 12 or 16 or 32). In one example, x is configured to the UE (e.g., via higher layer signaling). In one example, x is reported by the UE as part of the CSI report. In one example, the UE reports a value or a set of value in its UE capability signaling, and the gNB configures a value of x subject to the UE capability reporting.

In one example I.1.4, the component $W_f$ is turned ON/OFF (reported or not reported) based on a condition on the value of $2LM_\upsilon$ where L and $M_\upsilon$ are configured to the UE for PMI calculation (cf. Rel. 16 enhanced Type II codebook). At least one of the following exampled can be used/configured.

In one example I.1.4.1, the condition is based on whether $2LM_\upsilon$ belongs to a set S. For example, when $2LM_\upsilon \in S$, the component $W_f$ is turned on (reported); otherwise (when $2LM_\upsilon \notin S$), the component $W_f$ is turned off (not reported).

In one example I.1.4.2, the condition is based on whether $2LM_\upsilon$ belongs to a set S. For example, when $2LM_\upsilon \notin S$, the component $W_f$ is turned on (reported); otherwise (when $2LM_\upsilon \notin S$), the component $W_f$ is turned off (not reported).

In one example, S is fixed (e.g., {2, 4, 8, 12} or {4, 8, 12} or {2, 4, 8, 12, 16} or {4, 8, 12, 16} or {2, 4, 8, 12, 16, 32} or {4, 8, 12, 16, 32}). In one example, S is configured to the UE (e.g., via higher layer signaling). In one example, S is reported by the UE as part of the CSI report. In one example, the UE reports a set in its UE capability signaling, and the gNB configures S subject to the UE capability reporting.

In one example I.1.5, the component $W_f$ is turned ON/OFF (reported or not reported) based on a condition on the value of $O_f P_{CSIRS}$ where $O_f$ and $P_{CSIRS}$ are configured to the UE for PMI calculation, the value of $O_f$ determines the number of SD or/and FD beamforming vectors that are conveyed via each CSI-RS port, or $O_f$ is the number beamforming ports or coefficients that the UE measures/calculates via each CSI-RS port. At least one of the following exampled can be used/configured.

In one example I.1.5.1, the condition is based on a threshold value x such that when $O_f P_{CSIRS} < x$, the component $W_f$ is turned on (reported); otherwise (when $O_f P_{CSIRS} \geq x$), the component $W_f$ is turned off (not reported).

In one example I.1.5.2, the condition is based on a threshold value x such that when $O_f P_{CSIRS} \leq x$, the component $W_f$ is turned on (reported); otherwise (when $O_f P_{CSIRS} > x$), the component $W_f$ is turned off (not reported).

In one example I.1.5.3, the condition is based on a threshold value x such that when $O_f P_{CSIRS} > x$, the component $W_f$ is turned on (reported); otherwise (when $O_f P_{CSIRS} \leq x$), the component $W_f$ is turned off (not reported).

In one example I.1.5.4, the condition is based on a threshold value x such that when $O_f P_{CSIRS} \geq x$, the component $W_f$ is turned on (reported); otherwise (when $O_f P_{CSIRS} < X$), the component $W_f$ is turned off (not reported).

In one example, x is fixed (e.g., 8 or 12 or 16 or 32). In one example, x is configured to the UE (e.g., via higher layer signaling). In one example, x is reported by the UE as part of the CSI report. In one example, the UE reports a value or a set of value in its UE capability signaling, and the gNB configures a value of x subject to the UE capability reporting.

In one example I.1.6, the component $W_f$ is turned ON/OFF (reported or not reported) based on a condition on the value of $O_f P_{CSIRS}$ where $O_f$ and $P_{CSIRS}$ are configured to the UE for PMI calculation, the value of $O_f$ determines the number of SD or/and FD beamforming vectors that are conveyed via each CSI-RS port, or $O_f$ is the number beamforming ports or coefficients that the UE measures/calculates via each CSI-RS port. At least one of the following exampled can be used/configured.

In one example I.1.6.1, the condition is based on whether $O_f P_{CSIRS}$ belongs to a set S. For example, when $O_f P_{CSIRS} \in S$, the component $W_f$ is turned on (reported); otherwise (when $O_f P_{CSIRS} \notin S$), the component $W_f$ is turned off (not reported).

In one example I.1.6.2, the condition is based on whether $O_f P_{CSIRS}$ belongs to a set S. For example, when $O_f P_{CSIRS} \notin S$, the component $W_f$ is turned on (reported); otherwise (when $O_f P_{CSIRS} \in S$), the component $W_f$ is turned off (not reported).

In one example, S is fixed (e.g., {2, 4, 8, 12} or {4, 8, 12} or {2, 4, 8, 12, 16} or {4, 8, 12, 16} or {2, 4, 8, 12, 16, 32} or {4, 8, 12, 16, 32}). In one example, S is configured to the UE (e.g., via higher layer signaling). In one example, S is reported by the UE as part of the CSI report. In one example, the UE reports a set in its UE capability signaling, and the gNB configures S subject to the UE capability reporting.

In one example I.1.7, the component $W_f$ is turned ON/OFF (reported or not reported) based on a condition on the value of $v \times 2LM_v$ where L and $M_v$ are configured to the UE for PMI calculation (cf. Rel. 16 enhanced Type II codebook). At least one of the following exampled can be used/configured.

In one example I.1.7.1, the condition is based on a threshold value x such that when $v \times 2LM_v < x$, the component $W_f$ is turned on (reported); otherwise (when $v \times 2LM_v \geq x$), the component $W_f$ is turned off (not reported).

In one example I.1.7.2, the condition is based on a threshold value x such that when $v \times 2LM_v \leq x$, the component $W_f$ is turned on (reported); otherwise (when $v \times 2LM_v > x$), the component $W_f$ is turned off (not reported).

In one example I.1.7.3, the condition is based on a threshold value x such that when $v \times 2LM_v > x$, the component $W_f$ is turned on (reported); otherwise (when $v \times 2LM_v \leq x$), the component $W_f$ is turned off (not reported).

In one example I.1.7.4, the condition is based on a threshold value x such that when $v \times 2LM_v \geq x$, the component $W_f$ is turned on (reported); otherwise (when $v \times 2LM_v < x$), the component $W_f$ is turned off (not reported).

In one example, x is fixed (e.g., 8 or 12 or 16 or 32). In one example, x is configured to the UE (e.g., via higher layer signaling). In one example, x is reported by the UE as part of the CSI report. In one example, the UE reports a value or a set of value in its UE capability signaling, and the gNB configures a value of x subject to the UE capability reporting.

In one example I.1.8, the component $W_f$ is turned ON/OFF (reported or not reported) based on a condition on the value of $v \times 2LM_v$ where L and $M_v$ are configured to the UE for PMI calculation (cf. Rel. 16 enhanced Type II codebook). At least one of the following exampled can be used/configured.

In one example I.1.8.1, the condition is based on whether $v \times 2LM_v$ belongs to a set S. For example, when $v \times 2LM_v \in S$, the component $W_f$ is turned on (reported); otherwise (when $v \times 2LM_v \notin S$), the component $W_f$ is turned off (not reported).

In one example I.1.8.2, the condition is based on whether $v \times 2LM_v$ belongs to a set S. For example, when $v \times 2LM_v \notin S$, the component $W_f$ is turned on (reported); otherwise (when $v \times 2LM_v \in S$), the component $W_f$ is turned off (not reported).

In one example, S is fixed (e.g., {2, 4, 8, 12} or {4, 8, 12} or {2, 4, 8, 12, 16} or {4, 8, 12, 16} or {2, 4, 8, 12, 16, 32} or {4, 8, 12, 16, 32}). In one example, S is configured to the UE (e.g., via higher layer signaling). In one example, S is reported by the UE as part of the CSI report. In one example, the UE reports a set in its UE capability signaling, and the gNB configures S subject to the UE capability reporting.

In one example I.1.9, the UE configured with the $P_{CSIRS}$ CSI-RS ports either be in one CSI-RS resource or distributed across more than one CSI-RS resources, linked with the CSI reporting based on this new Type II port selection codebook. The component $W_f$ is turned ON/OFF (reported or not reported) based on a condition on the number of CSI-RS resources $K_{CSIRS}$ that are aggregated to obtain $P_{CSIRS}$ number of CSI-RS ports, configured to the UE for PMI calculation. At least one of the following exampled can be used/configured.

In one example I.1.9.1, when the number of CSI-RS resource $K_{CSIRS}=1$, the component $W_f$ is (or can be) turned on (reported); otherwise (when $K_{CSIRS}>1$), the component $W_f$ is turned off (not reported or cannot be configured).

In one example I.1.9.2, when the number of CSI-RS resource $K_{CSIRS}=1$ or 2, the component $W_f$ is (or can be) turned on (reported); otherwise (when $K_{CSIRS}>2$), the component $W_f$ is turned off (not reported or cannot be configured).

In one example I.1.9.3, when the number of CSI-RS resource $K_{CSIRS} \leq z$, the component $W_f$ is (or can be) turned on (reported); otherwise (when $K_{CSIRS} > z$), the component $W_f$ is turned off (not reported or cannot be configured). The threshold z can be fixed, or reported by the UE as part of UE capability reporting.

As described above, in general, for layer l=0, 1, ..., v−1, where v is the rank value reported via RI, the pre-coder (cf. equation 5 and equation 5A) includes the codebook components summarized in Table 2.

In one example, the number of SD beams is layer-common, i.e., $L_l = L$ for all l values. In one example, the set of SD basis is layer-common, i.e., $a_{l,i} = a_i$ for all l values. In one example, the number of FD/TD beams is layer-pair-common or layer-pair-independent, i.e., $M_0 = M_1 = M$ for layer pair (0, 1), $M_2 = M_3 = M'$ for layer pair (2, 3), and M and M' can have different values. In one example, the set of FD/TD basis is layer-independent, i.e., $\{b_{l,f}\}$ can be different for different l values. In one example, the bitmap is layer-independent, i.e., $\{\beta_{l,i,f}\}$ can be different for different l values. In one example, the SCI is layer-independent, i.e., $\{SCI_l\}$ can be different for different l values. In one example, the amplitudes and phases are layer-independent, i.e., $\{p_{l,i,f}\}$ and $\{\phi_{l,i,f}\}$ can be different for different l values.

In one example, when the SD basis $W_1$ is a port selection, then the candidate values for L or $L_l$ include 1, and the candidate values for the number of CSI-RS ports $N_{CSI-RS}$ include 2.

In embodiment A, for SD basis, the set of SD beams $\{a_{l,i}\}_{i=0}^{L_l-1}$ comprising columns of $A_l$ is according to at least one of the following alternatives. The SD basis is common for the two antenna polarizations, i.e., one SD basis is used for both antenna polarizations.

In one alternative Alt A−1, the SD basis is analogous to the $W_1$ component in Rel.15 Type II port selection codebook, wherein the $L_l$ antenna ports or column vectors of $A_l$ are selected by the index $$q_1 \in \left\{0, 1, \ldots, \left\lceil \frac{P_{CSI-RS}}{2d} \right\rceil - 1\right\} \left(\text{this requires } \left\lceil \log_2 \left\lceil \frac{P_{CSI-RS}}{2d} \right\rceil \right\rceil \text{ bits}\right),$$

where $$d \leq \min\left(\frac{P_{CSI-RS}}{2}, L_l\right).$$

In one example, $d \in \{1, 2, 3, 4\}$. To select columns of $A_l$, the port selection vectors are used. For instance, $a_i = v_m$, where the quantity $v_m$ is a $P_{CSI-RS}/2$-element column vector containing a value of 1 in element (m mod $P_{CSI-RS}/2$) and zeros elsewhere (where the first element is element 0). The port selection matrix is then given by $$W_1 = A_l = \begin{bmatrix} X & 0 \\ 0 & X \end{bmatrix}$$

where $X = [v_{q_1 d} \ v_{q_1 d+1} \ \cdots \ v_{q_1 d + L_l - 1}]$.

In one alternative Alt A−2, the SD basis selects $L_l$ antenna ports freely, i.e., the $L_l$ antenna ports per polarization or column vectors of $A_l$ are selected freely by the index $$q_1 \in \left\{0, 1, \ldots, \left\lceil \frac{\frac{P_{CSI-RS}}{2}}{L_l} \right\rceil - 1\right\} \left(\text{this requires } \left\lceil \log_2 \left\lceil \frac{\frac{P_{CSI-RS}}{2}}{L_l} \right\rceil \right\rceil \text{ bits}\right).$$

To select columns of $A_l$, the port selection vectors are used. For instance, $a_i = v_m$, where the quantity $v_m$ is a $P_{CSI-RS}/2$-element column vector containing a value of 1 in element (m mod $P_{CSI-RS}/2$) and zeros elsewhere (where the first element is element 0). Let $\{x_0, x_1, \ldots, x_{L_l-1}\}$ be indices of selection vectors selected by the index $q_1$. The port selection matrix is then given by $$W_1 = A_l = \begin{bmatrix} X & 0 \\ 0 & X \end{bmatrix} \text{ where } X = [v_{x_0} \ v_{x_1} \ \cdots \ v_{x_{L_l-1}}].$$

In one alternative Alt A−3, the SD basis selects $L_l$ DFT beams from an oversampled DFT codebook, i.e., $a_i = v_{i_1, i_2}$, where the quantity $v_{i_1, i_2}$ is given by $$u_{i_2} = \begin{cases} \left[1 \ e^{j\frac{2\pi m}{O_2 N_2}} \ \cdots \ e^{j\frac{2\pi m(N_2-1)}{O_2 N_2}}\right] & N_2 > 1 \\ 1 & N_2 = 1 \end{cases}.$$

$$v_{i_1, i_2} = \left[u_{i_2} \ e^{j\frac{2\pi i_1}{O_1 N_1}} u_{i_2} \ \cdots \ e^{j\frac{2\pi i_1(N_1-1)}{O_1 N_1}} u_{i_2}\right]^T$$

In one example, this selection of $L_l$ DFT beams is from a set of orthogonal DFT beams comprising $N_1 N_2$ two-dimensional DFT beams.

In one alternative Alt A−4, the SD basis is fixed (hence, not selected by the UE). For example, the SD basis includes all $$L_l = \frac{K_{SD}}{2} SD$$

antenna ports for each antenna polarization (for a dual-polarized antenna port layout at the gNB). Alternatively, the SD basis includes all $L_l = K_{SD}$ SD antenna ports (for a co-polarized antenna port layout at the gNB). In one example, $K_{SD} = 2N_1 N_2$. In another example, $K_{SD} < 2N_1 N_2$. In one example, the UE can be configured with $K_{SD} = 2N_1 N_2$ or $K_{SD} < 2N_1 N_2$. In one example, $K_{SD} \in S$ where S is fixed, e.g., $\{4, 8\}$. Note that $K_{SD}$ is a number of CSI-RS ports in SD.

In embodiment AA, a variation of embodiment A, the SD basis is selected independently for each of the two antenna polarizations, according to at least one of Alt A−1 through Alt A−4.

In embodiment B, for FD/TD basis, the set of FD/TD beams $\{b_{l,f}\}_{f=0}^{M_l-1}$ comprising columns of $B_l$ is according to at least one of the following alternatives.

In one alternative Alt B−1, the FD/TD basis selection to similar to Alt A−1, i.e., the $M_l$ FD/TD units ports or column vectors of $B_l$ are selected by the index $$q_2 \in \left\{0, 1, \ldots, \left\lceil \frac{N_3}{e} \right\rceil - 1\right\} \left(\text{this requires } \left\lceil \log_2 \left\lceil \frac{N_3}{e} \right\rceil \right\rceil \text{ bits}\right),$$

where $e \leq \min(N_3, M_l)$. In one example, $e \in \{1, 2, 3, 4\}$. To select columns of $B_l$, the selection vectors are used. For instance, $b_j = v_z$, where the quantity $v_z$ is a $N_3$-element column vector containing a value of 1 in element (z mod $N_3$) and zeros elsewhere (where the first element is element 0). The selection matrix is then given by $$W_f = B_l = [v_{q_2 e} v_{q_2 e+1} \cdots v_{q_2 e + M_l - 1}].$$

In one alternative Alt B-2, the FD/TD basis selects $M_l$ FD/TD units freely, i.e., the $M_l$ FD/TD units or column vectors of $B_l$ are selected freely by the index $$q_2 \in \left\{0, 1, \ldots, \binom{N_3}{M_l} - 1\right\} \left(\text{this requires } \left\lceil \log_2 \binom{N_3}{M_l} \right\rceil \text{ bits}\right).$$

To select columns of $B_l$, the selection vectors are used. For instance, $b_j = v_z$, where the quantity $v_z$ is a $N_3$-element column vector containing a value of 1 in element ($z \bmod N_3$) and zeros elsewhere (where the first element is element 0). Let $\{x_0, x_1, \ldots, x_{M_l-1}\}$ be indices of selection vectors selected by the index $q_2$. The selection matrix is then given by $$W_f = B_l = [v_{x_0} v_{x_1} \ldots v_{x_{M_l-1}}].$$

In one alternative Alt B-3, the FD/TD basis selects $M_l$ DFT beams from an oversampled DFT codebook, i.e., $b_j = w_f$, where the quantity $w_f$ is given by $$w_f = \begin{bmatrix} 1 & e^{j\frac{2\pi f}{O_3 N_3}} & \ldots & e^{j\frac{2\pi f(N_3-1)}{O_3 N_3}} \end{bmatrix}.$$

In one example, this selection of $M_l$ DFT beams is from a set of orthogonal DFT beams comprising $N_3$ DFT beams. In one example, $O_3 = 1$.

In one alternative Alt B-4, the FD/TD basis is fixed (hence, not selected by the UE). For example, the FD/TD basis includes all $M_l = K_{FD}$ FD antenna ports. In one example, $K_{FD} = N_3$. In another example, $K_{FD} < N_3$. In one example, the UE can be configured with $K_{FD} = N_3$ or $K_{FD} < N_3$. In one example, $K_{FD} \in S$ where S is fixed. Note that $K_{FD}$ is a number of CSI-RS ports in FD.

In one example, $K_{SD} \times K_{FD} = P_{CSIRS}$ is a total number of (beam-formed) CSI-RS ports.

In embodiment C, the SD and FD/TD bases are according to at least one of the alternatives in Table 5.

TABLE 5 alternatives for SD and FD/TD bases

| Alt | SD basis | FD/TD basis |
|---|---|---|
| C-0 | Alt A-1 | Alt B-1 |
| C-1 | | Alt B-2 |
| C-2 | | Alt B-3 |
| C-3 | | Alt B-4 |
| C-4 | Alt A-2 | Alt B-1 |
| C-5 | | Alt B-2 |
| C-6 | | Alt B-3 |
| C-7 | | Alt B-4 |
| C-8 | Alt A-3 | Alt B-1 |
| C-9 | | Alt B-2 |
| C-10 | | Alt B-3 |
| C-11 | | Alt B-4 |

As defined above, $N_3$ is a number of FD units for PMI reporting and the PMI indicates $N_3$ precoding matrices, one for each FD unit. An FD unit can also be referred to as a PMI subband. Let $t \in \{0, 1, \ldots, N_3-1\}$ be an index to indicate an FD unit. Note that PMI subband can be different from CQI subband.

Let a parameter R indicate a number of PMI subbands in each CQI subband. As explained in Section 5.2.2.2.5 of [REF8], this parameter controls the total number of precoding matrices $N_3$ indicated by the PMI as a function of the number of subbands in csi-ReportingBand (configured to the UE for CSI reporting), the subband size ($N_{PRB}^{SB}$) configured by the higher-level parameter subbandSize and of the total number of PRBs in the bandwidth part according to Table 5.2.1.4-2 [REF8], as follows:

When R=1: One precoding matrix is indicated by the PMI for each subband in csi-ReportingBand.

When R=2:

For each subband in csi-ReportingBand that is not the first or last subband of a band-width part (BWP), two precoding matrices are indicated by the PMI: the first precoding matrix corresponds to the first $N_{PRB}^{SB}/2$ PRBs of the subband and the second precoding matrix corresponds to the last $N_{PRB}^{SB}/2$ PRBs of the subband.

For each subband in csi-ReportingBand that is the first or last subband of a BWP If $$(N_{BWP,i}^{start} \bmod N_{PRB}^{SB}) \geq \frac{N_{PRB}^{SB}}{2},$$

one precoding matrix is indicated by the PMI corresponding to the first subband. If $$(N_{BWP,i}^{start} \bmod N_{PRB}^{SB}) < \frac{N_{PRB}^{SB}}{2},$$

two precoding matrices are indicated by the PMI corresponding to the first subband: the first precoding matrix corresponds to the first $$\frac{N_{PRB}^{SB}}{2} - (N_{BWP,i}^{start} \bmod N_{PRB}^{SB}) PRBs$$

of the first subband and the second precoding matrix corresponds to the last $$\frac{N_{PRB}^{SB}}{2} PRBs$$

of the first subband.

If $$1 + (N_{BWP,i}^{start} + N_{BWP,i}^{size} - 1) \bmod N_{PRB}^{SB} \leq \frac{N_{PRB}^{SB}}{2},$$

one precoding matrix is indicated by the PMI corresponding to the last subband. If $$1 + (N_{BWP,i}^{start} + N_{BWP,i}^{size} - 1) \bmod N_{PRB}^{SB} > \frac{N_{PRB}^{SB}}{2},$$

two precoding matrices are indicated by the PMI corresponding to the last subband: the first precoding matrix corresponds to the first $$\frac{N_{PRB}^{SB}}{2} PRBs$$

of the last subband and the second precoding matrix corresponds to the last $$1 + (N_{BWP,i}^{start} + N_{BWP,i}^{size} - 1) \bmod N_{PRB}^{SB} - \frac{N_{PRB}^{SB}}{2} PRBs$$

of the last subband.

When $R = N_{PRB}^{SB}$: One precoding matrix is indicated by the PMI for each PRB in csi-ReportingBand.

Here, $N_{BWP,i}^{start}$ and $N_{BWP,i}^{size}$ are a starting PRB index and a total number of PRBs in the BWP i.

In one example, R is fixed, e.g., R=2 or $R=N_{PRB}^{SB}$. In one example, R is configured, e.g., from $\{1, 2\}$ or $\{1, 2, N_{PRB}^{SB}\}$ or $\{2, N_{PRB}^{SB}\}$. When R is configured, it is configured via a higher-layer parameter, e.g., numberOfPMISubbandsPerCQISubband.

Let $P_{CSIRS,SD}$ and $P_{CSIRS,FD}$ be number of CSI-RS ports in SD and FD, respectively. The total number of CSI-RS ports is $P_{CSIRS,SD} \times P_{CSIRS,FD} = P_{CSIRS}$. Each CSI-RS port can be beam-formed/pre-coded using a pre-coding/beam-forming vector in SD or FD or both SD and FD. The pre-coding/beam-forming vector for each CSI-RS port can be derived based on UL channel estimation via SRS, assuming (partial) reciprocity between DL and UL channels. Since CSI-RS ports can be beam-formed in SD as well as FD, the Rel. 15/16 Type II port selection codebook can be extended to perform port selection in both SD and FD followed by linear combination of the selected ports. In the rest of the disclosure, some details pertaining to the port selection codebook for this extension are provided.

In the rest of the disclosure, notation $M_l$ and $M_v$ are used interchangeably to denote the dependence of the value of M (number of columns of the $B_l$ matrix) on the rank.

Figure 15:
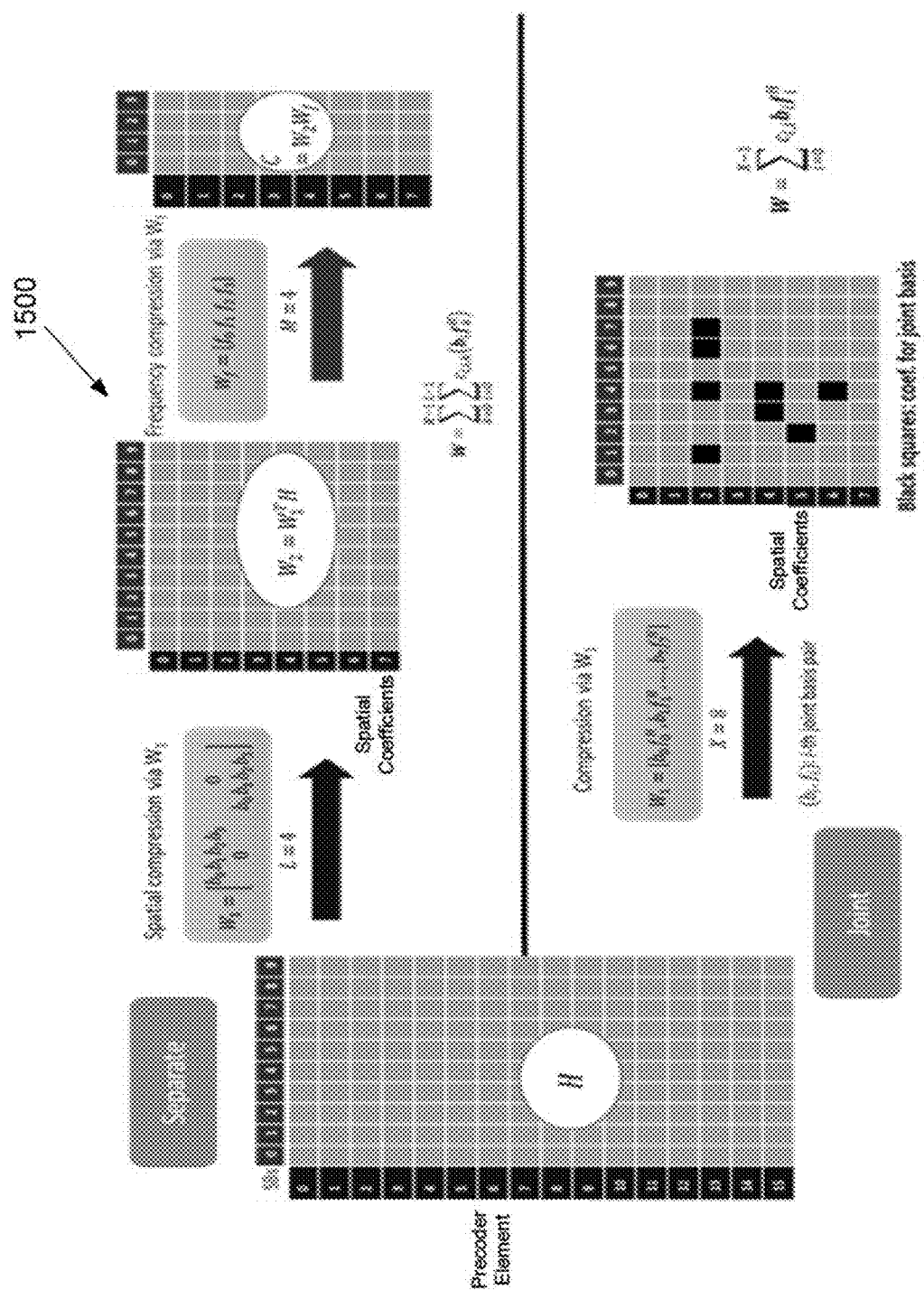
FIG. 15 illustrates another example of a port selection codebook that facilitates independent (separate) port selection across SD and FD, and that also facilitates joint port selection across SD and FD according to embodiments of the disclosure.

FIG. 15 illustrates another example of a new port selection codebook that facilitates independent (separate) port selection across SD and FD, and that also facilitates joint port selection across SD and FD 1500 according to embodiments of the disclosure. The embodiment of a new port selection codebook that facilitates independent (separate) port selection across SD and FD, and that also facilitates joint port selection across SD and FD 1500 illustrated in FIG. 15 is for illustration only. FIG. 15 does not limit the scope of this disclosure to any particular implementation of the example of a new port selection codebook that facilitates independent (separate) port selection across SD and FD, and that also facilitates joint port selection across SD and FD 1500.

In one embodiment 1, a UE is configured with higher layer parameter codebookType set to 'typeII-r17' or 'typeII-PortSelection-r17' for CSI reporting based on a new (Rel. 17) Type II port selection codebook in which the port selection (which is in SD) in Rel. 15/16 Type II port selection codebook is extended to FD in addition to SD. The UE is also configured with $P_{CSIRS}$ CSI-RS ports (either in one CSI-RS resource or distributed across more than one CSI-RS resources) linked with the CSI reporting based on this new Type II port selection codebook. In one example, $P_{CSIRS} = Q$. In another example, $P_{CSIRS} \geq Q$. Here, $Q = P_{CSIRS,SD} \times P_{CSIRS,FD}$. The CSI-RS ports can be beam-formed in SD and/or FD. The UE measures $P_{CSIRS}$ (or at least Q) CSI-RS ports, estimates (beam-formed) DL channel, and determines a precoding matrix indicator (PMI) using the new port selection codebook, wherein the PMI indicates a set of components S that can be used at the gNB to construct precoding matrices for each FD unit $t \in \{0, 1, \ldots, N_3-1\}$ (together with the beamforming used to beamformed CSI-RS). In one example, $P_{CSIRS,SD} \in \{4, 8, 12, 16, 32\}$ or $\{2, 4, 8, 12, 16, 32\}$. In one example, $P_{CSIRS,SD}$ and $P_{CSIRS,FD}$ are such that their product $Q = P_{CSIRS,SD} \times P_{CSIRS,FD} \in \{4, 8, 12, 16, 32\}$ or $\{2, 4, 8, 12, 16, 32\}$.

The new port selection codebook facilitates independent (separate) port selection across SD and FD. This is illustrated in top part of FIG. 15.

In one example 1.1, this separate port selection corresponds to port selection only in SD via $W_1$ and no port selection in FD via $W_f$. The set of SD port selection vectors $\{a_{l,i}\}_{i=0}^{L_l-1}$ comprising columns of $A_l$ is according to at least one of the following alternatives. The SD port selection is common for the two antenna polarizations, i.e., one SD basis is used for both antenna polarizations.

In one alternative Alt 1.1.1, the SD port selection is analogous to the $W_1$ component in Rel.15 Type II port selection codebook, wherein the $L_l$ antenna ports or column vectors of $A_l$ are selected by the index $$q_1 \in \left\{0, 1, \ldots, \left\lceil \frac{P_{CSI-RS,SD}}{2d} \right\rceil - 1\right\} \left(\text{this requires} \left\lceil \log_2 \left\lceil \frac{P_{CSI-RS,SD}}{2d} \right\rceil \right\rceil \text{bits}\right),$$

where $$d \leq \min\left(\frac{P_{CSI-RS,SD}}{2}, L_l\right).$$

In one example, $d \in \{1, 2, 3, 4\}$. To select columns of $A_l$, the port selection vectors are used, For instance, $a_i = v_m$, where the quantity $v_m$ is a $P_{CSI-RS,SD}/2$-element column vector containing a value of 1 in element (m mod $P_{CSI-RS,SD}/2$) and zeros elsewhere (where the first element is element 0). The port selection matrix is then given by $$W_1 = A_l = \begin{bmatrix} X & 0 \\ 0 & X \end{bmatrix} \text{ where } X = [v_{q_1 d} \quad v_{q_1 d+1} \quad \cdots \quad v_{q_1 d+L_l-1}].$$

In one alternative Alt 1.1.2, the SD port selection vector selects $L_l$ antenna ports freely, i.e., the $L_l$ antenna ports per polarization or column vectors of $A_l$ are selected freely by the index $$\left(\text{this requires} \left\lceil \log_2 \left\lceil \frac{\frac{P_{CSI-RS,SD}}{2}}{L_l} \right\rceil \right\rceil \text{bits}\right).$$

To select columns of $A_l$, the port selection vectors are used, For instance, $a_i = v_m$, where the quantity $v_m$ is a $P_{CSI-RS,SD}/2$-element column vector containing a value of 1 in element (m mod $P_{CSI-RS,SD}/2$) and zeros elsewhere (where the first element is element 0). Let $\{x_0, x_1, \ldots, x_{L_l-1}\}$ be indices of selection vectors selected by the index $q_1$. The port selection matrix is then given by $$W_1 = A_l = \begin{bmatrix} X & 0 \\ 0 & X \end{bmatrix} \text{ where } X = \begin{bmatrix} v_{x_0} & v_{x_1} & \cdots & v_{x_{L_l-1}} \end{bmatrix}.$$

In one alternative Alt 1.1.3 the SD port selection is fixed (hence, not selected by the UE). For example, the SD port selection selects all $$L_l = \frac{P_{CSI-RS,SD}}{2} SD$$

antenna ports for each antenna polarization (for a dual-polarized antenna port layout at the gNB). Alternatively, the SD port selection selects all $L_l = P_{CSI-RS,SD}$ SD antenna ports (for a co-polarized antenna port layout at the gNB).

In a variation of example 1.1, the SD port selection is independently for each of the two antenna polarizations, according to at least one of Alt 1.1.1 through Alt 1.1.3.

The value of $L_l$ can be configured from $\{2, 4\}$ or $\{2, 3, 4\}$ or $\{2, 4, 6\}$ or $\{2, 4, 6, 8\}$.

In one example 1.2, this separate port selection corresponds to port selection in SD via $W_1$ and port selection in FD via $W_f$. The set of SD port selection vectors $\{a_{l,i}\}_{i=0}^{L_l-1}$ comprising columns of $A_l$ is according to at least one of Alt 1.1.1 through Alt 1.1.3. The SD port selection is common for the two antenna polarizations, i.e., one SD basis is used for both antenna polarizations. In a variation, the SD port selection is independently for each of the two antenna polarizations, according to at least one of Alt 1.1.1 through Alt 1.1.3. The value of $L_l$ can be configured from $\{2, 4\}$ or $\{2, 3, 4\}$ or $\{2, 4, 6\}$ or $\{2, 4, 6, 8\}$.

For FD port selection, the set of FD port selection vectors $\{b_{l,f}\}_{f=0}^{M_l-1}$ comprising columns of $B_l$ is according to at least one of the following alternatives.

In one alternative Alt 1.2.1, the FD port selection to similar to Alt 1.1.1, i.e., the $M_l$ FD units ports or column vectors of $B_l$ are selected by the index $$q_2 \in \left\{0, 1, \ldots, \left\lceil \frac{K_{FD}}{e} \right\rceil - 1\right\}$$

$$\left(\text{this requires } \left\lceil \log_2 \left\lceil \frac{K_{FD}}{e} \right\rceil \right\rceil \text{ bits}\right),$$

where $K_{FD} = N_3$ or $P_{CSI-RS,FD}$, $e \leq \min(K_{FD}, M_l)$. In one example, $e \in \{1, 2, 3, 4\}$. To select columns of $B_l$, the selection vectors are used, For instance, $b_f = v_z$, where the quantity $v_z$ is a $K_{FD}$-element column vector containing a value of 1 in element (z mod $K_{FD}$) and zeros elsewhere (where the first element is element 0). The selection matrix is then given by $$W_f = B_l = [v_{q_2 e} v_{q_2 e+1} \cdots v_{q_2 e+M_l-1}].$$

In one alternative Alt 1.2.2, the FD port selection vectors selects $M_l$ FD units (or ports) freely, i.e., the $M_l$ FD units (ports) or column vectors of $B_l$ are selected freely by the index $$q_2 \in \left\{0, 1, \ldots, \binom{K_{FD}}{M_l} - 1\right\}$$

$$\left(\text{this requires } \left\lceil \log_2 \binom{K_{FD}}{M_l} \right\rceil \text{ bits}\right),$$

where $K_{FD} = N_3$ or $P_{CSI-RS,FD}$. To select columns of $B_l$, the selection vectors are used, For instance, $b_f = v_z$, where the quantity $v_z$ is a $K_{FD}$-element column vector containing a value of 1 in element (z mod $K_{FD}$) and zeros elsewhere (where the first element is element 0). Let $\{x_0, x_1, \ldots, x_{M_l-1}\}$ be indices of selection vectors selected by the index $q_2$. The selection matrix is then given by $$W_f = B_l = [v_{x_0} v_{x_1} \cdots v_{x_{M_l-1}}].$$

In one alternative Alt 1.2.3, the FD port selection is fixed (hence, not selected by the UE). For example, the FD port selection selects all $M_l = K_{FD}$ FD antenna ports. In one example, $K_{FD} = N_3$ or $P_{CSI-RS,FD}$.

In one example, $$M_v = \left\lceil p_v \frac{N_3}{R} \right\rceil$$

as in Rel. 16 enhanced Type II port selection codebook. In one example, the value of $M_v$ can be 1, in addition to the value of $M_\sigma$ supported in Rel. 16 enhanced Type II port selection codebook. In one example, the value range of R is configured from $\{1, 2\}$ or $\{1, 2, 4\}$, or $\{2, 4\}$, or $\{1, 4\}$ or $\{1, 2, 4, 8\}$.

In one example 1.3, this separate port selection in both SD and FD is via $W_1$ in the codebook, and the corresponding precoding matrix (or matrices) is (are) given by $$W^l = W_1 W_2 = XC_l = \sum_{k=0}^{L_v-1} \sum_{f=0}^{M_v-1} c_{l,i,f} x_{l,i,f}, \text{ or}$$

$$W^l = W_1 W_2 = \begin{bmatrix} X & 0 \\ 0 & X \end{bmatrix} C_l = \begin{bmatrix} \sum_{k=0}^{L_v-1} \sum_{f=0}^{M_v-1} c_{l,i,f} x_{l,i,f} \\ \sum_{k=0}^{L_v-1} \sum_{f=0}^{M_v-1} c_{l,i+L_v,f} x_{l,i,f} \end{bmatrix},$$

where $X = [x_{l,0,0} x_{l,0,1} \cdots x_{l,0,M_v-1} \cdots x_{l,L_v-1,0} x_{l,L_v-1,1} \cdots x_{l,L_v-1,M_v-1}]$, $x_{l,i,f} = a_{l,i} b_{l,f}^H$ or $\text{vec}(a_{l,i} b_{l,f}^H)$ where $a_{l,i}$ is the i-th column of the matrix $A_l$, and $b_{l,f}$ is the f-th column of the matrix $B_l$. The notation vec(X) transforms matrix X into a column vector by concatenating columns of X.

$C_l$ comprises coefficients $\{c_{l,i,f}\}$ for the selected SD-FD port pairs $\{(a_{l,i}, b_{l,f})\}$.

The set of SD port selection vectors $\{a_{l,i}\}_{i=0}^{L_l-1}$ comprising columns of $A_l$ is according to at least one of Alt 1.1.1 through Alt 1.1.3. The SD port selection is common for the two antenna polarizations, i.e., one SD basis is used for both antenna polarizations. In a variation, the SD port selection is independently for each of the two antenna polarizations, according to at least one of Alt 1.1.1 through Alt 1.1.3. The value of $L_l$ can be configured from $\{2, 4\}$ or $\{2, 3, 4\}$ or $\{2, 4, 6\}$ or $\{2, 4, 6, 8\}$.

The set of FD port selection vectors $\{b_{l,f}\}_{f=0}^{M_v-1}$ comprising columns of $B_l$ is according to at least one of Alt 1.2.1 through Alt 1.2.3.

In one example, $$M_v = \left\lceil p_v \frac{N_3}{R} \right\rceil$$

as in Rel. 16 enhanced Type II port selection codebook. In one example, the value of $M_v$ can be 1, in addition to the value of $M_\upsilon$ supported in Rel. 16 enhanced Type II port selection codebook. In one example, the value range of R is configured from {1, 2} or {1, 2, 4}, or {2, 4}, or {1, 4} or {1, 2, 4, 8}.

In one embodiment 2, a UE is configured with higher layer parameter codebookType set to 'typeII-r17' or 'typeII-PortSelection-r17' for CSI reporting based on a new (Rel. 17) Type II port selection codebook in which the port selection (which is in SD) in Rel. 15/16 Type II port selection codebook is extended to FD in addition to SD. The UE is also configured with $P_{CSIRS}$ CSI-RS ports (either in one CSI-RS resource or distributed across more than one CSI-RS resources) linked with the CSI reporting based on this new Type II port selection codebook. In one example, $P_{CSIRS}=Q$. In another example, $P_{CSIRS} \geq Q$. Here, $Q=P_{CSIRS,SD} \times P_{CSIRS,FD}$. The CSI-RS ports can be beam-formed in SD and/or FD. The UE measures $P_{CSIRS}$ (or at least Q) CSI-RS ports, estimates (beam-formed) DL channel, and determines a precoding matrix indicator (PMI) using the new port selection codebook, wherein the PMI indicates a set of components S that can be used at the gNB to construct precoding matrices for each FD unit $t \in \{0, 1, \ldots, N_3-1\}$ (together with the beamforming used to beamformed CSI-RS). In one example, $P_{CSIRS,SD} \in \{4, 8, 12, 16, 32\}$ or $\{2, 4, 8, 12, 16, 32\}$. In one example, $P_{CSIRS,SD}$ and $P_{CSIRS,FD}$ are such that their product $Q=P_{CSIRS,SD} \times P_{CSIRS,FD} \in \{4, 8, 12, 16, 32\}$ or $\{2, 4, 8, 12, 16, 32\}$.

The new port selection codebook facilitates joint port selection across SD and FD. This is illustrated in bottom part of FIG. 15. The codebook structure is similar to Rel. 15 NR Type II codebook comprising two main components.

$W_1$: to select $Y^\upsilon$ out of $P_{CSI-RS}$ SD-FD port pairs jointly
In one example, $Y_\upsilon \leq P_{CSI-RS}$ (if the port selection is independent across two polarizations or two groups of antennas with different polarizations)

$$Y_\upsilon \leq \frac{P_{CSI-RS}}{2}$$

In one example, (if the port selection is common across two polarizations or two groups of antennas with different polarizations)

$W_2$: to select coefficients for the selected $Y_\upsilon$ SD-FD port pairs.

In one example, the joint port selection (and its reporting) is common across multiple layers (when $\upsilon>1$). In one example, the joint port selection (and its reporting) is independent across multiple layers (when $\upsilon>1$). The reporting of the selected coefficients is independent across multiple layers (when $\upsilon>1$).

In one example 2.1, the corresponding precoding matrix (or matrices) is (are) given by $$W^l = W_1 W_2 = XC_l = \sum_{i=0}^{Y_\upsilon-1} c_{l,i} x_{l,i}, \text{ or}$$

$$W^l = W_1 W_2 = \begin{bmatrix} X & 0 \\ 0 & X \end{bmatrix} C_l = \begin{bmatrix} \sum_{i=0}^{Y_\upsilon-1} c_{l,i} x_{l,i} \\ \sum_{i=0}^{Y_\upsilon-1} c_{l,i+L_\upsilon} x_{l,i} \end{bmatrix},$$

where $X = [x_{l,0} x_{l,1} \ldots x_{l,Y_\upsilon-1}]$, $x_{l,i} = a_{l,i} b_{l,i}^H$ or $\text{vec}(a_{l,i} b_{l,i}^H)$ where $(a_{l,i}, b_{l,i})$ is the i-th SD-FD port pair. The notation vec(X) transforms matrix X into a column vector by concatenating columns of X.

$C_l$ comprises coefficients $\{c_{l,i}\}$ for the selected SD-FD port pairs $\{(a_{l,i}, b_{l,i})\}$.

In one example, $Y_\upsilon=y$ for any value of $\upsilon$. In one example, $Y_\upsilon=y1$ for $\upsilon \in \{1, 2\}$ and $Y_\upsilon=y2$ for $\upsilon \in \{3, 4\}$. In one example, $Y_\upsilon$ is different (independent) for different value of $\upsilon$. In one example, $Y_\upsilon$ is configured, e.g., via higher layer RRC signaling. In one example, $Y_\upsilon$ is reported by the UE.

$$\left\{2, 3, 4, \ldots, \frac{P_{CSI-RS}}{2}\right\}.$$

In one example, $Y_\upsilon$ takes a value from $\{2, 3, 4, \ldots, P_{CSI-RS}\}$ or In one example, $Y_\upsilon$ can take a value greater than $$P_{CSI-RS} \text{ or } \frac{P_{CSI-RS}}{2}.$$

In one example, $Y_\upsilon = L \times M_\upsilon$. In one example, $Y_\upsilon = L_\upsilon \times M_\upsilon$. In one example, L or $L_\upsilon$ can be configured from $\{2, 4\}$ or $\{2, 3, 4\}$ or $\{2, 4, 6\}$ or $\{2, 4, 6, 8\}$. In one example, $$M_\upsilon = \left\lceil p_\upsilon \frac{N_3}{R} \right\rceil$$

as in Rel. 16 enhanced Type II port selection codebook. In one example, the value of $M_v$ can be 1, in addition to the value of $M_\upsilon$ supported in Rel. 16 enhanced Type II port selection codebook. In one example, the value range of R is configured from {1, 2} or {1, 2, 4}, or {2, 4}, or {1, 4} or {1, 2, 4, 8}.

In one example 2.2, when the configured value $Y_\upsilon$ is greater than $P_{CSI-RS}$ or $$\frac{P_{CSI-RS}}{2},$$

then the value $Y_\upsilon$ is divided into two parts $Y_{\upsilon,1}$ and $Y_{\upsilon,2}$ such that $Y_\upsilon = Y_{\upsilon,1} + Y_{\upsilon,2}$.

The UE selects $Y_{\upsilon,1}$ SD-FD port pairs via CSI-RS measured in a first time slot, and selects $Y_{\upsilon,2}$ SD-FD port pairs via CSI-RS measured in a second time slot. In one example, the first and second time slots are configured to the UE. In one example, the first time slot is configured to the UE, and the second time slot is derived based on the first time slot, e.g., the second time slot is n+1 if the first time slot=n.

The UE selects $Y_{\upsilon,1}$ SD-FD port pairs via CSI-RS measured in a first frequency resource set, and selects $Y_{\upsilon,2}$ SD-FD port pairs via CSI-RS measured in a second frequency resource set. In one example, the first and second frequency resource sets corresponds to even-numbered and odd-numbered SBs or PRBs, respectively, in the configured CSI reporting band. In one example, the first and second frequency resource sets corresponds to odd-numbered and even-numbered SBs or PRBs, respectively, in the configured CSI reporting band. In one example, the first and second frequency resource sets corresponds to a first half and a second half of SBs or PRBs, respectively, in the configured CSI reporting band. In one example, the first and second frequency resource sets belong to the same time slot. In one example, the first and second frequency resource sets may belong to the same time slot or two different time slots.

When different time slots are used, the two slots time slots can be configured to the UE. Alternatively, the first time slot is configured to the UE, and the second time slot is derived based on the first time slot, e.g., the second time slot is n+1 if the first time slot=n.

Figure 16:
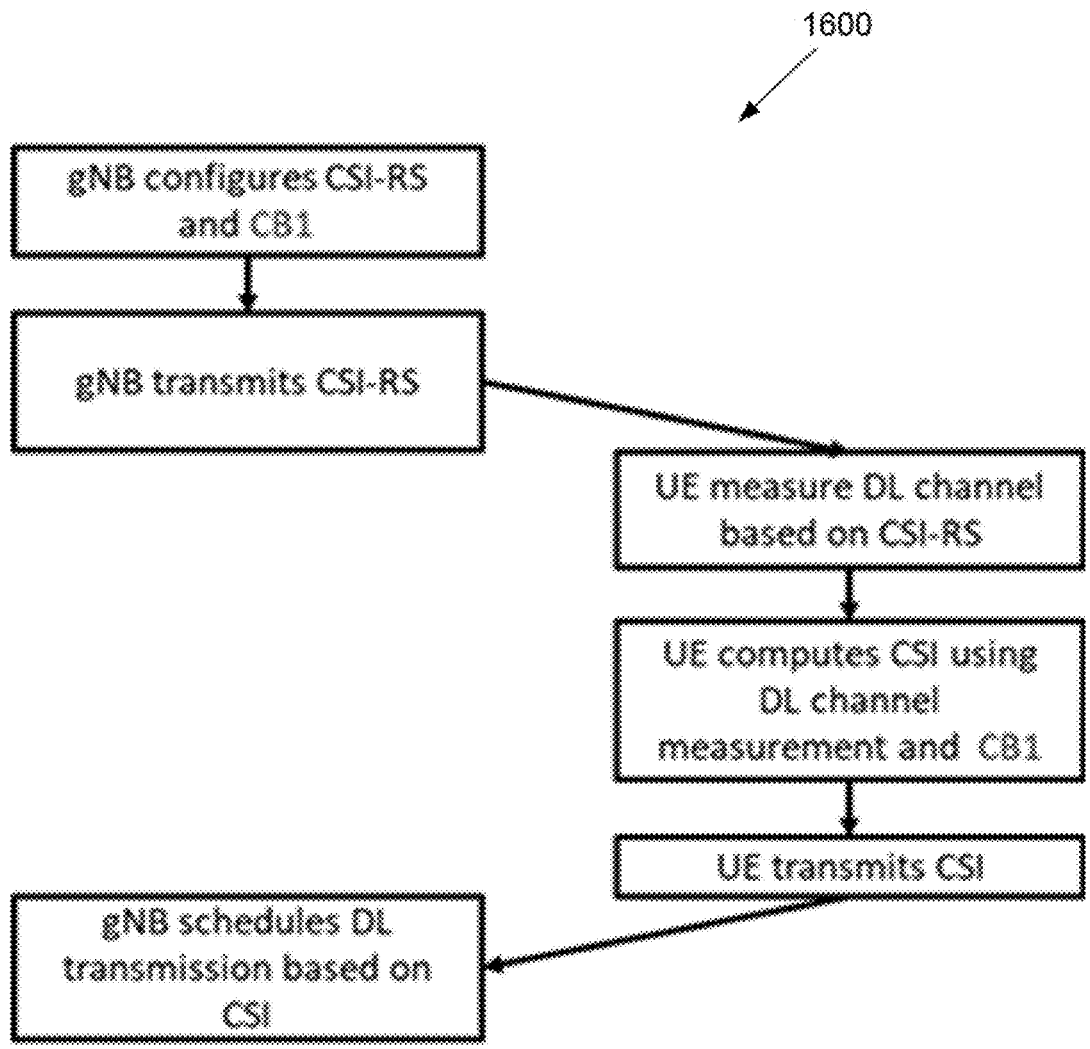
FIG. 16 illustrates an example of the gNB and UE procedures for CSI reporting according to embodiments of the disclosure.

FIG. 16 illustrates an example of the gNB and UE procedures for CSI reporting 1600 according to embodiments of the disclosure. The embodiment of the gNB and UE procedures for CSI reporting 1600 illustrated in FIG. 16 is for illustration only. FIG. 16 does not limit the scope of this disclosure to any particular implementation of the example of the gNB and UE procedures for CSI reporting 1600.

In embodiment 3.1, the gNB and UE procedures for CSI reporting according to an embodiment of this disclosure is illustrated in FIG. 16, wherein CB1 is the proposed new port selection codebook.

Figure 17:
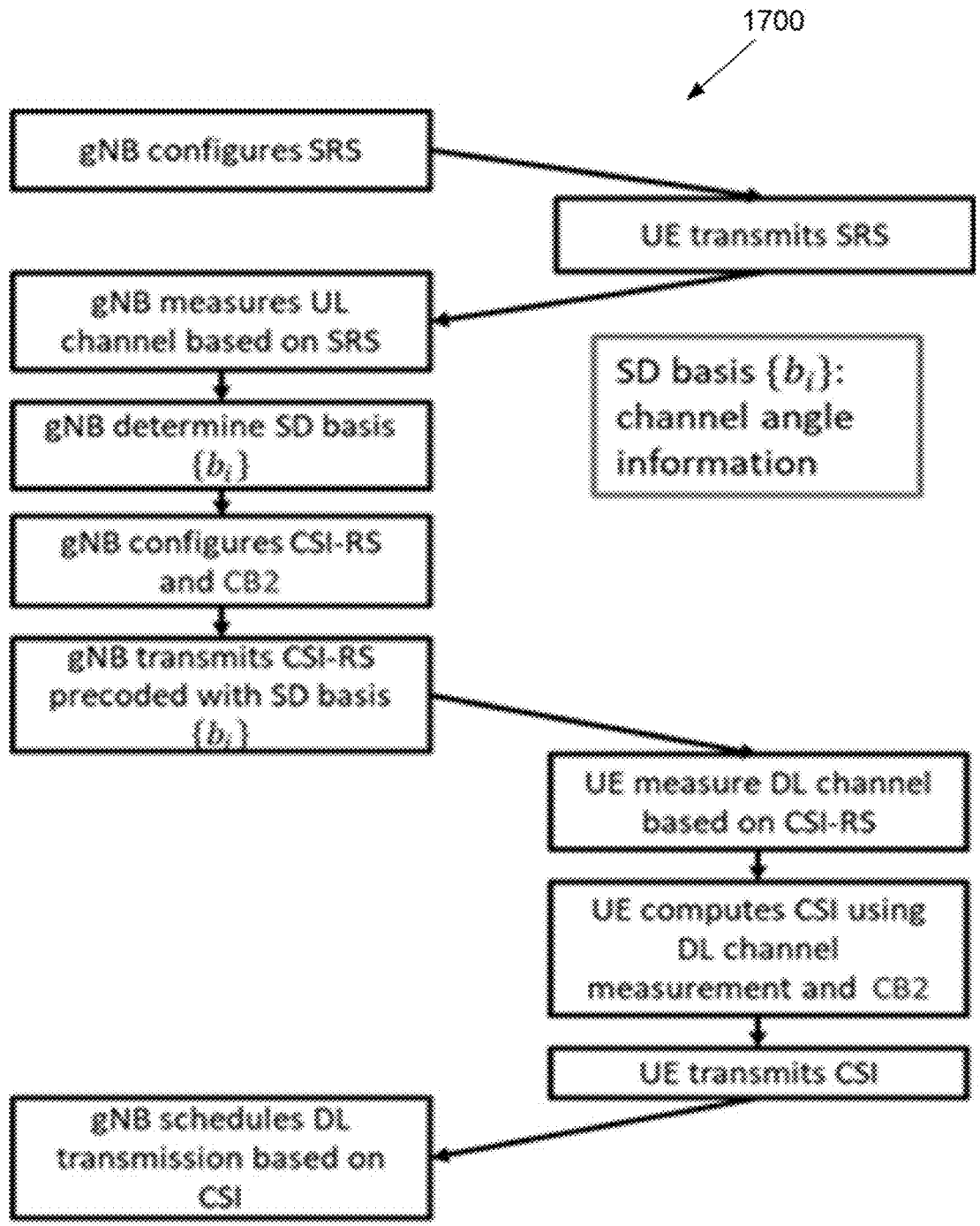
FIG. 17 illustrates an example of the gNB and UE procedures for CSI reporting according to embodiments of the disclosure.

FIG. 17 illustrates an example of the gNB and UE procedures for CSI reporting 1700 according to embodiments of the disclosure. The embodiment of the gNB and UE procedures for CSI reporting 1700 illustrated in FIG. 17 is for illustration only. FIG. 17 does not limit the scope of this disclosure to any particular implementation of the example of the gNB and UE procedures for CSI reporting 1700.

In embodiment 3.2, the gNB and UE procedures for CSI reporting according to an embodiment of this disclosure is illustrated in FIG. 16, wherein CB2 is the proposed new port selection codebook.

Figure 18:
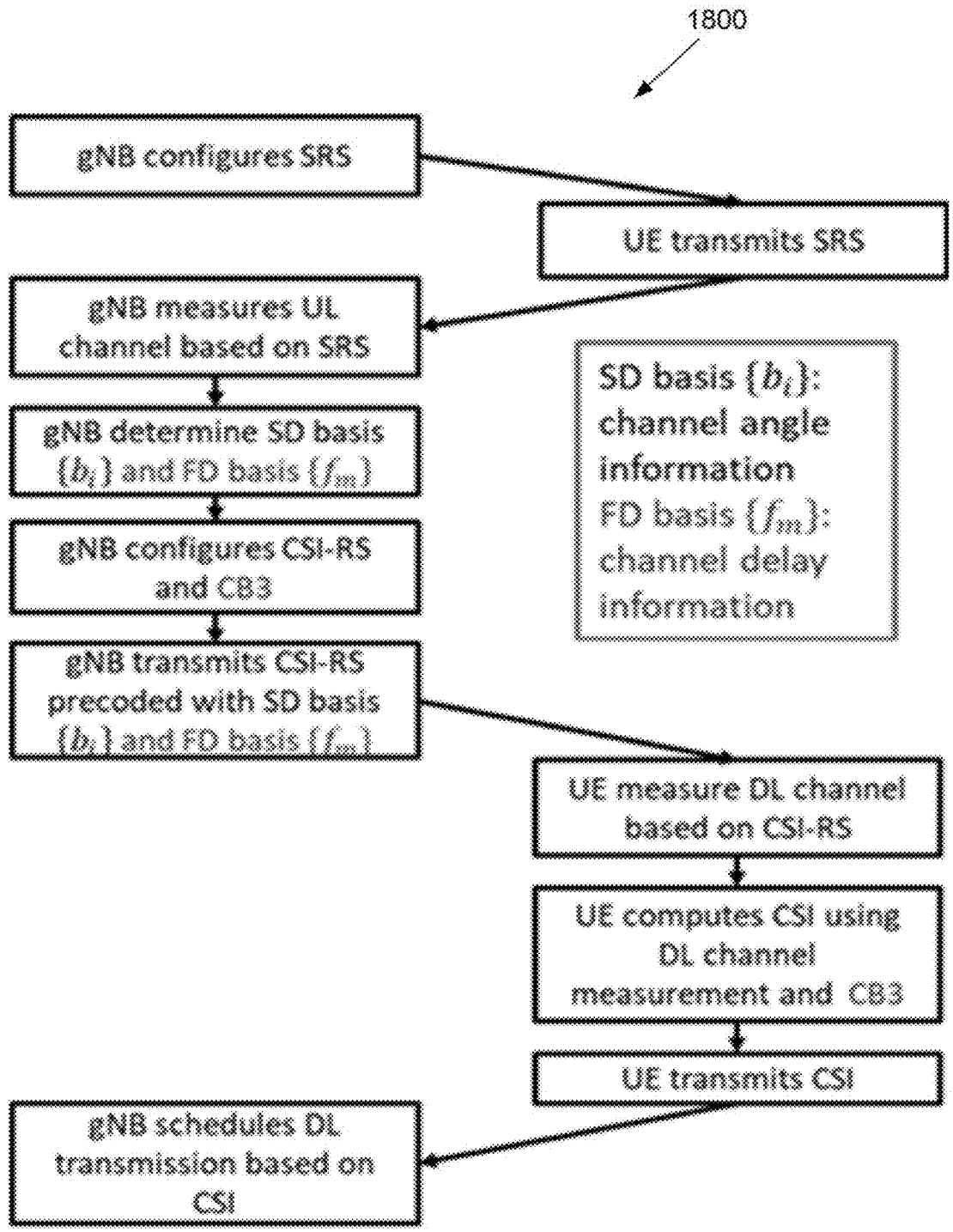
FIG. 18 illustrates an example of the gNB and UE procedures for CSI reporting according to embodiments of the disclosure.

FIG. 18 illustrates an example of the gNB and UE procedures for CSI reporting 1700 according to embodiments of the disclosure. The embodiment of the gNB and UE procedures for CSI reporting 1800 illustrated in FIG. 18 is for illustration only. FIG. 18 does not limit the scope of this disclosure to any particular implementation of the example of the gNB and UE procedures for CSI reporting 1800.

In embodiment 3.3, the gNB and UE procedures for CSI reporting according to an embodiment of this disclosure is illustrated in FIG. 18, wherein CB3 is the proposed new port selection codebook.

In embodiment 4.1, a UE is configured with higher layer parameter codebookType set to 'typeII-r17' or 'typeII-PortSelection-r17' for CSI reporting based on a new (Rel. 17) Type II port selection codebook in which the port selection (which is in SD) in Rel. 15/16 Type II port selection codebook is extended to FD in addition to SD. The PMI codebook has a $W=W_1 \tilde{W}_2 W_f^H$ structure, where the component $W_f$ of the codebook may or may not be present (i.e., may or may not reported or turned ON/OFF). In one example, when the component $W_f$ is reported (or turned ON or is part of the codebook), the codebook is according to embodiment 1 and when the component $W_f$ is not reported (or turned OFF or is not part of the codebook), the codebook is according to embodiment 2.

When turned off, the component $W_f$ can be fixed, for example, to an all-one vector $$\frac{1}{n}[1, 1, \ldots, 1] \text{ or } \frac{1}{n}[1, 1, \ldots, 1]^T \text{ or } \frac{1}{n}\begin{bmatrix}1\\ \vdots \\ 1\end{bmatrix}$$

having a length $N_3$, which corresponds to a DC component or DFT component 0 or FD basis 0, and n is a normalization factor, e.g., $n=\sqrt{N_3}$. In one example, n=1, i.e., the all-one vector is $[1, 1, \ldots, 1]$ or $[1, 1, \ldots, 1]^T$ or $$\begin{bmatrix}1\\ \vdots \\ 1\end{bmatrix}.$$

Let $M_\upsilon$ be the number of columns of $W_f$. Then, in one example, $W_f$ can also be turned OFF and/or can be fixed to the all-one vector by setting $M_\upsilon=1$. In one example, $$M_\upsilon = \left\lceil p_\upsilon \times \frac{N_3}{R} \right\rceil,$$

where R is higher-layer configured and $p_\upsilon$ is higher-layer configured (similar to Rel. 16 enhanced Type II codebook). Then, $M_\upsilon=1$ can also be set implicitly by setting $$p_\upsilon = \frac{R}{N_3}.$$

In one example, $M_\upsilon = \lceil p_\upsilon \times N_{SB} \rceil$, where $N_{SB}$ is higher-layer configured and indicates the number of SB configured for CSI reporting. Then, $M_\upsilon=1$ can also be set implicitly by setting $$p_\upsilon = \frac{1}{N_{SB}}.$$

For an orthogonal DFT basis for $W_f$, let us denote the f-th DFT basis vector (identified by $n_{3,l}^{(f)}$ as $b_f = [y_{0,l}^{(f)}, y_{1,l}^{(f)}, \ldots, y_{N_3-1,l}^{(f)}]^T$ where $$y_{t,l}^{(f)} = e^{j\frac{2\pi t n_{3,l}^{(f)}}{N_3}}, t = \{0, 1, \ldots, N_3 - 1\}$$

is the FD unit/component index, and $l=\{1, \ldots, \upsilon\}$ is the layer index. Note that if we set $f=0$ and $n_{3,l}^{(0)}=0$, then $$y_{t,l}^{(0)} = e^{j\frac{2\pi t n_{3,l}^{(0)}}{N_3}} = e^{j\frac{2\pi t \cdot 0}{N_3}} = 1$$

for all $t=\{0, 1, \ldots, N_3-1\}$. Hence, $b_0=[1, 1, \ldots, 1]^T$ establishing that DFT basis vector with index 0 is the all-one vector.

Based on the above, for an orthogonal DFT basis for $W_f$, the functionality of $W_f$ OFF can also be achieved by $W_f$ ON with $M_\upsilon=1$ and vice versa. This is due to the fact that $W_f$ ON with $M_\upsilon=1$ corresponds to a DFT basis vector $b_f$ where $f \in \{0, 1, \ldots, N_3-1\}$, which can be written as $\phi_f \times b_0$, a DFT basis vector $b_0$ (the all-one vector) phase shifted by $\phi_f$. Since the phase shift doesn't impact the reconstruction of a precoding vector based on FD compression, i.e., $W_1 W_2 b_f^H = \phi_f^* W_1 W_2 b_0^H = W_1 W_2 b_0^H$, we can achieve $W_f$ with $M_\upsilon=1$ by fixing $W_f$ to be a DFT basis vector $b_0$. Therefore, $W_f$ OFF (with the all-one vector) is the same as (hence can be replaced with) $W_f$ with $M_\upsilon=1$.

In the codebook description, we can have $W_f$ present (ON). When $W_f$ needs to be turned OFF, $W_f$ is simply set to $W_f = b_0$ by setting (or configuring) $M_\upsilon=1$ (hence, doesn't require reporting from the UE). When $W_f$ is turned ON, $W_f$ is determined as $$W_f = \left[ b_{n_{3,l}^{(0)}}, \ldots b_{n_{3,l}^{(M_v-1)}} \right]$$

by setting (or configuring) $M_\upsilon > 1$ (e.g., $M_\upsilon = 2$). In one example, all indices of columns of the determined $W_f$ require reporting from the UE or are fixed (e.g., to index $0, 1, \ldots, M_\upsilon - 1$). In one example, one of the index of the determined $W_f$ is fixed (e.g., $n_{3,l}^{(0)} = 0$), and the remaining $n_{3,l}^{(1)} \ldots n_{3,l}^{(M_\upsilon-1)}$ are determined, and require reporting from the UE.

In summary, when $M_\upsilon = 1$, $W_f$ corresponds to a fixed vector, for example, the all-one vector (as explained above). The all-one vector can be identified by the index $n_{3,l}^{(0)} = 0$ indicating the DFT component 0 (or DFT basis vector), and doesn't require reporting from the UE.

When $M_\upsilon > 1$ (e.g., $M_\upsilon = 2$), $W_f$ comprises $M_\upsilon$ vectors, $[y_{0,l}^{(f)}, y_{1,l}^{(f)}, \ldots, y_{N_3-1,l}^{(f)}]^T$, $f=0, 1, \ldots, M_\upsilon - 1$, are identified by $$n_{3,l} = [n_{3,l}^{(0)}, \ldots, n_{3,l}^{(M_\upsilon-1)}]$$

$$n_{3,l}^{(f)} \in \{0, 1, \ldots, N-1\}$$

In one example, $n_{3,l}$ are indicated by means of the PMI indices, e.g., $i_{1,6,l}$ (for $M_\upsilon > 1$ and $$l = 1, \ldots, v), i_{1,6,l} \in \left\{ 0, 1, \ldots, \binom{N}{M_v} - 1 \right\},$$

and are reported by the UE. In one example, N is the window-length or size (e.g., N=2, 3, 4 or $N_3$).

In one example $n_{3,l}^{(0)} = 0$ is fixed, and $n_{3,l}^{(1)}, \ldots, n_{3,l}^{(M_\upsilon-1)}$ are indicated by means of the PMI indices, e.g., $i_{1,6,l}$ (for $M_\upsilon > 1$ and $l=1, \ldots, \upsilon$), $$i_{1,6,l} \in \left\{ 0, 1, \ldots, \binom{N-1}{M_v - 1} - 1 \right\},$$

and are reported by the UE. In one example, N is the window-length or size (e.g., N=2, 3, 4 or $N_3$).

Alternatively, $n_{3,l}^{(0)} = 0$ for $l = 1, \ldots, \upsilon$, and is not reported by the UE. If $M_\upsilon > 1$, the nonzero elements of $n_{3,l}$ identified by $n_{3,l}^{(1)}, \ldots, n_{3,l}^{(M_\upsilon-1)}$, and are reported via a PMI component, e.g., $i_{1,6,l}$ or are fixed (e.g., to index $1, \ldots, M_\upsilon - 1$).

At least one of the following exampled can be used/configured regarding the medium and signaling related to Wf ON/OFF.

In one example 4.1.1, the component $W_f$ can be turned ON/OFF (reported or not reported) explicitly. At least one of the following examples can be used/configured.

In one example 4.1.1.1, this is based on a higher layer RRC signaling using either a dedicated parameter, or an existing parameter (joint configuration), for example, this can be based on the value of number of CSI-RS port $P_{CSIRS}$ or based on the value of $M_\upsilon$ indicating the number of columns of $W_f$ (e.g., $M_\upsilon = 1$ indicating turning OFF and $M_\upsilon > 1$ indicating turning ON) or based on the value of $p_\upsilon$ indicating the number of columns of $$W_f (\text{e.g.,} \ p_v = \frac{R}{N_3}$$

indicating turning OFF and $$p_v \neq \frac{R}{N_3}$$

indicating turning ON; or $$p_v = \frac{1}{N_{SB}}$$

indicating turning OFF and $$p_v \neq \frac{1}{N_{SB}}$$

indicating turning ON).

In one example 4.1.1.2, this is based on a MAC CE based indication using either a dedicated MAC CE field, or an existing field (joint indication). For example, a value of $M_\upsilon$ indicating the number of columns of $W_f$ can be indicated via MAC CE based indication, e.g., $M_\upsilon = 1$ indicating turning OFF and $M_\upsilon > 1$ indicating turning ON. Alternatively, a value of $p_\upsilon$ indicating the number of columns of $W_f$ can be indicated via MAC CE based indication, e.g., $$p_v = \frac{R}{N_3}$$

indicating turning OFF and $$p_v \neq \frac{R}{N_3}$$

indicating turning ON; or $$p_v = \frac{1}{N_{SB}}$$

indicating turning OFF and $$p_v \neq \frac{1}{N_{SB}}$$

indicating turning ON.

In one example 4.1.1.3, this is based on a dynamic DCI based triggering using either a dedicated DCI field or code point, or an existing DCI field (joint triggering). For example, a value of $M_\upsilon$ indicating the number of columns of $W_f$ can be indicated via DCI based indication, e.g., $M_\upsilon = 1$ indicating turning OFF and $M_\upsilon > 1$ indicating turning ON. Alternatively, a value of $p_\upsilon$ indicating the number of columns of $W_f$ can be indicated via DCI based indication, e.g., $$p_v = \frac{R}{N_3}$$

indicating turning OFF and $$p_v \neq \frac{R}{N_3}$$

indicating turning ON; or $$p_v = \frac{1}{N_{SB}}$$

indicating turning OFF and $$p_v \neq \frac{1}{N_{SB}}$$

indicating turning ON.

In one example 4.1.2, the component $W_f$ can be turned ON/OFF (or reported or not reported) implicitly. At least one of the following examples can be used/configured.

In one example 4.1.2.1, this is based on a codebook parameter. For example, when $M_\upsilon=1$, the component $W_f$ can be turned off. Alternatively, when L>4, the component $W_f$ can be turned off. Alternatively, when $M_\upsilon=1$ and L>4, the component $W_f$ can be turned off. Alternatively, when $$p_v = \frac{R}{N_3} \text{ or } p_v = \frac{1}{N_{SB}},$$

the component $W_f$ can be turned off.

In one example 4.1.2.2, this is based on the value of number of CSI-RS port $P_{CSIRS}$.

In one example 4.1.3, the component $W_f$ is turned on/off (or not reported) based on the UE capability signaling. For example, a UE in its capability signaling can report whether it supports turning ON/OFF of the component $W_f$. Alternatively, a UE in its capability signaling can report whether it supports the component $W_f$ as part of the codebook. Based on the UE capability reporting, the gNB can (configure) turn the component $W_f$ ON/OFF. At least one of the following examples can be used/configured.

In one example 4.1.3.1, the UE reports whether it supports a value $M_\upsilon>1$ (indicating turning ON). When the UE reports that it supports a value $M_\upsilon>1$, then the component $W_f$ is turned ON; otherwise the component $W_f$ is turned OFF. Alternatively, when the UE reports that it supports a value $M_\upsilon>1$, then the component $W_f$ can be turned ON or OFF (by gNB, e.g., via RRC signaling); otherwise the component $W_f$ is turned OFF.

In one example 4.1.3.2, the UE reports whether it supports a value $$p_v = \frac{R}{N_3}$$

(indicating turning ON). When the UE reports that it supports a value $$p_v = \frac{R}{N_3},$$

then the component $W_f$ is turned off; otherwise the component $W_f$ is turned ON. Alternatively, when the UE reports that it supports a value $$p_v = \frac{R}{N_3},$$

then the component $W_f$ can be turned ON or OFF (by gNB, e.g., via RRC signaling); otherwise the component $W_f$ is turned OFF.

In one example 4.1.3.3, the UE reports whether it supports a value $$p_v = \frac{1}{N_{SB}}$$

(indicating turning ON). When the UE reports that it supports a value $$p_v = \frac{1}{N_{SB}},$$

then the component $W_f$ is turned off; otherwise the component $W_f$ is turned ON. Alternatively, when the UE reports that it supports a value $$p_v = \frac{1}{N_{SB}},$$

then the component $W_f$ can be turned ON or OFF (by gNB, e.g., via RRC signaling); otherwise the component $W_f$ is turned OFF.

In one example 4.1.3.4, the UE reports a set of values of $M_\upsilon$ that it supports (which may include a value indicating turning OFF, e.g., $M_\upsilon=1$). When the UE does not report anything about $M_\upsilon$, then the component $W_f$ is turned OFF (by default); otherwise the component $W_f$ can be turned ON or OFF (by gNB, e.g., via RRC signaling) based on the set of values of $M_\upsilon$ that the UE reported.

In one example 4.1.3.5, the UE reports a set of values of $p_\upsilon$ that it supports (which may include a value indicating turning OFF, $$\text{e.g., } p_v = \frac{1}{N_{SB}}).$$

When the LE does not report anything about $p_\upsilon$, then the component $W_f$ is turned OFF (by default); otherwise the component $W_f$ can be turned ON or OFF (by gNB, e.g., via RRC signaling) based on the set of values of $p_\upsilon$ that the UE reported.

In one example 4.1.3.6, the UE reports a set of values of $M_\upsilon$ that it supports (which may include a value indicating turning OFF, e.g., $$p_\upsilon = \frac{R}{N_3}).$$

When the UE does not report anything about $p_\upsilon$, then the component $W_f$ is turned OFF (by default); otherwise the component $W_f$ can be turned ON or OFF (by gNB, e.g., via RRC signaling) based on the set of values of $p_\upsilon$ that the UE reported.

In one example 4.1.4, the component $W_f$ is turned off (or not reported) dynamically by the UE (e.g., based on the channel measurement). In one example, the UE reports this dynamic turning ON/OFF of the component $W_f$ in its CSI reporting. When a two-part UCI is used report the CSI, then the indication of turning ON/OFF of the component $W_f$ can be included in the UCI part 1 either as a separate UCI parameter or jointly with an existing UCI parameter in UCI part 1. The reporting of the turning OFF/ON can be based on an indication in the CSI report that indicates either a value of $M_\upsilon=1$ (e.g., $M_\upsilon=1$) or a value of $$p_\upsilon \left( e.g., p_\upsilon = \frac{R}{N_3} \text{ or } \frac{1}{N_{SB}} \right)$$

or $W_f$ being the all-one vector.

In one embodiment 5.1, the all-one vector, as described in embodiment 4.1 (e.g., when the component $W_f$ is turned OFF) has a length $N_3$ (i.e., number of elements in the all-one vector), which is determined/configured according to at least one of the following examples.

In one example 5.1.1, $N_3$ is fixed. In one example, $N_3=1$. In one example, $N_3=N_{SB}$. In one example, $N_3=R \times N_{SB}$ (as in Rel. 16). In one example, $N_3=R$. Here, R can be fixed (e.g., 1 or 2 or 4 or 8 or $D \times N_{PRB}^{SB}$ or min$\{D \times N_{PRB}^{SB}, x\}$) or configured via a higher-layer parameter, e.g., numberOfPMISubbandsPerCQISubband.

In one example 5.1.2, $N_3$ is configured. In one example, this configuration is via RRC signaling (either via a separate parameter or jointly with another parameter). In one example, this configuration is via MAC CE indication (either via a separate parameter/field or jointly with another parameter/field). In one example, this configuration is via DCI indication (either via a separate parameter/field or jointly with another parameter/field).

In one example 5.1.3, $N_3$ is determined based on the UE capability reporting. In one example, the UE can only report a single value. In one example, the UE can report a single value or multiple values, e.g., $\{1, N_{SB}\}$.

In one example 5.1.4, $N_3$ is fixed (e.g., example 5.1.1) or configured (example 5.1.2) subject to (or conditioned on) the UE capability reporting (example 5.1.3).

Here x=2 or 4 or 8, D is the density of CSI-RS in frequency domain and $N_{PRB}^{SB}$ is the CQI subband size in PRBs.

In one embodiment 5.1A, the all-one vector, as described in embodiment 4.1 (e.g., when the component $W_f$ is turned OFF) has a length $N_3$ (i.e., number of elements in the all-one vector). The value of $N_3$ is fixed. In one example, $N_3>1$. In one example, $N_3=N_{SB}$. In one example, $N_3=R \times N_{SB}$ (as in Rel. 16). Here, R can be fixed (e.g., 1 or 2 or 4 or 8 or $D \times N_{PRB}^{SB}$ or min$\{D \times N_{PRB}^{SB}, x\}$) or configured via a higher-layer parameter, e.g., numberOfPMISubbandsPerCQISubband.

The value of $N_3$ is fixed regardless of whether $W_f$ is OFF or ON, i.e., the value of $N_3$ is independent of whether $W_f$ is OFF or ON. In this case, $N_3$ equals to the number of rows of the $W_f$ matrix.

When $W_f$ is OFF or ON is configured/determined based on the value $M_\upsilon$, (i.e., number of columns of $W_f$), the value of $N_3$ is fixed regardless of the value of $M_\upsilon$ (cf. example 4.1.1.1), i.e., the value of $N_3$ is independent of whether $M_\upsilon=1$ or $M_\upsilon>1$ (e.g., $M_\upsilon=2$). In this case, when $W_f$ is turned OFF, $W_f$ is fixed to an $N_3 \times 1$ column vector comprising all ones $[1, 1, \ldots, 1]^T$ (as explained above), and when $W_f$ is turned ON, $W_f$ is a $N_3 \times M_\upsilon$ matrix where $M_\upsilon>1$ (as explained above).

However, the frequency granularity of PMI reporting (e.g., configured via pmiFormatIndicator) is set/configured according to at least one of the following examples.

In one example 5.1A.1, the frequency granularity of PMI reporting (e.g., configured via pmiFormatIndicator) is set to wideband (WB). In other words, the UE is expected to be configured with pmi-FormatIndicator set to 'widebandPMI' if codebookType is set to 'typeII-r17' or 'typeII-PortSelection-r17' regardless of whether the value of $M_\upsilon=1$ or $M_\upsilon>1$ (e.g., $M_\upsilon=2$) or regardless of whether $W_f$ is turned OFF or ON.

In one example 5.1A.2, the frequency granularity of PMI reporting (e.g., configured via pmiFormatIndicator) is not expected to be subband (SB). In other words, the UE is not expected to be configured with pmi-FormatIndicator set to 'subbandPMI' if codebookType is set to 'typeII-r17' or 'typeII-PortSelection-r17' regardless of whether the value of $M_\upsilon=1$ or $M_\upsilon>1$ (e.g., $M_\upsilon=2$) or regardless of whether $W_f$ is turned OFF or ON.

In one example 5.1A.3, the frequency granularity of PMI reporting (e.g., configured via pmiFormatIndicator) is not configured. In other words, a UE is not expected to be configured with pmi-FormatIndicator if codebookType is set to 'typeII-r17' or 'typeII-PortSelection-r17'.

In one example 5.1A.4, the frequency granularity of PMI reporting (e.g., configured via pmiFormatIndicator) is set to wideband (WB) if $W_f$ is turned OFF or $M_\upsilon=1$, and set to subband (SB) if $W_f$ is turned ON or $M_\upsilon>1$ (e.g., $M_\upsilon=2$). In other words, if the codebookType is set to 'typeII-r17' or 'typeII-PortSelection-r17', the UE is expected to be configured with pmi-FormatIndicator set to 'widebandPMI' if $W_f$ is turned OFF or $M_\upsilon=1$ and the UE is expected to be configured with pmi-FormatIndicator set to 'subbandPMI' if $W_f$ is turned ON or $M_\upsilon>1$ (e.g., $M_\upsilon=2$).

In examples 5.1A.1 through 5.1A.3, the value of $M_\upsilon$ needs to be configured in addition to pmiFormatIndicator. In example 5.1A.4, however, the value of $M_\upsilon$ may not be configured (e.g., via a dedicated parameter or via a joint parameter), and can be determined based on the pmiFormatIndicator. For example, when pmiFormatIndicator=WB, $M_\upsilon=1$, and when pmiFormatIndicator=SB, $M_\upsilon>1$ (e.g., $M_\upsilon=2$).

In one embodiment 5.1B, which is similar to embodiment 5.1A, the all-one vector, as described in embodiment 4.1 (e.g., when the component $W_f$ is turned OFF) has a length $N_3$ (i.e., number of elements in the all-one vector). The value of $N_3$ is fixed. In one example, $N_3>1$. In one example, $N_3=N_{SB}$. In one example, $N_3=R \times N_{SB}$ (as in Rel. 16). Here, R can be fixed (e.g., 1 or 2 or 4 or 8 or $D \times N_{PRB}^{SB}$ or min$\{D \times N_{PRB}^{SB}$, x}) or configured via a higher-layer parameter, e.g., numberOfPMISubbandsPerCQISubband.

The value of $N_3$ is fixed regardless of whether $W_f$ is OFF or ON, i.e., the value of $N_3$ is independent of whether $W_f$ is OFF or ON. In this case, $N_3$ equals to the number of rows of the $W_f$ matrix.

When $W_f$ is OFF or ON is configured/determined based on the value $M_\upsilon$ (i.e., number of columns of $W_f$), the value of $N_3$ is fixed regardless of the value of $M_\upsilon$ (cf. example 4.1.1.1), i.e., the value of $N_3$ is independent of whether $M_\upsilon=1$ or $M_\upsilon>1$ (e.g., $M_\upsilon=2$). In this case, when $W_f$ is turned OFF, $W_f$ is fixed to an $N_3 \times 1$ column vector comprising all ones $[1, 1, \ldots 1]^T$ (as explained above), and when $W_f$ is turned ON, $W_f$ is a $N_3 \times M_\upsilon$ matrix where $M_\upsilon>1$ (as explained above).

However, the frequency granularity of CSI reporting (e.g., configured via reportFreqConfiguration) is set/configured according to the following.

As described in section 5.2.1, TS 38.214 [REF8], a UE can be configured by higher layers with a CSI Reporting Setting (e.g., via RRC parameter CSI-ReportConfig) which includes a parameter reportFreqConfiguration that indicates the reporting granularity in the frequency domain. In particular, the CSI Reporting Setting is said to have a wideband frequency-granularity if reportQuantity is set to 'cri-RI-PMI-CQI', or 'cri-RI-LI-PMI-CQI', cqi-FormatIndicator is set to 'widebandCQI' and pmi-FormatIndicator is set to 'widebandPMI', or reportQuantity is set to 'cri-RI-PMI-CQI', or 'cri-RI-LI-PMI-CQI', and X is configured, or reportQuantity is set to 'cri-RI-i1' or reportQuantity is set to 'cri-RI-CQI' or 'cri-RI-i1-CQI' and cqi-FormatIndicator is set to 'widebandCQI', or reportQuantity is set to 'cri-RSRP' or 'ssb-Index-RSRP' or 'cri-SINR', or 'ssb-Index-SINR' otherwise, the CSI Reporting Setting is said to have a subband frequency-granularity.

Here, the configuration X is according to at least one of the following examples.

In one example 5.1B.1, X corresponds to the configuration in which cqi-FormatIndicator is set to 'widebandCQI', and codebookType set to 'typeII-r16' or 'typeII-PortSelection-r16' or 'typeII-r17' or 'typeII-PortSelection-r17'.

In one example 5.1B.2, X corresponds to the configuration in which cqi-FormatIndicator is set to 'widebandCQI', and codebookType set to 'typeII-r17' or 'typeII-PortSelection-r17'.

In one example 5.1B.3, X corresponds to the configuration in which cqi-FormatIndicator is set to 'widebandCQI', and codebookType set to 'typeII-r17'.

In one example 5.1B.4, X corresponds to the configuration in which cqi-FormatIndicator is set to 'widebandCQI', and codebookType set to 'typeII-PortSelection-r17'.

In one example 5.1B.5, X corresponds to the configuration in which cqi-FormatIndicator is set to 'widebandCQI', and pmi-FormatIndicator is not provided (or not configured), codebookType set to 'typeII-r16' or 'typeII-PortSelection-r16' or 'typeII-r17' or 'typeII-PortSelection-r17'.

In one example 5.1B.6, X corresponds to the configuration in which cqi-FormatIndicator is set to 'widebandCQI', and pmi-FormatIndicator is not provided (or not configured), codebookType set to 'typeII-r17' or 'typeII-PortSelection-r17'.

In one example 5.1B.7, X corresponds to the configuration in which cqi-FormatIndicator is set to 'widebandCQI', and pmi-FormatIndicator is not provided (or not configured), codebookType set to 'typeII-r17'.

In one example 5.1B.8, X corresponds to the configuration in which cqi-FormatIndicator is set to 'widebandCQI', and pmi-FormatIndicator is not provided (or not configured), codebookType set to 'typeII-PortSelection-r17'.

In one example 5.1B.9, X corresponds to the configuration in which cqi-FormatIndicator is set to 'widebandCQI', codebookType set to 'typeII-r16' or 'typeII-PortSelection-r16' or 'typeII-r17' or 'typeII-PortSelection-r17', and $M_\upsilon=1$.

In one example 5.1B.10, X corresponds to the configuration in which cqi-FormatIndicator is set to 'widebandCQI', codebookType set to 'typeII-r17' or 'typeII-PortSelection-r17', and $M_\upsilon=1$.

In one example 5.1B.11, X corresponds to the configuration in which cqi-FormatIndicator is set to 'widebandCQI', codebookType set to 'typeII-r17', and $M_\upsilon=1$.

In one example 5.1B.12, X corresponds to the configuration in which cqi-FormatIndicator is set to 'widebandCQI', codebookType set to 'typeII-PortSelection-r17', and $M_\upsilon=1$.

In one example 5.1B.13, X corresponds to the configuration in which cqi-FormatIndicator is set to 'widebandCQI', pmi-FormatIndicator is not provided (or not configured), codebookType set to 'typeII-r16' or 'typeII-PortSelection-r16' or 'typeII-r17' or 'typeII-PortSelection-r17', and $M_\upsilon=1$.

In one example 5.1B.14, X corresponds to the configuration in which cqi-FormatIndicator is set to 'widebandCQI', pmi-FormatIndicator is not provided (or not configured), codebookType set to 'typeII-r17' or 'typeII-PortSelection-r17', and $M_\upsilon=1$.

In one example 5.1B.15, X corresponds to the configuration in which cqi-FormatIndicator is set to 'widebandCQI', pmi-FormatIndicator is not provided (or not configured), codebookType set to 'typeII-r17', and $M_\upsilon=1$.

In one example 5.1B.16, X corresponds to the configuration in which cqi-FormatIndicator is set to 'widebandCQI', pmi-FormatIndicator is not provided (or not configured), codebookType set to 'typeII-PortSelection-r17', and $M_\upsilon=1$.

Here, 'typeII-r17' or 'typeII-PortSelection-r17' indicates the (port selection) codebook explained in this disclosure; 'typeII-r16' indicates the Rel.16 enhanced Type II codebook (section 5.2.2.2.5, TS 38.214); 'typeII-PortSelection-r16' indicates the Rel.16 enhanced Type II port selection codebook (section 5.2.2.2.6, TS 38.214).

The details about the parameter reportQuantity are described in Section 5.2.1.4.2 of [REF8].

Also, when pmi-FormatIndicator is not provided (or not configured), the UE behavior is equivalent to the following: a UE is not expected to be configured with pmi-FormatIndicator if codebookType set to 'typeII-r16' or 'typeII-PortSelection-r16' or 'typeII-r17' or 'typeII-PortSelection-r17'.

In one embodiment 5.1C, if codebookType is set to 'typeII-r17' or 'typeII-PortSelection-r17', the pmi-FormatIndicator may or may not be configured depending on the configured $M_\upsilon$ value.

In one example (5.1C.1), when $M_\upsilon>1$ (e.g., $M_\upsilon>1$) is configured, the pmi-FormatIndicator is not provided (or not configured), and when $M_\upsilon=1$ is configured, the pmi-Format- Indicator is provided (configured). At least one of the following examples is used/configured.

In one example (5.1C.1.1), when $M_\upsilon>1$ (e.g., $M_\upsilon>1$) is configured, the pmi-FormatIndicator is not provided (or not configured), and when $M_\upsilon=1$ is configured, the pmi-FormatIndicator is provided (configured) and is set to 'widebandPMI'.

when $M_\upsilon>1$ (e.g., $M_\upsilon>1$), a UE is not expected to be configured with pmi-FormatIndicator if codebookType is set to 'typeII-r17' or 'typeII-PortSelection-r17'.

when $M_\upsilon=1$, a UE is expected to be configured with pmi-FormatIndicator set to 'widebandPMI' if codebookType is set to 'typeII-r17' or 'typeII-PortSelection-r17'.

In one example (5.1C.1.2), when $M_\upsilon>1$ (e.g., $M_\upsilon>1$) is configured, the pmi-FormatIndicator is not provided (or not configured), and when $M_\upsilon=1$ is configured, the pmi-FormatIndicator is provided (configured) and is set to 'subbandPMI'.

when $M_\upsilon>1$ (e.g., $M_\upsilon>1$), a UE is not expected to be configured with pmi-FormatIndicator if codebookType is set to 'typeII-r17' or 'typeII-PortSelection-r17'.

when $M_\upsilon=1$, a UE is expected to be configured with pmi-FormatIndicator set to 'subbandPMI' if codebookType is set to 'typeII-r17' or 'typeII-PortSelection-r17'.

In one example (5.1C.1.3), when $M_\upsilon>1$ (e.g., $M_\upsilon>1$) is configured, the pmi-FormatIndicator is provided (configured) and is set to 'widebandPMI', and when $M_\upsilon=1$, the pmi-FormatIndicator is not provided (or not configured).

when $M_\upsilon>1$ (e.g., $M_\upsilon>1$), a UE is expected to be configured with pmi-FormatIndicator set to 'widebandPMI' if codebookType is set to 'typeII-r17' or 'typeII-PortSelection-r17'.

when $M_\upsilon=1$, a UE is not expected to be configured with pmi-FormatIndicator if codebookType is set to 'typeII-r17' or 'typeII-PortSelection-r17'.

In one example (5.1C.1.4), when $M_\upsilon>1$ (e.g., $M_\upsilon>1$) is configured, the pmi-FormatIndicator is provided (configured) and is set to 'subbandPMI', and when $M_\upsilon=1$, the pmi-FormatIndicator is not provided (or not configured).

when $M_\upsilon>1$ (e.g., $M_\upsilon>1$), a UE is expected to be configured with pmi-FormatIndicator set to 'subbandPMI' if codebookType is set to 'typeII-r17' or 'typeII-PortSelection-r17'.

when $M_\upsilon=1$, a UE is not expected to be configured with pmi-FormatIndicator if codebookType is set to 'typeII-r17' or 'typeII-PortSelection-r17'.

In one example (5.1C.2), the pmi-FormatIndicator is configured depending on the configured $M_\upsilon$ value. At least one of the following examples is used/configured.

In one example (5.1C.2.1), when $M_\upsilon>1$ (e.g., $M_\upsilon>1$) is configured, the pmi-FormatIndicator is provided (configured) and is set to 'subbandPMI', and when $M_\upsilon=1$ is configured, the pmi-FormatIndicator is provided (configured) and is set to 'widebandPMI'.

when $M_\upsilon>1$ (e.g., $M_\upsilon>1$), a UE is expected to be configured with pmi-FormatIndicator set to 'subbandPMI' if codebookType is set to 'typeII-r17' or 'typeII-PortSelection-r17'.

when $M_\upsilon=1$, a UE is expected to be configured with pmi-FormatIndicator set to 'widebandPMI' if codebookType is set to 'typeII-r17' or 'typeII-PortSelection-r17'.

In one example (5.1C.2.2), when $M_\upsilon>1$ (e.g., $M_\upsilon>1$) is configured, the pmi-FormatIndicator is provided (configured) and is set to 'widebandPMI', and when $M_\upsilon=1$ is configured, the pmi-FormatIndicator is provided (configured) and is set to 'widebandPMI'.

when $M_\upsilon>1$ (e.g., $M_\upsilon>1$), a UE is expected to be configured with pmi-FormatIndicator set to 'widebandPMI' if codebookType is set to 'typeII-r17' or 'typeII-PortSelection-r17'.

when $M_\upsilon=1$, a UE is expected to be configured with pmi-FormatIndicator set to 'widebandPMI' if codebookType is set to 'typeII-r17' or 'typeII-PortSelection-r17'.

In one example (5.1C.2.3), when $M_\upsilon>1$ (e.g., $M_\upsilon>1$) is configured, the pmi-FormatIndicator is provided (configured) and is set to 'subbandPMI', and when $M_\upsilon=1$ is configured, the pmi-FormatIndicator is provided (configured) and is set to 'subbandPMI'.

when $M_\upsilon>1$ (e.g., $M_\upsilon>1$), a UE is expected to be configured with pmi-FormatIndicator set to 'subbandPMI' if codebookType is set to 'typeII-r17' or 'typeII-PortSelection-r17'.

when $M_\upsilon=1$, a UE is expected to be configured with pmi-FormatIndicator set to 'subbandPMI' if codebookType is set to 'typeII-r17' or 'typeII-PortSelection-r17'.

In one example (5.1C.2.4), when $M_\upsilon>1$ (e.g., $M_\upsilon>1$) is configured, the pmi-FormatIndicator is provided (configured) and is set to 'widebandPMI', and when $M_\upsilon=1$ is configured, the pmi-FormatIndicator is provided (configured) and is set to 'subbandPMI'.

when $M_\upsilon>1$ (e.g., $M_\upsilon>1$), a UE is expected to be configured with pmi-FormatIndicator set to 'widebandPMI' if codebookType is set to 'typeII-r17' or 'typeII-PortSelection-r17'.

when $M_\upsilon=1$, a UE is expected to be configured with pmi-FormatIndicator set to 'subbandPMI' if codebookType is set to 'typeII-r17' or 'typeII-PortSelection-r17'.

In one example (5.1C.3), the pmi-FormatIndicator is not provided (or not configured) for both $M_\upsilon>1$ (e.g., $M_\upsilon>1$) and $M_\upsilon=1$.

a UE is not expected to be configured with pmi-FormatIndicator if codebookType is set to 'typeII-r17' or 'typeII-PortSelection-r17'.

In one embodiment 5.2, the value of the length of the all-one vector ($N_3$) is determined based on the frequency granularity of the CSI reporting (e.g., based on the codebookType set to 'typeII-PortSelection-r17' as described in this disclosure). At least one of the following examples is used is used/configured.

In one example 5.2.1, the frequency granularity can be fixed either to wideband (WB) or subband (SB). When it is fixed to WB, $N_3=1$ or $N_3=R$ (as described in example 5.1.1), and when it is fixed to SB, $N_3>1$ (e.g., $N_3=N_{SB}$ or $N_3=R \times N_{SB}$).

In one example 5.2.2, the frequency granularity is configured from {WB, SB}. In one example, this configuration is via RRC signaling (either via a separate parameter or jointly with another parameter). In one example, this configuration is via MAC CE indication (either via a separate parameter/field or jointly with another parameter/field). In one example, this configuration is via DCI indication (either via a separate parameter/field or jointly with another parameter/field). When the configuration is WB, $N_3=1$ or $N_3=R$ (as described in example 5.1.1), and when the configuration is SB, $N_3>1$ (e.g., $N_3=N_{SB}$ or $N_3=R \times N_{SB}$).

In one example 5.2.3, the frequency granularity is determined based on the UE capability reporting. In one example, the UE can only report a single value from {WB, SB}. In one example, the UE can report single value or multiple values, e.g., {SB, WB}.

In one example 5.2.4, the frequency granularity is fixed (e.g., example 5.2.1) or configured (example 5.2.2) subject to (or conditioned on) the UE capability reporting (example 5.2.3).

In one example, the frequency granularity of the CSI reporting is WB when both CQI and PMI reporting are WB, for example, by setting both cqiFormatIndicator and pmiFormatIndicator to WB.

In one example, the frequency granularity of the CSI reporting is SB when at least one of CQI and PMI reporting is SB, for example, by setting at least one of cqiFormatIndicator and pmiFormatIndicator to SB, i.e., when at least one of the following is set.

cqiFormatIndicator is set to WB and pmiFormatIndicator is set to SB
cqiFormatIndicator is set to SB and pmiFormatIndicator is set to WB
cqiFormatIndicator is set to SB and pmiFormatIndicator is set to SB.

In one example, $N_3=1$ or $N_3=R$ (as described in example 5.1.1) only when the UE is configured with WB CSI reporting.

In one example, $N_3=1$ or $N_3=R$ (as described in example 5.1.1) regardless of whether the UE is configured with WB or SB CSI reporting.

In one example, $N_3>1$ (e.g., $N_3=N_{SB}$ or $N_3=R \times N_{SB}$) only when the UE is configured with SB CSI reporting.

In one example, $N_3>1$ (e.g., $N_3=N_{SB}$ or $N_3=R \times N_{SB}$) regardless of whether the UE is configured with WB or SB CSI reporting.

In one embodiment 5.2A, the value of the length of the all-one vector ($N_3$) is determined based on the frequency granularity of the PMI reporting (e.g., based on the codebookType set to 'typeII-PortSelection-r17' as described in this disclosure). At least one of the following examples is used is used/configured.

In one example 5.2A.1, the frequency granularity of the PMI reporting can be fixed either to wideband (WB) or subband (SB). When it is fixed to WB, $N_3=1$ or $N_3=R$ (as described in example 5.1.1), and when it is fixed to SB, $N_3>1$ (e.g., $N_3=N_{SB}$ or $N_3=R \times N_{SB}$).

In one example 5.2A.2, the frequency granularity of the PMI reporting is configured from {WB, SB}. In one example, this configuration is via RRC signaling (either via a separate parameter or jointly with another parameter). In one example, this configuration is via MAC CE indication (either via a separate parameter/field or jointly with another parameter/field). In one example, this configuration is via DCI indication (either via a separate parameter/field or jointly with another parameter/field). When the configuration is WB, $N_3=1$ or $N_3=R$ (as described in example 5.1.1), and when the configuration is SB, $N_3>1$ (e.g., $N_3=N_{SB}$ or $N_3=R \times N_{SB}$).

In one example 5.2A.3, the frequency granularity of the PMI reporting is determined based on the UE capability reporting. In one example, the UE can only report a single value from {WB, SB}. In one example, the UE can report single value or multiple values, e.g., {SB, WB}.

In one example 5.2A.4, the frequency granularity of the PMI reporting is fixed (e.g., example 5.2A.1) or configured (example 5.2A.2) subject to (or conditioned on) the UE capability reporting (example 5.2A.3).

In one example, the frequency granularity of the PMI reporting is WB by setting/configuring pmiFormatIndicator to WB.

In one example, $N_3=1$ or $N_3=R$ (as described in example 5.1.1) only when the UE is configured with WB PMI reporting.

In one example, $N_3=1$ or $N_3=R$ (as described in example 5.1.1) regardless of whether the UE is configured with WB or SB PMI reporting.

In one example, $N_3>1$ (e.g., $N_3=N_{SB}$ or $N_3=R \times N_{SB}$) only when the UE is configured with SB PMI reporting.

In one example, $N_3>1$ (e.g., $N_3=N_{SB}$ or $N_3=R \times N_{SB}$) regardless of whether the UE is configured with WB or SB PMI reporting.

In one embodiment 5.3, the value of the length of the all-one vector ($N_3$) is determined based on the bandwidth part (BWP) size or CSI reporting band. In one example the BWP size is defined in terms of number of PRBs. Let B denote the BWP size. At least one of the following examples is used is used/configured.

In one example 5.3.1, when the BWP size is small, $N_3=1$ or $N_3=R$ (as described in example 5.1.1); otherwise $N_3>1$ (e.g., $N_3=N_{SB}$ or $N_3=R \times N_{SB}$).
  In one example 5.3.1.1, when $B \leq b$, $N_3=1$ or $N_3=R$ (as described in example 5.1.1); otherwise ($B>b$), $N_3>1$. In one example, b is fixed to b=24. In another example, b is configured (e.g., via RRC signaling).
  In one example 5.3.1.1, when $B<b$, $N_3=1$ or $N_3=R$ (as described in example 5.1.1); otherwise ($B \geq b$), $N_3>1$. In one example, b is fixed to b=24. In another example, b is configured (e.g., via RRC signaling).

In one example 5.3.2, when the BWP size is small, the frequency granularity of the CSI reporting is WB (cf. embodiment 5.2) and $N_3=1$ or $N_3=R$ (as described in example 5.1.1); otherwise when the BWP size is large, the frequency granularity of the CSI reporting can be SB or WB, when it is WB, $N_3=1$ or $N_3=R$ (as described in example 5.1.1), and when it is SB, $N_3>1$ (e.g., $N_3=N_{SB}$ or $N_3=R \times N_{SB}$). The details are the same as in embodiment 5.2.
  In one example 5.3.2.1, when $B \leq b$, the frequency granularity of the CSI reporting is WB (cf. embodiment 5.2) and $N_3=1$ or $N_3=R$ (as described in example 5.1.1); otherwise ($B>b$), the frequency granularity of the CSI reporting can be SB or WB, when it is WB, $N_3=1$ or $N_3=R$ (as described in example 5.1.1), and when it is SB, $N_3>1$ (e.g., $N_3=N_{SB}$ or $N_3=R \times N_{SB}$). In one example, b is fixed to b=24. In another example, b is configured (e.g., via RRC signaling).
  In one example 5.3.2.2, when $B<b$, the frequency granularity of the CSI reporting is WB (cf. embodiment 5.2) and $N_3=1$ or $N_3=R$ (as described in example 5.1.1); otherwise ($B>b$), the frequency granularity of the CSI reporting can be SB or WB, when it is WB, $N_3=1$ or $N_3=R$ (as described in example 5.1.1), and when it is SB, $N_3>1$ (e.g., $N_3=N_{SB}$ or $N_3=R \times N_{SB}$). In one example, b is fixed to b=24. In another example, b is configured (e.g., via RRC signaling).

In one example 5.3.3, when the BWP size is small, the frequency granularity of the PMI reporting is WB (cf. embodiment 5.2A) and $N_3=1$ or $N_3=R$ (as described in example 5.1.1); otherwise when the BWP size is large, the frequency granularity of the PMI reporting can be SB or WB, when it is WB, $N_3=1$ or $N_3=R$ (as described in example 5.1.1), and when it is SB, $N_3>1$ (e.g., $N_3=N_{SB}$ or $N_3=R \times N_{SB}$). The details are the same as in embodiment 5.2A.

In one example 5.3.3.1, when $B \leq b$, the frequency granularity of the PMI reporting is WB (cf. embodiment 5.2A) and $N_3=1$ or $N_3=R$ (as described in example 5.1.1); otherwise (B>b), the frequency granularity of the PMI reporting can be SB or WB, when it is WB, $N_3=1$ or $N_3=R$ (as described in example 5.1.1), and when it is SB, $N_3>1$ (e.g., $N_3=N_{SB}$ or $N_3=R \times N_{SB}$). In one example, b is fixed to b=24. In another example, b is configured (e.g., via RRC signaling).

In one example 5.3.3.2, when B<b, the frequency granularity of the PMI reporting is WB (cf. embodiment 5.2A) and $N_3=1$ or $N_3=R$ (as described in example 5.1.1); otherwise ($B \geq b$), the frequency granularity of the PMI reporting can be SB or WB, when it is WB, $N_3=1$ or $N_3=R$ (as described in example 5.1.1), and when it is SB, $N_3>1$ (e.g., $N_3=N_{SB}$ or $N_3=R \times N_{SB}$). In one example, b is fixed to b=24. In another example, b is configured (e.g., via RRC signaling).

In one embodiment 5.4, when the BWP size is small (e.g., B<b or $B \leq b$, b=24 for example), details as in embodiment 5.3, at least one of the examples is used/configured regarding the support of the codebookType set to 'typeII-PortSelection-r17' as described in this disclosure.

In one example 5.4.1, the codebook as described in this disclosure is not supported. This is regardless of WB or SB CSI reporting. That is, for the small BWP sizes (e.g., B<b or $B \leq b$, b=24 for example), the UE is not expected to be configured with codebookType set to 'typeII-PortSelection-r17' as described in this disclosure.

In one example 5.4.2, the codebook as described in this disclosure is supported, but only WB CSI reporting can be configured. That is, for the small BWP sizes (e.g., B<b or $B \leq b$, b=24 for example), the UE is not expected to be configured with SB CSI reporting and codebookType set to 'typeII-PortSelection-r17' as described in this disclosure, Alternatively, the UE is expected to (or can) be configured with WB CSI reporting and codebookType set to 'typeII-PortSelection-r17' as described in this disclosure.

In one example 5.4.3, the codebook as described in this disclosure is supported, but only SB CSI reporting can be configured. That is, for the small BWP sizes (e.g., B<b or $B \leq b$, b=24 for example), the UE is not expected to be configured with WB CSI reporting and codebookType set to 'typeII-PortSelection-r17' as described in this disclosure, Alternatively, the UE is expected to (or can) be configured with SB CSI reporting and codebookType set to 'typeII-PortSelection-r17' as described in this disclosure.

In one example 5.4.4, the codebook as described in this disclosure is supported for both WB and SB CSI reporting. That is, for the small BWP sizes (e.g., B<b or $B \leq b$, b=24 for example), the UE can be configured with WB or SB CSI reporting and codebookType set to 'typeII-PortSelection-r17' as described in this disclosure.

In one example 5.4.5, the codebook as described in this disclosure is supported, but only WB PMI reporting can be configured. That is, for the small BWP sizes (e.g., B<b or $B \leq b$, b=24 for example), the UE is not expected to be configured with SB PMI reporting and codebookType set to 'typeII-PortSelection-r17' as described in this disclosure, Alternatively, the UE is expected to (or can) be configured with WB PMI reporting and codebookType set to 'typeII-PortSelection-r17' as described in this disclosure.

In one example 5.4.6, the codebook as described in this disclosure is supported, but only SB PMI reporting can be configured. That is, for the small BWP sizes (e.g., B<b or $B \leq b$, b=24 for example), the UE is not expected to be configured with WB PMI reporting and codebookType set to 'typeII-PortSelection-r17' as described in this disclosure, Alternatively, the UE is expected to (or can) be configured with SB PMI reporting and codebookType set to 'typeII-PortSelection-r17' as described in this disclosure.

In one example 5.4.6, the codebook as described in this disclosure is supported for both WB and SB PMI reporting. That is, for the small BWP sizes (e.g., B<b or $B \leq b$, b=24 for example), the UE can be configured with WB or SB PMI reporting and codebookType set to 'typeII-PortSelection-r17' as described in this disclosure.

The value of $N_3$ is determined based on WB or SB CSI (or PMI) reporting, as described in embodiment 5.1/5.2/5.2A/5.3.

In one embodiment 5.5, when the BWP size is large (e.g., $B \geq b$ or B>b, b=24 for example), details as in embodiment 5.3, at least one of the examples is used/configured regarding the support of the with codebookType set to 'typeII-PortSelection-r17' as described in this disclosure.

In one example 5.5.1, the codebook as described in this disclosure is supported for both WB and SB CSI reporting. That is, for the large BWP sizes (e.g., $B \geq b$ or B>b, b=24 for example), the UE can be configured with WB or SB CSI reporting and codebookType set to 'typeII-PortSelection-r17' as described in this disclosure.

In one example 5.4.2, the codebook as described in this disclosure is supported, but only WB CSI reporting can be configured. That is, for the small BWP sizes (e.g., $B \geq b$ or B>b, b=24 for example), the UE is not expected to be configured with SB CSI reporting and codebookType set to 'typeII-PortSelection-r17' as described in this disclosure, Alternatively, the UE is expected to (or can) be configured with WB CSI reporting and codebookType set to 'typeII-PortSelection-r17' as described in this disclosure.

In one example 5.5.3, the codebook as described in this disclosure is supported, but only SB CSI reporting can be configured. That is, for the large BWP sizes (e.g., $B \geq b$ or B>b, b=24 for example), the UE is not expected to be configured with WB CSI reporting and codebookType set to 'typeII-PortSelection-r17' as described in this disclosure, Alternatively, the UE is expected to (or can) be configured with SB CSI reporting and codebookType set to 'typeII-PortSelection-r17' as described in this disclosure.

In one example 5.5.4, the codebook as described in this disclosure is supported for both WB and SB PMI reporting. That is, for the large BWP sizes (e.g., B≥b or B>b, b=24 for example), the UE can be configured with WB or SB PMI reporting and codebookType set to 'typeII-PortSelection-r17' as described in this disclosure.

In one example 5.4.5, the codebook as described in this disclosure is supported, but only WB PMI reporting can be configured. That is, for the small BWP sizes (e.g., B≥b or B>b, b=24 for example), the UE is not expected to be configured with SB PMI reporting and codebookType set to 'typeII-PortSelection-r17' as described in this disclosure, Alternatively, the UE is expected to (or can) be configured with WB PMI reporting and codebookType set to 'typeII-PortSelection-r17' as described in this disclosure.

In one example 5.5.6, the codebook as described in this disclosure is supported, but only SB PMI reporting can be configured. That is, for the large BWP sizes (e.g., B≥b or B>b, b=24 for example), the UE is not expected to be configured with WB PMI reporting and codebookType set to 'typeII-PortSelection-r17' as described in this disclosure, Alternatively, the UE is expected to (or can) be configured with SB PMI reporting and codebookType set to 'typeII-PortSelection-r17' as described in this disclosure.

The value of $N_3$ is determined based on WB or SB CSI reporting, as described in embodiment 5.1/5.2/5.3/5.4/5.5/5.6.

In one embodiment 5.6, the UE is configured with a codebook as described in this disclosure (e.g., codebookType set to 'typeII-PortSelection-r17' or 'typeII-r17'), wherein the configuration includes or determines parameters $N_3$ and $M_\upsilon$. At least one of the following examples is used to determine the number of precoding matrices indicated by the PMI from the codebook.

In one example 5.6.1, if $M_\upsilon=1$, a single precoding matrix is indicated by the PMI for the entire CSI reporting band.

In one example 5.6.2, if $M_\upsilon=1$, a single precoding matrix is indicated by the PMI for the entire CSI reporting band, and if $M_\upsilon>1$ (e.g., $M_\upsilon=2$), a total number of $N_3$ precoding matrices are indicated by the PMI.

In one example 5.6.3, if $N_3>1$, then a total number of $N_3$ precoding matrices are indicated by the PMI, but they are the same (identical) if $M_\upsilon=1$. Note that since the precoding matrices are the same (identical), this essentially implies that there is a single precoding matrix indicated by the PMI for the entire CSI reporting band (i.e., example 5.6.2).

In one example 5.6.4, if $N_3>1$, then a total number of $N_3$ precoding matrices are indicated by the PMI, but they are the same (identical) if $M_\upsilon=1$, and they are different (or can be different) if $M_\upsilon>1$ (e.g., $M_\upsilon=2$). Note that since the precoding matrices are the same (identical) if $M_\upsilon=1$, this essentially implies that there is a single precoding matrix indicated by the PMI for the entire CSI reporting band (i.e., example 5.6.1).

In one embodiment 5.7, at least one of the following examples is used to describe the codebook for the case when $W_f$ is turned OFF.

In one example 5.7.1, $N_3=1$ implies that there is a single precoding matrix is indicated by the PMI for the entire CSI reporting band, or vice versa.

In one example 5.7.2, pmiFormatIndicator set to WB implies that there is a single precoding matrix is indicated by the PMI for the entire CSI reporting band, or vice versa.

In one example 5.7.3, $W_f$ being turned OFF implies that there is a single precoding matrix is indicated by the PMI for the entire CSI reporting band, or vice versa.

In one example 5.7.4, $W_f$ being the all-one vector implies that there is a single precoding matrix is indicated by the PMI for the entire CSI reporting band, or vice versa.

In one example 5.7.5, the following are equivalent statements or configurations or codebook descriptions or UE behaviors. Hence, any one of them can be used in the codebook description, or can replace another.

$N_3=1$ a single precoding matrix is indicated by the PMI for the entire CSI reporting band pmiFormatIndicator set to WB $W_f$ being turned OFF $W_f$ being the all-one vector.

Any of the above variation embodiments can be utilized independently or in combination with at least one other variation embodiment.

Figure 19:
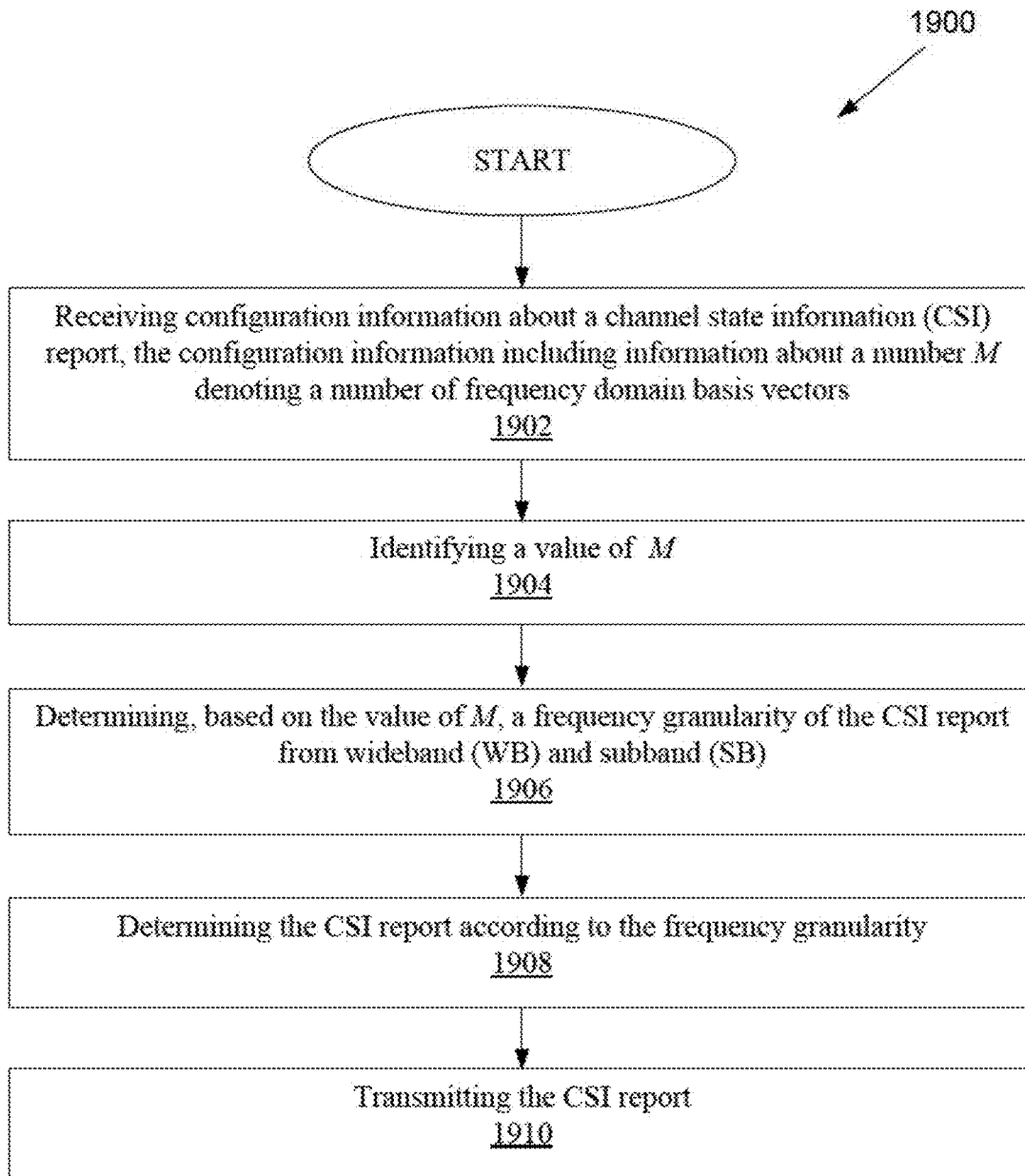
FIG. 19 illustrates a flow chart of a method for operating a UE according to embodiments of the present disclosure.

FIG. 19 illustrates a flow chart of a method 1900 for operating a UE, as may be performed by a UE such as UE 116, according to embodiments of the present disclosure. The embodiment of the method 1900 illustrated in FIG. 19 is for illustration only. FIG. 19 does not limit the scope of this disclosure to any particular implementation.

As illustrated in FIG. 19, the method 1900 begins at step 1902. In step 1902, the UE (e.g., 111-116 as illustrated in FIG. 1) receives configuration information about a CSI report, the configuration information including information about a number M denoting a number of frequency domain basis vectors.

In step 1904, the UE identifies a value of M.

In step 1906, the UE determines, based on the value of M, a frequency granularity the CSI report from WB and SB.

In step 1908, the UE determines the CSI report according to the frequency granularity.

In step 1910, the UE transmits the CSI report.

In one embodiment, the frequency granularity of the CSI report=WB when M=1.

In one embodiment, the configuration information includes information about a CQI format, and the frequency granularity of the CSI report=WB when M=1 and the CQI format=WB.

In one embodiment, the configuration information includes information about reportQuantity indicating a content of the CSI report, and reportQuantity is set to 'cri-RI-PMI-CQI', or 'cri-RI-LI-PMI-CQI', where cri=CSI-RS resource indicator, RI=rank indicator, PMI=precoding matrix indicator, and LI=layer indicator.

In one embodiment, the configuration information includes information about codebookType, and codebookType is set to 'typeII-PortSelection-r17' indicating a port selection codebook.

In one embodiment, the value of M and the frequency granularity of the CSI report are based on a BWP size that includes a CSI reporting band.

In one embodiment, when the BWP size is <24 physical resource blocks (PRBs): M is fixed as M=1 and the frequency granularity of the CSI report is fixed as WB.

Figure 20:
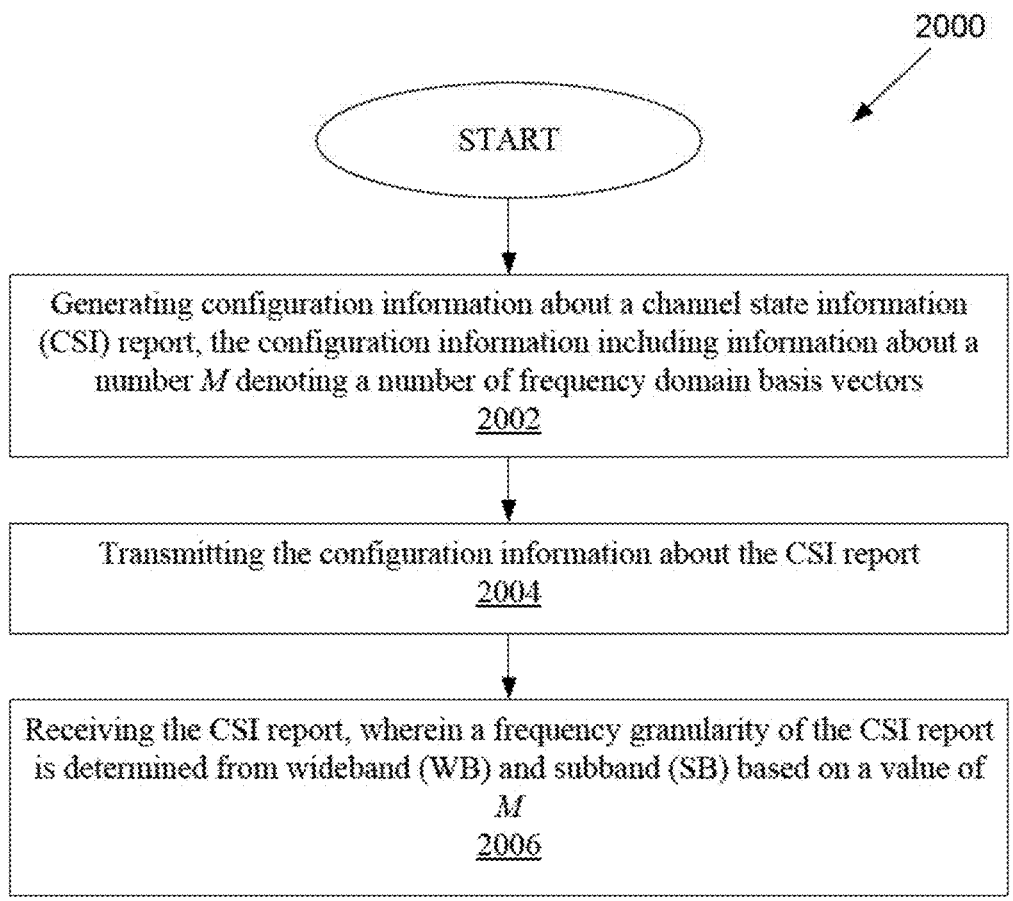
FIG. 20 illustrates a flow chart of a method for operating a BS according to embodiments of the present disclosure.

FIG. 20 illustrates a flow chart of another method 2000, as may be performed by a base station (BS) such as BS 102, according to embodiments of the present disclosure. The embodiment of the method 2000 illustrated in FIG. 20 is for illustration only. FIG. 20 does not limit the scope of this disclosure to any particular implementation.

As illustrated in FIG. 20, the method 2000 begins at step 2002. In step 2002, the BS (e.g., 101-103 as illustrated in FIG. 1), generates configuration information about a channel state information (CSI) report, the configuration information including information about a number M denoting a number of frequency domain basis vectors.

In step 2004, the BS transmits the configuration information about the CSI report.

In step 2006, the BS receives the CSI report, wherein a frequency granularity of the CSI report is determined from WB and SB based on a value of M.

In one embodiment, the frequency granularity of the CSI report=WB when M=1.

In one embodiment, the configuration information includes information about a CQI format, and the frequency granularity of the CSI report=WB when M=1 and the CQI format=WB.

In one embodiment, the configuration information includes information about reportQuantity indicating a content of the CSI report, and reportQuantity is set to 'cri-RI-PMI-CQI', or 'cri-RI-LI-PMI-CQI', where cri=CSI-RS resource indicator, RI=rank indicator, PMI=precoding matrix indicator, and LI=layer indicator.

In one embodiment, the configuration information includes information about codebookType, and codebookType is set to 'typeII-PortSelection-r17' indicating a port selection codebook.

In one embodiment, the value of M and the frequency granularity of the CSI report are based on a BWP size that includes a CSI reporting band.

In one embodiment, when the BWP size is <24 PRB s: M is fixed as M=1 and the frequency granularity of the CSI report is fixed as WB.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to receive configuration information about a channel state information (CSI) report, the configuration information including information about a number M denoting a number of frequency domain basis vectors; and
a processor operably coupled to the transceiver, the processor, based on the configuration information, configured to:
identify a value of M,
determine, based on the value of M, a frequency granularity of the CSI report from wideband (WB) and subband (SB), wherein the frequency granularity of the CSI report=WB when M=1, and
determine the CSI report according to the frequency granularity;
wherein the transceiver is further configured to transmit the CSI report.

2. The UE of claim 1, wherein:
the configuration information includes information about a channel quality indicator (CQI) format, and
the frequency granularity of the CSI report=WB when M=1 and the CQI format=WB.

3. The UE of claim 2, wherein the configuration information includes information about reportQuantity indicating a content of the CSI report, and reportQuantity is set to 'cri-RI-PMI-CQI', or 'cri-RI-LI-PMI-CQI', where;
cri=CSI-RS resource indicator,
RI=rank indicator,
PMI=precoding matrix indicator, and
LI=layer indicator.

4. The UE of claim 3, wherein the configuration information includes information about codebookType, and codebookType is set to 'typeII-PortSelection-r17' indicating a port selection codebook.

5. The UE of claim 1, wherein the value of M and the frequency granularity of the CSI report are based on a bandwidth part (BWP) size that includes a CSI reporting band.

6. The UE of claim 5, wherein:
when the BWP size is <24 physical resource blocks (PRBs): M is fixed as M=1 and the frequency granularity of the CSI report is fixed as WB.

7. A base station (BS) comprising:
a processor configured to generate configuration information about a channel state information (CSI) report, the configuration information including information about a number M denoting a number of frequency domain basis vectors; and
a transceiver operably coupled to the processor, the transceiver configured to:
transmit the configuration information about the CSI report, and
receive the CSI report;
wherein a frequency granularity of the CSI report is determined from wideband (WB) and subband (SB) based on a value of M, wherein the frequency granularity of the CSI report=WB when M=1.

8. The BS of claim 7, wherein:
the configuration information includes information about a channel quality indicator (CQI) format, and
the frequency granularity of the CSI report=WB when M=1 and the CQI format=WB.

9. The BS of claim 8, wherein the configuration information includes information about reportQuantity indicating a content of the CSI report, and reportQuantity is set to 'cri-RI-PMI-CQI', or 'cri-RI-LI-PMI-CQI', where;
cri=CSI-RS resource indicator,
RI=rank indicator,
PMI=precoding matrix indicator, and
LI=layer indicator.

10. The BS of claim 9, wherein the configuration information includes information about codebookType, and codebookType is set to 'typeII-PortSelection-r17' indicating a port selection codebook.

11. The BS of claim 7, wherein the value of M and the frequency granularity of the CSI report are based on a bandwidth part (BWP) size that includes a CSI reporting band.

12. The BS of claim 11, wherein:
when the BWP size is <24 physical resource blocks (PRBs): M is fixed as M=1 and the frequency granularity of the CSI report is fixed as WB.

13. A method for operating a user equipment (UE), the method comprising:
receiving configuration information about a channel state information (CSI) report, the configuration information including information about a number M denoting a number of frequency domain basis vectors;
identifying a value of M;
determining, based on the value of M, a frequency granularity of the CSI report from wideband (WB) and subband (SB), wherein the frequency granularity of the CSI report=WB when M=1;
determining the CSI report according to the frequency granularity; and
transmitting the CSI report.

14. The method of claim 13, wherein:
the configuration information includes information about a channel quality indicator (CQI) format, and
the frequency granularity of the CSI report=WB when M=1 and the CQI format=WB.

15. The method of claim 14, wherein the configuration information includes information about reportQuantity indicating a content of the CSI report, and reportQuantity is set to 'cri-RI-PMI-CQI', or 'cri-RI-LI-PMI-CQI', where;
cri=CSI-RS resource indicator,
RI=rank indicator,
PMI=precoding matrix indicator, and
LI=layer indicator.

16. The method of claim 15, wherein the configuration information includes information about codebookType, and codebookType is set to 'typeII-PortSelection-r17' indicating a port selection codebook.

17. The method of claim 13, wherein:
the value of M and the frequency granularity of the CSI report are based on a bandwidth part (BWP) size that includes a CSI reporting band, and
when the BWP size is <24 physical resource blocks (PRBs): M is fixed as M=1 and the frequency granularity of the CSI report is fixed as WB.

* * * * *